United States Patent [19]
Kumar

[11] Patent Number: 5,949,796
[45] Date of Patent: Sep. 7, 1999

[54] IN-BAND ON-CHANNEL DIGITAL BROADCASTING METHOD AND SYSTEM

[76] Inventor: Derek D. Kumar, 2313 Blackthorn Dr., Champaign, Ill. 61821

[21] Appl. No.: 08/666,985

[22] Filed: Jun. 19, 1996

[51] Int. Cl.[6] .................. H04J 1/05; H04J 1/12
[52] U.S. Cl. .................. 370/529; 370/487; 375/347
[58] Field of Search .................... 375/267, 278, 375/299, 346, 347; 370/527, 528, 486, 485, 487, 529, 265; 455/50.1, 52.1, 63, 65, 132, 134, 135, 59

[56] References Cited

U.S. PATENT DOCUMENTS

| | | |
|---|---|---|
| 3,195,048 | 7/1965 | Adams et al. ............ 455/504 |
| 4,074,230 | 2/1978 | Icenbice, Jr. ............ 371/37.03 |
| 4,124,779 | 11/1978 | Berens et al. . |
| 4,199,809 | 4/1980 | Pasahow et al. . |
| 4,206,317 | 6/1980 | Kahn ............ 370/201 |
| 4,460,992 | 7/1984 | Gutleber . |
| 4,569,073 | 2/1986 | Kahn . |
| 4,587,662 | 5/1986 | Langewellpott . |
| 4,589,127 | 5/1986 | Loughlin . |
| 4,688,255 | 8/1987 | Kahn . |
| 5,005,169 | 4/1991 | Bronder et al. . |
| 5,157,672 | 10/1992 | Kondou et al. . |
| 5,214,656 | 5/1993 | Chung et al. . |
| 5,265,122 | 11/1993 | Rasky et al. . |
| 5,278,844 | 1/1994 | Murphy et al. . |
| 5,278,863 | 1/1994 | Briskman . |
| 5,289,501 | 2/1994 | Seshadri et al. . |
| 5,305,352 | 4/1994 | Calderbank et al. . |
| 5,315,583 | 5/1994 | Murphy et al. . |
| 5,319,673 | 6/1994 | Briskman . |
| 5,359,625 | 10/1994 | Vander Mey et al. . |
| 5,369,800 | 11/1994 | Takagi et al. ............ 455/59 |
| 5,390,214 | 2/1995 | Hopkins et al. ............ 375/259 |
| 5,414,729 | 5/1995 | Fenton . |
| 5,465,396 | 11/1995 | Hunsinger et al. . |
| 5,469,452 | 11/1995 | Zehavi . |
| 5,483,690 | 1/1996 | Schröder ............ 455/226.1 |
| 5,499,271 | 3/1996 | Plenge et al. ............ 375/295 |
| 5,546,420 | 8/1996 | Seshadri et al. . |
| 5,559,830 | 9/1996 | Dapper et al. . |
| 5,584,051 | 12/1996 | Göken ............ 455/68 |
| 5,588,022 | 12/1996 | Dapper et al. . |
| 5,592,471 | 1/1997 | Briskman . |
| 5,615,227 | 3/1997 | Schumacher, Jr. et al. . |
| 5,745,525 | 4/1998 | Hunsinger et al. . |

FOREIGN PATENT DOCUMENTS

WO9602101  1/1996  WIPO .

OTHER PUBLICATIONS

USA Digital Radio In–Band On–Channel Digital Audio Broadcast System Description, Apr. 9, 1995.
USADR, FM–1 System Description, 1995.

(List continued on next page.)

*Primary Examiner*—Chau Nguyen
*Assistant Examiner*—Soon-Dong Hyun
*Attorney, Agent, or Firm*—Joseph A. Rhoa

[57] ABSTRACT

A method and system are provided for the transmission and reception of an In-band On-channel (IBOC) FM-band digital audio broadcast (DAB) signal. The IBOC DAB signal is generated in the transmitter to substantially occupy the upper and lower sideband frequency regions in the RF emission mask for the conventional broadcast analog FM-band. Redundant source bit information is transmitted in both the upper and lower sidebands so that the loss of information in either one but not both sidebands due to large amounts of interference or distortion, caused by, for example, first-adjacent interference, does not deleteriously affect the IBOC DAB receiver performance. The system exhibits both frequency-diversity and time-diversity. The receiver determines which codeword bit estimate, corresponding to either upper or lower sideband signals, is less likely to be erroneous. The receiver system selects between decoded estimates for each pair of demodulated ECC codewords or combines both ECC codeword estimates prior to decoding in certain embodiments.

22 Claims, 17 Drawing Sheets

Microfiche Appendix Included
(2 Microfiche, 106 Pages)

OTHER PUBLICATIONS

USADR, FM–2 System Description, 1995.

Brandenburg and M. Bosi, "Overview of MPEG–Audio: Current and Future Standard for Low Bit–Rate Audio Coding", 99th AES Convention, New York Preprint, 4130 F1, Oct. 6–9, pp. 1–26, 1995.

N.S. Jayant and E.Y. Chen, "Audio Compression: Technology and Applications", AT&T Technical Journal, pp. 23–34, Mar./Apr.

G. Plenge, "DAB—A New Sound Broadcasting System, Status of the Development—Routes to its Introduction", (Translated) EBU Review—Technical, No. 246, pp. 87–112, Apr. 1991.

W.Y. Zou and Y. Wu, "COFDM: An Overview", IEEE Transactions on Broadcasting, vol. 41, No. 1, pp. 1–8, Mar. 1995.

R.L. Pickholtz, D.L. Schilling, and L.B. Milstein, "Theory of Spread–Spectrum Communications—A Tutorial", IEEE Transactions on Communications, vol. 30, No. 5, pp. 57–86, May 1982.

W.C.Y. Lee, *Mobile Communications Design Fundamentals,* Indianapolis, Indiana: Howard W. Sams & Co., 1986, pp. 26–36, 113–133, J.L. Ramsey, "Realization of Optimum Interleavers", IEEE Transactions on Information Theory, vol. 16, No. 3, pp. 338–345, May 1970.

W.T. Webb and L. Hanzo, *Modern Quadrature Amplitude Modulation,* London: Pentech Press, Ltd., 1994, pp. 238–254, 266–268, 293–319, 428–471.

A.J. Viterbi, "Convolutional Codes and Their Performance in Communication Systems", IEEE Transaction on Communications, vol. 19, No. 5, pp. 751–772, Oct. 1971.

L.H.C. Lee, "New Rate–Compatible Punctured Convolutional Codes for Viterbi Decoding", IEEE Transactions on Communications, vol. 42, No. 12, pp. 3073–3079, Dec. 1994.

P.J. Lee, "Constructions on Rate (n–1)/n in Punctured Convolutional Codes with Minimum Required SNR Criterior", IEEE Transactions on Communications, vol. 36, No. 10, pp. 1171–1174, Oct., 1988.

G.R. Cooper and C.D. McGillem, *Modern Communications and Spread Spectrum,* NY: McGraw–Hill, Inc., 1986, pp. 206–210, 237–242.

E.J. McCluskey, *Logic Design Principles,* Englewood Cliffs, New Jersey; Prentice–Hall, 1986, pp. 16–19.

A.J. Viterbi, J.K. Wolf, E. Zehavi, and R. Padovani, "A Pragmatic Approach to Trellis–Coded Modulation", IEEE Communications Magazine, vol. 17, No. 7, pp. 11–19, Jul. 1989.

W.H. Press, B.P. Flannery, S.A. Teukolsky, and W.T. Vetterling, *Numerical Recipes: The Art of Scientific Computing,* Cambridge, England: Cambridge University Press, 1986, pp. 52–64, 509–520.

G. Ungerboeck, "Channel Coding with Multilevel/Phase Signals", IEEE Transactions on Information Theory, vol. 28, No. 1, pp. 55–67, Jan. 1982.

N. Sehadri and C.E.W. Sundberg, "Multilevel Trellis Coded Modulations for the Rayleigh Fading Channel", IEEE Transactions on Communications, vol. 40, No. 9, pp. 1300–1310, Sep. 1993.

J. Wu and S. Lin, "Multilevel Trellis MPSK Modulation Codes for the Rayleigh Fading Channel", IEEE Transactions on Communications, vol. 41, No. 9, pp. 1311–1318, Sep. 1993.

D. Saha, "Channel Coding with Quadrature—Quadrature Phase–Shift Keying ($\frac{1}{2}^2$PSK) Signals", IEEE Transactions on Communications, vol. 38, No. 4, pp. 409–417, Apr. 1990.

The Eureka 147 Project, Digital Audio Broadcasting (DAB) System, A Brief Description (8 pages).

Eureka 147/DAB System Description (17 pages).

Jayant, N.S., The AT&T DAR System Update, pp. 389–403 (1994).

Chen, et al, AT&T—DAR Systems, Apr. 1995 (11 pages).

Jayant, N., Status Report or Pact and MPAC Perceptual Audio Coders From AT&T (10 pages).

USADR, AM IBOC DAB System Description (1995) (4 pages).

USADR, FM–1 System Description (1995) (10 pages).

USADR, FM–2 System Description (1995) (13 pages).

USA Digital Radio In–Band On–Channel Digital Audio Broadcast System Description, Apr. 9, 1995 (6 pages).

EIA Test Laboratory, 1994–95 Tests for AT&T AMATI, USADR FM–2, USADR FM–1, and AT&T AMATI DSM and LSB (68 pages).

S. Kasturia, J.T. Aslanis, and M.M. Cioffi, "Vector Coding for Partial Response Channels", IEEE, pp. 741–762, 1990.

D.V. Sarwate, M.B. Pursley, "Crosscorrelation Properties of Pseudorandom and Related Sequences", IEEE, pp. 593–619, 1980.

Q1875 Pragmatic Trellis Decoder, Technical Data Sheet, pp. 4–38.

J. Hagenauer, E. Offer, and L. Papke, "Iterative Decoding of Binary Block and Convolutional Codes", IEEE, pp. 429–445, 1996.

IN-BAND ON-CHANNEL DIGITAL BROADCASTING METHOD AND SYSTEM

This invention relates to a method of communication and a transmitter and receiver system for the terrestrial radio-frequency (RF) broadcast and reception of digital data, preferably including stereo high-fidelity music, to accomplish the goal of digital audio broadcast (DAB). The digital signal generated by the DAB transmitter exists together with the conventional analog frequency-modulation (FM) signal in the commercial broadcast FM-band (87.9 MHZ to 107.9 MHZ in the United States) and is typically emitted from the same antenna system. The analog FM signal and the digital signal are unrelated and are received independently. The digital signal is generated to occupy the upper and lower sideband frequency regions which surround the analog FM signal. The spectrum of the digital signal is substantially contained within the predetermined RF emission mask. Redundant data is transmitted in both sidebands simultaneously or with diversity delay so that the loss (i.e. unreliable determination) of the source information in only one of the two sidebands due to multipath or adjacent station interference does not substantially disrupt continuous reception of the digital signal.

CLAIM TO COPYRIGHT IN REFERENCE TO MICROFICHE APPENDIX

A portion of the disclosure of this patent application contains material which is subject to copyright protection. The copyright owner has no objection to the reproduction by anyone of the patent document as it appears in the Patent and Trademark Office files or records, but otherwise reserves all copyrights whatsoever. Software for carrying out some of the methods and systems described herein has been filed with the United States Patent and Trademark Office herewith in the form of a microfiche appendix including numerous frames, one of which being a title frame. This software may be included as part of a chip or disc according to certain embodiments of this invention. The microfiche appendix is entitled IN-BAND ON-CHANNEL DIGITAL BROADCASTING METHOD AND SYSTEM and includes two (2) microfiche and one hundred six (106) frames.

BACKGROUND OF THE INVENTION

The goal of digital audio broadcast (DAB) is to provide a robust method and system for the simplex transmission and reception of high-quality audio (music and/or speech) and ancillary digital data by radio-frequency (RF) signals. The RF signals are generated in a transmitter system, emitted for free-space atmosphere propagation, and received by one or a plurality of receiver systems, which may be mobile. The transmitter may be space-borne or terrestrially located or a combination thereof (i.e. space-borne with terrestrial re-broadcasting). In general, terrestrial transmission is required for adequate mobile receiver performance in areas with dense natural and/or man-made structures because satellite reception typically requires line-of-sight (LOS) propagation due to large propagation path signal loss.

The RF signal for DAB represents digital (bit) information which is encoded in the signal generated in the transmitter system by a modulation method. Unlike conventional analog FM modulation, the information represented by the digital signal (e.g. digitized speech, music, and/or data) is typically unrelated to the characteristics of the transmitted RF signal. A primary goal of DAB is to eventually supplant the existing commercial analog radio broadcast network (i.e. AM-band and FM-bands). Since the primary function of the existing AM-band and FM-band is to provide audio services in the form of music and/or speech, it is presumed that a significant fraction of the encoded digital data represents one or a plurality of digital audio signals.

In many circumstances, the quality of the digital audio signal recovered in the DAB RF signal receiver is expected to be improved when compared to the audio signal recovered from the conventional analog frequency-modulated (FM) signal. Typically, the digital audio signal has i) a higher signal-to-noise (SNR) ratio, ii) a wider (i.e. larger) audio bandwidth, and iii) improved stereo separation (i.e. spatial fidelity) when compared to conventional FM-band reception. For example, conventional analog FM-band broadcast signals have a recovered audio bandwidth of about 15 kHz. While 15 kHz audio bandwidth is substantially greater the audio bandwidth received for commercial AM-band radio broadcast (i.e. 535 kHz–1705 kHz), which is typically less than 10 kHz, 15 kHz is less than the bandwidth of pre-recorded music on the compact-disc (CD) format, which is about 20 kHz.

The improved audio bandwidth advantage of DAB when compared to conventional analog FM-band reception is generally desirable. However, the most significant advantage of DAB is the greater immunity, determined at the receiver, of the DAB signal when compared to the analog FM-band signal to various forms of distortion and interference. The presence of distortion and interference in the recovery of the analog FM-band signal may cause various undesirable artifacts in the audio signal determined at the receiver, for example, static noise, hiss and hum, and clicks. In certain circumstances, the quality of the recovered signal is limited by the effects of background noise. Background noise may be generated by galactic, atmospheric, thermal, and man-made sources (e.g. ignition-noise), for example. Background noise is typically distinguished from distortion which is i) related to the propagation characteristics of the RF signal, for example, multipath, and ii) interference caused by other RF broadcast sources. Background noise is particularly noticeable in the recovered analog FM-band signal when there are pauses or quiet passages in the audio program. In general, the process of analog FM modulation typically improves the robustness of the recovered signal when compared to other analog modulation methods (e.g. amplitude modulation as used in the AM broadcast band) by causing "processing gain" by increasing the occupied bandwidth of the signal. However, the benefits of the analog FM processing gain are substantially eliminated when the source audio signal is silent or quiet.

Reception of the FM-band signal may be significantly disturbed by the effect of multipath propagation. The deleterious effects of multipath are a result of the relatively high RF carrier frequencies, which are characteristic of the FM-band frequency range, and the use of omnidirectional receiving antennas, especially for radio receivers in vehicles. Multipath propagation results from the presence of specular and/or diffuse reflectors in or about the propagation path between the transmitter and the receiver. As a result, multiple signals with varying delay, phase, amplitude, and frequency are received, these signals corresponding to different propagation paths. In general, the deleterious effects of multipath are: i) attenuation of the received RF signal due to destructive coherent interference between paths, ii) dispersion in the received RF signal due to the frequency selective characteristic of multipath, and iii) intersymbol interference between adjacent signal baud intervals. Multipath is typically mathematically modeled as a deterministic linear sum or stochastic function of the transmitted signal and reflections, with background noise modeled independently in the summation.

In addition to background noise and multipath, interference in the received signal may be caused by the presence of other RF signal sources with similar frequencies, including other FM-band transmitters. In circumstances when there are many transmitters, for example, in large urban areas, inter-station interference due to other transmitters operating at the same or similar RF frequencies may be the primary cause of signal degradation, except for weak-signal conditions at substantial distances from the transmitter or unusual reception circumstances (e.g. signal shielding in a tunnel).

Because broadcast transmitters may emit high-power RF signals, their operation is often dictated by rules and regulations enacted by governmental agencies. Although the rules are intended to prevent interference between stations, there may be exceptions granted to the adherence to the rules. Furthermore, the presence of noise and multipath may cause reception conditions which are substantially degraded when compared to the nominal conditions which were presumed to exist according to the rules. In the United States, the rules and regulations governing FM-band broadcast are determined by the Federal Communications Communication (FCC).

The general goals of a DAB system are independent of the specific implementation of the DAB system. The purpose of DAB is to provide a simplex communication system which conveys digital audio and ancillary data in the form of RF signals from one or a plurality of transmitters to one or a plurality of receivers. It is desirable that the determination (i.e. demodulation and decoding) of the transmitted DAB signal at the receiver is less degraded by the effects of noise, multipath, and interference when compared to the reception of conventional FM-band broadcast signals for DAB and FM signals with equivalent coverage. The quality of the recovered digital audio signal represented by the DAB RF signal is, when unimpaired, similar to that of pre-recorded CD material (i.e. near CD-quality). However, the direct digital transmission of data in the CD format is inefficient because of the high data rate that is required for the CD representation, which is greater than one million bits per second for stereo signals. In a DAB system, the audio (i.e. speech and/or music) is subjected to source compression, which reduces the required data throughput substantially. Source compression accomplishes a reduction in the required bit rate for audio by exploiting characteristics of the human hearing process in order to remove audio information which is at or below a threshold of perception and whose absence will not, in general, be noticed by the listener.

In a conventional DAB system, the data representing the compressed audio signal is combined with ancillary data and then error-correction encoded, modulated, and emitted as an RF signal at the DAB transmitter. In the corresponding conventional DAB receiver system, the received RF signal is demodulated, error correction decoded, and the effect of the source-compression is reversed to generate a conventional digital audio signal, for example, in the form of a pulse-code modulation signal. The design and implementation of an audio compression and decompression algorithm, known as an audio "codec", is a complex process, but several methods which are suitable for DAB are known. For high-quality stereo digital audio, exemplary algorithms are ISO MPEG-2 layers II and III, MPEG-2 NBC (non-backward compatible), proposals for MPEG-4 audio, Dolby AC-3 [reference: K. Brandenburg and M. Bosi, "Overview of MPEG-audio: current and future standards for low bit-rate audio coding," 99th AES Convention, New York, preprint, 4130 F1, Oct. 6–9, pp. 1–26, 1995], and AT&T PAC [reference: N. S. Jayant and E. Y. Chen, "Audio compression: technology and applications," AT&T Technical Journal, pp. 23–34, March/April 1995]. For these codecs, the bit rates for high-fidelity audio are between about 128 kbit/sec and 256 kbit/sec for a stereo signal.

The improvement in received audio quality over conventional FM-band reception brought about by the implementation of a DAB system alone may be insufficient to justify the costs associated with widespread conversion from conventional analog FM-band modulation to a DAB system. Therefore, an important characteristic of DAB systems is the ancillary data capability, which is, in general, unrelated to the digital audio signal. The ancillary data permits broadcasters to increase the range of services which are provided, beyond audio services. Currently, analog FM-band stations may transmit limited associated data services through analog FM subcarrier signals. The subcarrier signals are known as "SCA" signals because of their authorization by the Subsidiary Communication Authorization granted by the FCC. SCA signals are combined with the conventional FM audio signal matrix at baseband so that, unlike DAB, the SCA signal is a component of the transmitted FM signal. A disadvantage of SCA signals is that their bit rate throughput is relatively low, typically less than 30 kbit/sec. Furthermore, the SCA signal is susceptible to the effects of interference and distortion in the same manner that analog FM-band audio reception is degraded because demodulation of the SCA signal typically requires conventional analog FM demodulation as the first step in recovering the SCA signal. For a specific frequency deviation, the robustness brought about by the use of FM modulation diminishes as the baseband modulating frequency is increased. The baseband frequency of the SCA signals is typically somewhat less than the one-sided occupied bandwidth of the analog FM signal (e.g. SCA signals with baseband frequency offsets of 76 kHz or 92 kHz), so that the FM processing gain for the embedded SCA signal is relatively small.

For DAB, preferable characteristics of the ancillary data associated with the digital audio signal are that the recovered ancillary data signal is i) of reasonable bit rate throughput, for example, at least 64 kbit/sec, and is ii) at least as robust to the effects of interference and distortion as the remainder of the digital data (i.e. the digital audio signal) in the DAB signal. While audio compression algorithms may operate correctly with decoded bit error rates as high as $1 \times 10^{-5}$ because transient errors may not be detected by the human hearing process, ancillary data may require a much lower decoded bit error rate, typically less than $1 \times 10^{-7}$. The range of services which may be implemented with the DAB ancillary data include, but are not limited to: traffic, weather, road conditions, and emergency information; subscriber services such as paging and specialized newscasts (e.g. stock quotes); low-bit rate video and still pictures; electronic-mail and Internet broadcast; navigation; and duplex communication and electronic commerce with a return data-channel accomplished, for example, by cellular telephony.

A fundamental way to characterize a DAB system is by the method which is used to generate the RF signal at the transmitter and to determine the RF signal at the receiver. There are different RF modulation and demodulation methods which may be used to implement a DAB system. One characteristic in distinguishing between methods is whether or not the proposed DAB system implementation requires a new frequency allocation other than the existing AM and FM broadcast bands. The high-power RF signal emissions for DAB will typically be regulated by government agencies in order to mitigate RF interference. Control of the frequency allocation through specific channel frequency assignments and RF emission limits (i.e. average power or power spectrum density) prevents interference from other RF signal sources into the desired DAB signal and vice versa. Since DAB receivers are expected to be a large-scale consumer electronics application, standardized frequency allocations are also to be considered in order to develop economically viable receiver systems.

A DAB system which requires a new frequency allocation, specifically for DAB, and which is not compatible with the existing AM and/or FM bands, is known as a "new-band" system. The Eureka-147 system [reference: G. Plenge, "DAB—a new sound broadcasting system. Status of the development—routes to its introduction," (translated) *EBU Review—Technical*, No. 246, pp. 87–112, April 1991] which is being proposed by various European agencies, broadcasters, and manufactur ers, is an example of a new-band system. The minimum bandwidth for the Eureka-147 system is about 1.536 MHZ. It is not compatible with the existing FM-band broadcast radio frequency allocation, which is discussed subsequently. There are different proposals for the operating RF frequency range of the Eureka-147 system, including L-band (1.47 Gigahertz), and portions of the VHF band which are not presently occupied or occupied by a small number of existing television stations.

The Eureka-147 system is further distinguished from conventional FM-band broadcast systems by being a "single-frequency" network or SFN in its preferred embodiment. In a SFN, a wideband RF digital signal is transmitted which represents information for a plurality of stations; in other words, a multiplex of stations. According to the Eureka-147 system description, various transmitters are established which re-generate the same signal. A SFN implementation is fundamentally different from the conventional FM-band network, where stations operate independently. The coverage of a SFN network may extend for a distance which is substantially larger than the coverage of an individual statio n in a non-SFN network. A new-band SFN DAB system may be desirable in countries or geographic regions which lack an established radio broadcast infrastructure because it allows for centralization of the broadcast industry. However, such a system may have distinct disadvantages in countries, for example, the United States, where the majority of radio broadcasters are not affiliated with the government and where the stations or networks of stations operate independently and competitively.

Another disadvantage of an SFN is that it requires the allocation of significant amounts of RF bandwidth at frequencies suitable for broadcast. In the United States, for example, there is a lack of available (unused) spectrum in the frequency ranges most desirable for terrestrial DAB, which is the VHF region (30 MHZ to 300 MHZ). Operation at higher frequencies requires additional transmission sites and/or higher transmitter power because of increased propagation path attenuation of the RF signal. A SFN involves the construction of a new broadcast infrastructure of transmitters and transmitter antenna systems. This is another disadvantage to the implementation of Eureka-147 in the United States, for example, where there is a substantial pre-existing infrastructure of transmitter sites. Thus, other methods for accomplishing the goals of DAB may be desirable, which do not require a new frequency allocation and which are able to make use of the existing infrastructure.

In the United States, the analog broadcast FM-band is the frequency region between 88.9 MHZ and 107.9 MHZ, inclusive. The region is subdivided into a plurality of one-hundred and one (101) channels (known as channels 200 to 300, inclusive) with a 200 kHz frequency spacing between adjacent channels. A radio station emits a RF signal, which is modulated with analog frequency-modulation (FM) with certain limitations on the permitted frequency deviation, and which is nominally centered (i.e. without modulation) about the allocation frequency (e.g. 90.9 MHZ which is channel 210). The RF signal emissions are required to comply with an emissions "mask". The mask is a power spectrum density envelope. The maximum emitted power varies as a function of the frequency offset from the nominal allocation center frequency. In other words, the emission mask determines the maximum power which may be emitted at a specific frequency (emission), for each frequency within the channel allocation. The signal emitted by the analog FM-band transmitter typically does not substantially exceed the mask frequency-envelope. The mask characteristics are determined by the FCC in the United States.

Prior art FIG. 1 is a graphic representation of the RF emission mask for analog FM-band radio broadcast, according to the FCC Rules and Regulations, Part 73.317. The limit on RF emissions is shown on a graph whose abscissa values are the frequency of the emission and whose ordinate values are the minimum required decibel attenuation, relative to a known power reference. The FM-band station center frequency is indicated by vertical line 1. The power spectrum density associated with the emission mask, as a function of frequency, is the irregular shape indicated by bold line 3. The emission mask limits given by 3 are divided into various regions. Frequency range 5 spans a two-sided bandwidth of 240 kHz about center-frequency 1. Analog FM-band signal 7 is substantially confined to frequency range 5 and hence a FM-band signal is known to have a "occupied bandwidth" of approximately 240 kHz. The FCC mask limits RF emissions (i.e. discrete components of the transmitted RF signal) in frequency region 5 to a power level no larger than zero (0) decibels, referenced to the transmitter's licensed emitted power. In other words, an emission in region 5 may be as large as the licensed power. The actual emitted RF power is a function of the transmitter power and the characteristics of the antenna and coupling system.

Frequency region 9 begins at a 120 kHz offset from either side of center frequency 1 and continues to an offset of 120 kHz. The total width of region 9 is 240 kHz. Region 9 and region 5 are disjoint and adjacent. In region 9, the emitted RF signal is required to be attenuated by at least twenty-five (25) decibels relative to the licensed power. There are further frequency regions which extend beyond region 9 in the definition of the emission mask according to FCC Rules and Regulations 73.317, but the maximum emission power limit is very small, attenuated by substantially more than 25 decibels. A RF DAB signal whose spectrum is confined within the very low power regions (<<−25 dBc) would not have a wide geographic broadcast coverage. The additional regions are specified so that an operating FM-band station is required to have sufficient bandpass filtering at the transmitter to remove the high-order sidebands generated by nonlinear FM modulation, which might otherwise spill-over into the frequency region occupied by an adjacent analog FM-band station.

Analog FM-band signal 7 typically does not occupy all of the available spectrum provided by emission mask 3 in regions 5 and 9 together. Thus, an additional signal may be generated in this region, which is possibly independent of the analog FM-band signal. For example, the generated signal may be a digital communication signal for DAB. The occupied bandwidth of analog FM-band signal 7 is about 240 kHz, extending 120 kHz from the center frequency. Thus, the DAB signal may be generated to approximately surround the analog FM-band signal in the remaining unoccupied portions (11 and 13) of regions 5 and 9. These regions are known as the "upper sideband" and "lower sideband".

Upper sideband 11 is the frequency region between about 100 kHz and 200 kHz higher than center frequency 1. Lower sideband 13 is the frequency region between about 100 kHz and 200 kHz lower than center frequency 1. The frequencies of the edges of the upper and lower sidebands are approximate because the actual occupied bandwidth of the analog FM-band signal varies as the FM baseband signal changes and varies according to whether SCA transmissions are also present, which may differ from station to station. A DAB signal which is generated in upper sideband 11 and/or lower sideband 13 and which is restricted in power to substantially comply with RF emission mask 3 is known as an "In-band On-channel" (IBOC) DAB signal [reference: N. S. Jayant, et. al., ibid.]. "In-band" refers to generation of the DAB signal in the conventional FM-band of frequencies, and "On-channel" refers the co-existence of the conventional analog FM-band signal and the DAB signal within the conventional FM-band FCC emission mask, and not necessarily the 200 kHz allocation increment.

The FCC RF emission mask specifies limits on discrete emissions; in other words, the mask specifies the maximum "power spectrum density" (PSD) envelope as a function of frequency. In general, it is difficult to determine compliance with a discrete emission mask limit over an arbitrarily narrow bandwidth, since in certain circumstances, the amount of apparent power may decrease as the measurement bandwidth is made more narrow. To measure an emission for PSD compliance, it is generally necessary to specify the bandwidth in which the emission is measured (i.e. the "resolution" bandwidth). Unfortunately, this characteristic is ambiguous in the existing analog FM-band emission mask definition. The ambiguity is not problematic for the measurement of conventional analog FM-band emissions because the decibel ratio measured between the power of the discrete emission relative to the total power is approximately independent of the resolution bandwidth. However, the IBOC DAB signal which may be generated in sidebands 11 and 13 is unrelated to the analog FM-band signal and is typically not generated with conventional analog frequency modulation. As a result, the PSD ratio measured between the IBOC DAB signal power and the analog FM-band signal power depends upon the resolution bandwidth. As a result, IBOC DAB systems may generate a digital signal which generally follows RF emission mask 3, but which may not precisely comply with the emissions limit, depending upon how the emissions are measured.

The purpose of the RF emission mask is to ensure that the transmitted analog FM-band signal is confined in both signal bandwidth and signal power so that the presence of nearby FM-band transmitters with similar frequencies will not cause excessive inter-station interference. For IBOC DAB, though, there are other considerations which may constrain the practical IBOC DAB signal bandwidth more severely than the analog FM-band RF emission mask. For example, the second-adjacent channel interference circumstance, discussed subsequently, limits the maximum frequency offset of the outer edges of the IBOC DAB signal in sidebands 11 and 13 relative to center frequency 1. Similarly, the maximum power level of the IBOC DAB signal in sidebands 11 and 13 is limited by the amount of noise that can be tolerated in the reception of the conventional analog FM-band signal. The presence of the DAB signal typically causes an increase in the noise level determined in the FM-band receiver because of the close proximity of sidebands 11 and 13 to analog FM-band signal 7. The amount of noise is primarily determined by the intermediate frequency (IF) bandwidth of the bandpass filter implemented in the analog FM-band receiver.

The primary advantages of IBOC DAB when compared to a new-band DAB system, such as Eureka-147, is that an IBOC DAB system i) does not require a new frequency allocation, ii) makes use of the existing independent broadcast infrastructure, and iii) facilitates a gradual migration from conventional analog FM-band broadcast towards an all digital broadcast radio system. In prior art FIG. 1, upper 11 and lower 13 sidebands do not significantly overlap with the frequency range occupied by analog FM-band signal 7. The sidebands are a desirable frequency range for the IBOC DAB signal. When the IBOC DAB signal and analog FM-band signal overlap significantly, then the presence of the IBOC DAB signal may cause significant amounts of noise in the reception of the analog FM-band signal and vice versa. For example, the presence of the IBOC DAB signal may be noticeable in the recovered analog FM-band signal as an increase in the level of background noise. On the other hand, the amount of power in analog FM-band signal 7 is typically substantially larger than the total IBOC DAB signal RMS power, by between 12 and 30 decibels, for example. Then, even when there is relatively little frequency overlap, the disparity in analog FM and IBOC DAB signal power may cause failure of the IBOC DAB signal receiver because of the large amounts of interference caused by the analog FM-band signal.

In the IBOC DAB method and system described by Hunsinger, et. al., in U.S. Pat. No. 5,465,396, the IBOC DAB signal bandwidth substantially overlaps that of the analog FM-band signal. The IBOC DAB signal is generated so that it is phase-orthogonal (quadrature) with respect to the instantaneous carrier frequency of the analog FM-band signal at the transmitter. In order to be orthogonal to the phase-modulated signal, the DAB signal is generated by amplitude modulation of the FM signal (AM, but unrelated to AM-band broadcast radio), and hence the term "AM-over-FM" modulation in the '396 patent. Phase-orthogonal signals may overlap in frequency and yet not cause interference with one another in the respective signal receivers under certain circumstances. However, phase-orthogonal signals are typically very sensitive to the effects of multipath and frequency-selective distortion. In multipath, the phases of the echo signals are typically unrelated to the phase of the line-of-sight signal, so that the echo signals and the LOS signal are not phase-orthogonal. Similarly, in frequency selective distortion, the signal phase-derivative varies as a function of frequency at the receiver so that phase-orthogonality may not be maintained for certain frequency components of the transmitted signal. As a result, IBOC DAB systems such as that described in the '396 patent, which rely substantially on phase-orthogonality in order to prevent interference between the IBOC DAB signal and the analog FM-band signal, may not perform well in mobile reception environments, where multipath is present. The '396 system is sensitive to even small amounts of distortion in the phase-orthogonality property between the IBOC DAB signal and the analog FM-band signal because of the power disparity between the signals.

In general, it is preferable for the IBOC DAB signal to be situated away from those portions of the analog FM-band signal with the most power, which are located near center frequency 1 of the allocation, which is why it is desirable to generate the IBOC DAB signal in sidebands 11 and/or 13, which surround the analog FM-band signal but which are also approximately frequency-orthogonal. Frequency-orthogonal signals are typically disturbed significantly less than phase-orthogonal signals by the analog FM-band signal because the analog FM-band signal may be substantially eliminated by bandpass filtering. Even when there is some amount of separation in the frequency regions nominally occupied by the analog FM-band signal and the IBOC DAB signal, the nonlinear characteristic of analog FM modulation may cause short-duration (i.e. transient) interference as the high-order Bessel function harmonics associated with the analog FM signal may occupy portions of sideband regions 11 and 13 temporarily, especially when the analog FM-band signal is heavily modulated.

The potential for mutual interference between the analog FM-band signal and the IBOC DAB signal limits how close the inner band-edges of the IBOC DAB signal in sidebands 11 and 13 may be situated to the analog FM-band signal when the signals are unrelated in phase (i.e. not quadrature). Typically, the closest practical inner-band edge, in other words, the edge which is closest to analog FM-band signal 7, for both upper sideband 11 and lower sideband 13 of the DAB signal is between about 80 kHz and about 120 kHz away from analog FM-band center frequency 1. The RF emission mask 3 constraint on the outer band-edges, which are the edges furthest away from center frequency 1, is about 240 kHz for both sidebands. However, the potential for inter-station interference, particularly in urban areas where there are many analog FM-band transmitters, results in a more restrictive constraint (i.e. less bandwidth) on the sideband outer band-edges. The possible second-adjacent allocation interference condition, described subsequently, requires that the outer edge of the IBOC DAB signal in sidebands 11 and 13 be no more than about 180 kHz to 220 kHz away from center frequency 1 so that the total bandwidth occupied by the analog FM-band signal and IBOC DAB signal together is no more than about 400 kHz.

In order to understand the effect of inter-station interference on an IBOC DAB system, it is relevant to first consider the circumstance with conventional analog FM-band broadcasting and then determine the relationship between the analog FM-band and IBOC DAB interference parameters. The reception of the signal for analog FM-band broadcast radio stations is degraded by interference from other FM-band stations, whether or not there is a simultaneously transmitted IBOC DAB signal. The amount of received energy which corresponds to signals from other FM-band transmitters may be considerably greater than the amount of background (i.e. non-broadcast) noise. In this circumstance, adequate signal reception may be interference-limited and not noise-limited. The RF signal emitted by an analog FM-band transmitter is, in general, unrelated to the RF signal emitted by another analog FM-band transmitter because the conventional analog FM-band radio infrastructure is not a synchronized SFN such as Eureka-147. The FCC RF emission mask limits the occupied bandwidth and power which may be transmitted. However, restrictions on the occupied bandwidth of the FM-band signal do not provide adequate protection against interference in the circumstance where there are other (interfering) analog FM-band transmitters with the same nominal channel allocation frequency. Therefore, there are additional regulations, which are also determined by the FCC in the United States, that place restrictions on the geographic location of the RF signal transmission sites and configurations (e.g. antenna height). Thus, the regulatory efforts of the FCC act to coordinate the transmission of the RF signals in the analog FM-band in order to limit the amount of interference amongst the transmitted signals through limitations on signal power and bandwidth and by using geographic isolation. In rural areas, for example, there may be only a small number of radio stations (and hence transmitters). Ample frequency ranges in the analog FM-band may exist which would permit the IBOC DAB signal sideband outer band edge to extend substantially beyond 200 kHz away from center frequency 1. However, in urban areas, there may be significant congestion in the analog FM-band due to the presence of a large number of stations.

In the United States, a substantial source of revenue for broadcasters is derived from advertising. Thus, it is desirable for an FM-band station to have a large potential listener audience. The potential size of the listener audience is determined primarily by the transmitter power, the antenna system, and the population density about the transmitter site and to a lesser extent by terrain characteristics. In most circumstances, it is desirable that the FM-band signal be of a sufficient strength over a wide geographic area so that adequate reception of the FM-band signal is possible with a conventional FM-band receiver (e.g. automobile receiver with a vehicle-mounted whip antenna). Various methods are used in the broadcast industry to specify the FM-band signal strength over varying geographic areas. For example, contour maps are used to indicate approximately isotropic RF field-strength curves. The "coverage" of an analog FM-band station may be defined as the furthest contour (most distant from the transmitter) at which reasonable reception is probable, as determined by the expected average received signal field strength. In general, it is not practical to map precise field-strength contours because of local variations in received RF field strength due to anomalies in the RF propagation characteristics, variations in terrain, buildings, and so on, as well as variations in receiver performance. Field strength contours are typically expressed in probabilistic terms. For example, the "50/10" contour is a hypothetical boundary, situated around the transmitter site, at which at least fifty (50) percent of the locations are expected to have "adequate" received RF signal strength for at least ten (10) percent of the time. The coverage of an analog FM-band transmitter is defined as the geographic area within the "50/50" contour; in other words, the field strength contour at which fifty-percent of the locations will have sufficient field strength for fifty-percent of the time. A goal of IBOC DAB is to have a digital signal coverage characteristic which is not significantly less than the coverage of the corresponding analog FM-band transmitter despite the fact that the IBOC DAB signal is transmitted at an RMS power level which is significantly less than the corresponding analog FM-band signal. This is possible because the IBOC DAB signal receiver typically exhibits good receiver performance at a smaller signal-to-noise ratio (SNR) when compared to an analog FM-band receiver.

For a specific transmitter power and antenna system, the coverage of an analog FM-band station is primarily determined by the characteristic attenuation of RF propagation. As the distance from the transmitter to the receiver increases, the received RF field strength decreases. At some distance from the transmitter, the field strength becomes insufficient for reasonable continuous reception. When the reception is limited by thermal noise in the implementation of the receiver, then a more complex receiver implementation with a smaller "noise-figure" (NF) may extend coverage. However, when the reception is limited by interference, a receiver with a smaller noise-figure may have no effect on the coverage. The realized coverage is further compromised when compared to ideal free-space propagation by the presence of obstacles situated between or about the transmitter and the receiver, which may obscure the line-of-sight (LOS) propagation path and/or cause additional RF signal reflections. Then, the effects of multipath propagation (signal echoes) may cause further attenuation in the received signal due to destructive interference between paths with varying phases, amplitudes, and delays.

In addition to the attenuation characteristics of free-space propagation, with and/or without multipath, the received RF signal is degraded by the presence of other RF sources with similar frequencies, for example, signals from other FM-band transmitters. The effects of inter-station interference from other transmitters may cause significant distortion in the desired received signal at distances which are relatively close to the desired station's transmitter. Thus, the coverage characteristic of an FM-band station may be determined more by the physical proximity between FM-band transmitters than by the effects of background noise at greater distances, in certain circumstances. In general, the most severe potential for inter-station interference for conventional analog FM-band stations is caused in allocation circumstances known as "co-channel", "first-adjacent channel", and "second-adjacent channel".

The co-channel circumstance occurs when analog FM-band stations have the same allocation frequency. Thus, the emitted signals overlap one another substantially and frequency-specific bandpass filtering in the receiver is ineffective in separating the signals. As a result, co-channel station transmitters are required by FCC regulations to be separated by a substantial geographic distance. The minimum required separation depends upon the relative emitted signal powers of the stations. For example, in the United States, FCC class "B" transmitters, having radiated powers of up to 50 kW at a 500 foot antenna height, are to be separated by at least 150 miles. The degree to which signals from transmitters may interfere with one another is expressed by the decibel ratio between the desired signal's field strength magnitude and the undesired signal's field strength magnitude, which is known as the "D/U" ratio. The D/U ratio is essentially a measure of receiver SNR in a interference-limited circumstance over a bandwidth which includes both the desired and undesired signals. In most cases, only the geographically closest transmitters for the particular channel allocation circumstance need to be considered. The linear value of the numerator "D" in the D/U ratio is determined by the desired signal's field strength (milliVolts/meter) at the 50/50 field strength coverage contour. The linear value of the denominator "U" in the D/U ratio is the undesired signals' field strength. The undesired signal's linear amplitude is typically determined at the 50/10 field strength contour of the interfering station transmitter. The FCC Rules and Regulations require that the transmitters' effective radiated power and geographic separation be such that the D/U ratio for co-channel interference is at least +20 decibels (dB), which means that the desired signal field strength linear magnitude is at least ten (10) times as large as the undesired field strength linear magnitude at the 50/50 contour for the desired signal's transmitter.

The IBOC DAB signal represents an encoded digital audio signal, together with ancillary data. As a result, the bit error rate determined at the IBOC DAB receiver after error correction code (ECC) decoding must be relatively small for proper operation of the receiver system, for example, less than $1\times10^{-5}$. Digital communication systems have the advantage, when compared to analog communication systems, that the addition of information redundancy through ECC encoding facilitates the recovery of the signal at the receiver with a very low error rate, even when the signal-to-noise ratio (SNR) is relatively small. At reasonable bit densities (typically less than or equal to about 3 bits/sec/ Hz), the required SNR is significantly less than the 20 dB, typically less than about 15 dB. In the co-channel interference condition, the primary source of interference in a received IBOC DAB signal from the co-channel station is not the analog FM-band signal, but the possible IBOC DAB signal which may be generated by the interfering station. The co-channel analog FM-band signal is approximately frequency-orthogonal to the IBOC DAB signal and so it is substantially mitigated, together with the corresponding on-channel analog FM-band signal associated with the desired IBOC DAB signal, by bandpass and/or notch filtering in the IBOC DAB receiver. However, the IBOC DAB signal which may be generated by the co-channel transmitter substantially overlaps the desired IBOC DAB signal in frequency. The ratio of the desired IBOC DAB signal power to the undesired IBOC DAB signal power is the same as that for the analog FM-band circumstances; in other words, the IBOC DAB signal D/U for co-channel allocations is at least 20 dB because the power ratio between the analog FM-band signals and the IBOC DAB signals follow. Therefore, the existing protection ratios established for the analog FM-band co-channel circumstance are more than sufficient for the IBOC DAB signal. As a result, the coverage of the transmitted IBOC DAB signal is not degraded relative to the coverage of the analog FM-band signal due to co-channel interference. On the basis of IBOC DAB D/U ratios alone (in other words, when ignoring the analog FM-band signals), co-channel IBOC DAB transmitters could be situated closer geographically than is presently allowed by the FCC Rules and Regulations for analog FM-band transmitters without causing undue interference.

The first-adjacent circumstance occurs when analog FM-band transmitters differ in allocation frequency by plus one or minus one channel allocations (i.e. ±200 kHz). When considering the interference-limited coverage of a specific analog FM-band transmitter, there may be i) one dominant source of first-adjacent interference at either a positive 200 kHz frequency offset or a negative 200 kHz frequency offset from the desired signals' center frequency, or ii) two comparable interference sources at both positive and negative offsets of 200 kHz. The occupied bandwidth of an analog FM-band signal is about 240 kHz, which exceeds the allocation frequency increment. Thus, in a first-adjacent circumstance, there may be some frequency overlap between the desired analog FM-band signal and the interfering analog FM-band signal, particularly when the audio signals are heavily modulated (i.e. causing wide frequency deviation). However, frequency-specific bandpass filtering with a very narrow IF bandwidth (typically less than 200 kHz) is reasonably effective in separating the desired signal from the undesired signal. The disadvantage of narrow bandpass filtering in the analog FM-band receiver is that it causes some distortion in the recovered analog audio signal due to i) the difficulty in implementing high-frequency bandpass filters with steep transition bandwidths while simultaneously preserving good phase and amplitude linearity and because ii) the attenuation of the higher-order nonlinear FM harmonics by the narrow bandwidth filter deleteriously affects the high-frequency response of the FM signal demodulator. For vehicle FM-band receivers, the disadvantages of a narrow bandwidth filter are typically less important than the advantages of a narrow bandwidth filter in combating both the effects of interference and noise. With a narrow bandpass filter less than about 200 kHz wide, the analog FM-band signals in the first-adjacent circumstance are approximately frequency-orthogonal. The FCC Rules and Regulations allow for a relatively high level of first-adjacent interference, with the presumption that the analog FM-band receiver will be implemented with sufficient filtering. The allowable D/U ratio for the first-adjacent circumstance is only +6 dB. In other words, at the 50/50 coverage contour of the desired signal's transmitter, the field strength linear magnitude from the first adjacent interference source(s) may be as large as one-half (½) of the field strength linear magnitude of the desired signal. This low D/U ratio for first-adjacent interferers does not afford ample protection even for the analog FM-band signal in certain circumstances, for example, when multipath effects become significant.

The first-adjacent interference condition is a difficult problem for an IBOC DAB system design to overcome because the IBOC DAB signal, which occupies upper and lower sidebands 11 and 13, may significantly overlap the frequency range occupied by the interfering analog FM-band signal, while also having significantly less power than the interfering signal. Then, although the analog FM-band signals are approximately frequency-orthogonal, one of the sidebands of the desired IBOC DAB signal may be substantially disturbed by the interfering analog FM-band signal so that reliable digital demodulation is not possible. The effect is to significantly limit the coverage of the IBOC DAB signal in the direction towards the first-adjacent interfering transmitter.

The second-adjacent interference circumstance occurs when the channel allocation frequencies differ by two channel allocations, namely, 400 kHz. With respect to the center frequency of the desired signal, the dominant source of second-adjacent interference may be a transmitter at a positive frequency offset of 400 kHz or a negative frequency offset of 400 kHz or by transmitters at both positive and negative 400 kHz frequency offsets. In the second-adjacent circumstance, there is no significant frequency overlap between the analog FM-band signals because the occupied bandwidth of each of the analog FM-band signals is substantially less than 400 kHz. As a result, the permissible D/U ratio is very low, −20 dB. The negative decibel D/U ratio indicates that the field strength linear magnitude of the undesired signal may actually exceed the field strength linear magnitude of the desired signal by a factor of ten (10) at the edge of coverage of the desired signal. This is usually not a significant problem in the reception of analog FM-band signals because bandpass filters with a high "Q-factor" (typically implemented in the FM receiver at an IF of about 10.7 MHZ) substantially attenuate the frequency components which correspond to the possible second-adjacent interference sources. However, due to the potentially large field strength of the secondadjacent source when compared to the desired signal field strength, intermodulation distortion (IMD) due to nonlinearities in the implementation of the RF tuner and other components may cause degradation of the received signal.

The second-adjacent circumstance is a much more important factor in the design of the digital signals for IBOC DAB than for analog FM-band signals because the possibility for interference limits the practical outer band-edges of the IBOC DAB signal upper and lower sidebands to be no more than about 200 kHz away from the analog FM-band center frequency.

There are other interference circumstances which arise where the frequency offsets between interfering transmitters are at least 600 kHz apart (i.e. at least three 200 kHz allocations). The cause of distortion in the desired received signal in these circumstances is due substantially to intermodulation distortion for both analog FM-band reception and IBOC DAB reception. Since the bandwidth of the IBOC DAB signal together with the analog FM-band signal is no more than about 400 kHz, signals from transmitters separated by 600 kHz or more will not affect one another in the receiver when filtered adequately, except for intermodulation distortion in, for example, the RF tuner. The interference conditions beyound second-adjacent do not significantly impact the design of an IBOC DAB signal.

The plethora of possible interference conditions is further complicated by the existence of older analog FM-band broadcast station transmitters which may have been established prior to the adoption by the FCC of certain interference-limiting regulations. In certain circumstances, these stations may be subject to "grand-fathering", which allows for non-compliance with some regulations. As a result, the amounts of interference may exceed the FCC limits, described previously, so that the measured D/U ratios are worse (i.e. are lower-valued) than the nominal conditions. In other words, operating analog FM-band transmitters may be geographically located closer to one-another than would be allowed by the present regulations, which is known as a "short-spacing" circumst ance. For analog FM-band reception, the most serious potential for degradation occurs with short-spaced co-channel and first-adjacent transmitters.

Although analog FM-band signals and IBOC DAB signals are both deleteriously affected by interchannel interference due to the co-channel, first-adjacent and second-adjacent circumstances, the cause of the interference and the magnitude of the problem created by the interference differs considerably. With reference to prior art FIG. 2, analog FM-band channel center-frequency 1 and analog FM-band signal 7 are as in FIG. 1. The IBOC DAB signal occupies both upper sideband region 11 and lower sideband region 13, situated at positive and negative frequency offsets between about 100 kHz and about 200 kHz away from analog FM-band center frequency 1, which is designated $f_c$. The possible first-adjacent transmitted signal in FIG. 2 has analog FM-band channel center-frequency 15, which is shown with a positive 200 kHz offset in frequency compared to center-frequency 1, i.e. $f_c$+200 kHz. As described previously, it is also possible for first-adjacent interference to exist at a negative 200 kHz frequency offset from center-frequency 1, or simultaneously at both positive and negative 200 kHz frequency offsets. However, the most severe first-adjacent interference, in other words, where the D/U ratios may be +6 dB, typically occurs on only one side of center-frequency 1 at once; at either a positive 200 kHz offset or a negative 200 kHz offset, but not both at once. The drawing of dominant first-adjacent interference with a positive frequency offset in FIG. 2 is arbitrary. The circumstance where the dominant interference has a negative frequency offset causes similar interference amounts, except affecting the other sideband.

The permissible analog FM-band interference D/U ratio for first-adjacent interference is only +6 dB. The IBOC DAB signal is typically lower in power than the corresponding analog FM-band signal by between 12 and 30 decibels. In the receiver, the desired and undesired signals are received simultaneously. Thus, first-adjacent analog FM-band signal 17 with first-adjacent center-frequency 15 may significantly occlude upper sideband 11, which is where the desired IBOC DAB signal is presumed to exist. The degree of overlap between analog FM-band signal 17 and IBOC DAB upper sideband 11 is far more significant than the possible overlap between analog FM-band signal 17 and analog FM-band signal 7. The analog FM-band D/U ratio is shown as the difference 19 in received signal unmodulated powers. The D/U ratio in FIG. 2 does not correspond to the worst-case +6 dB D/U ratio. Ratio 19 is meant to be a representation of a first-adjacent circumstance which causes significant IBOC DAB interference and may actually correspond to a D/U ratio substantially greater than +6 dB, and so does not reflect the worst case scenario.

An analog FM-band receiver may operate adequately even when the D/U ratio is as low as +6 dB when the receiver implementation has a sufficiently narrow bandpass filter, as described previously. However, upper IBOC DAB signal sideband 11 is substantially disturbed by the interfering analog FM-band signal 17, and an IBOC DAB receiver which requires that sideband 11 be demodulated and the encoded data determined with a relatively low error rate may not operate properly because of the low effective signal-to-noise ratio (where the noise is the interference signal). As a result, the effective coverage of the IBOC DAB signal may be significantly reduced due to first adjacent interference when compared to the coverage of the corresponding analog-band FM signal, which is undesirable. A prior art IBOC DAB system which requires demodulation of signals which are located in both the upper and lower sidebands around the analog FM-band signal is described in U.S. Pat. No. 5,465,396 to Hunsinger, et. al. Certain other IBOC DAB systems, discussed subsequently, which have been tested by the Electronic Industries Association, also demodulate both sidebands together or demodulate upper and lower sidebands with unrelated source bit information.

Although not shown in prior art FIG. 2, the first-adjacent transmitter may also generate a IBOC DAB signal in addition to the analog FM-band signal. However, the first-adjacent IBOC DAB signal does not significantly affect the desired IBOC DAB signal. Only one of the two IBOC DAB signal sidebands corresponding to the first-adjacent interference source may cause interference (the lower sideband of the interfering transmitter in FIG. 2) because the other sideband is in a substantially different region of frequencies; in other words, significant amounts of interference may only be generated by the interfering IBOC DAB signal sideband (either upper or lower, not both) whichever is closest in frequency to the desired signal. Furthermore, the IBOC DAB signal sideband for the first-adjacent interference source does not significantly overlap the desired IBOC DAB signal sideband in frequency.

For prior art FIG. 2, the lower first-adjacent IBOC DAB sideband (not shown) is situated at a frequency offset between 100 kHz and 200 kHz less than first-adjacent center frequency 15. With respect to center frequency 1, this correspond to an effective offset of between 0 kHz and 100 kHz, which is the region where analog FM-band signal 7 is located and not the IBOC DAB signal. Thus, while the first-adjacent analog FM-band signal is a source of interference to the desired IBOC DAB signal, the first-adjacent IBOC DAB signal is only a source of interference to the desired analog FM-band signal. The interference caused by the first-adjacent IBOC DAB signal to the desired analog FM-band signal is typically not a substantial problem because the IBOC DAB signal power is substantially less than the analog FM-band signal power. For example, when the IBOC DAB power for the first-adjacent interference source is twelve (12) decibels lower than the corresponding analog FM-band power, and since only one of the IBOC DAB sidebands overlaps the desired FM-band signal (which corresponds to a 3 dB reduction in interference power relative to the total IBOC DAB power), the interfering IBOC DAB power will be at least 21 decibels below the desired analog FM-band signal power when the analog FM-band first-adjacent D/U ratio is +6 dB at the edge of the desired signal's coverage. Thus, the analog FM-band interference caused by the first-adjacent IBOC DAB signal is similar to the co-channel circumstance permitted between analog FM-band signals.

Unfortunately, the first-adjacent circumstance causes substantially more interference in the reception of the desired IBOC DAB signal than the desired analog FM-band signal. It is difficult to design an IBOC DAB system which overcomes the high-level of interference that may be created by the worst-case first-adjacent situation. The overwhelming amount of interference is caused by the first-adjacent analog FM-band signal, and not the first-adjacent IBOC DAB signal.

It is a goal of IBOC DAB to supplant the existing network of analog FM-band transmitters over a period of time. As analog FM-band transmitters are turned off or reduced in power, the problems created by first-adjacent interference will diminish. However, during the initial deployment of IBOC DAB, first-adjacent interference will be a serious problem because of the large number of pre-existing analog FM-band transmitters.

Prior art FIG. 3 shows the circumstance where there is second-adjacent interference. It is more likely that there are two significant sources of second-adjacent interference than two significant sources of first-adjacent interference at once because of the greater frequency separation for second-adjacent interference, which allows for a reduction in the physical distance between transmitters. For example, the minimum distance between second-adjacent transmitters is only 40 miles for class B analog FM-band stations, which is substantially less than the required 150 mile separation for first-adjacent class B stations. FIG. 3 is a representation of the interference condition which may be present when there are second-adjacent transmitters located at both a positive 400 kHz frequency offset and a negative 400 kHz frequency offset from center-frequency 1; in other words, interfering analog FM-band signals with center frequency 21, which is $f_c$+400 kHz, and center frequency 23, which is $f_c$−400 kHz. The D/U ratios are shown as ratio 25 for the upper (positive offset) second-adjacent interference and ratio 27 for the lower (negative offset) second-adjacent interference. In the second-adjacent circumstance, there is no significant overlap in frequency between analog FM-band signal 7 and upper second-adjacent analog FM-band signal 29 or between analog FM-band signal 7 and lower second-adjacent analog FM-band signal 31. The permissible D/U ratio for second-adjacent interference, with respect to the desired signal with center-frequency 1, is −20 dB so that analog FM-band signals 29 and 31 may have substantially more power than analog FM-band signal 7, determined at the receiver. The larger field strength of the second-adjacent signal(s) when compared to the desired station signal is typically not a significant problem for analog FM-band reception because of the bandpass filtering implemented in the FM-band receiver except for intermodulation distortion, which was described previously.

Although the second-adjacent circumstance does not significantly impact the analog FM-band signal, it is a vital consideration in the design of an IBOC DAB signal. In particular, the potential for second-adjacent interference, as shown in prior art FIG. 3, determines the practical outer edges for IBOC DAB signal sidebands 11 and 13. When IBOC DAB is fully deployed, each analog FM-band transmitter will most likely have a corresponding IBOC DAB transmitter, which generates the IBOC DAB signal. When the IBOC DAB signal occupies the upper and lower sidebands around the analog FM-band signal, only one of the sidebands for each of the two possible interference sources may generate significant amounts of interference for second-adjacent allocations. In particular, the IBOC DAB signal in lower sideband 33 of the upper second-adjacent interference with center frequency 21 and the IBOC DAB signal in upper sideband 35 of the lower second-adjacent interference with center frequency 23 may cause interference to the desired IBOC DAB signal in sidebands 11 and 13 (i.e. sideband 35 may interfere with sideband 13, and sideband 33 may interfere with sideband 11).

It is presumed that the shape of the power spectrum envelope of the IBOC DAB signal is about the same for all IBOC DAB transmitters, except for differences in center frequency and transient differences due to specific data patterns. The interfering IBOC DAB signals in sidebands 33 and 35 may be substantially larger than the desired IBOC DAB signal in sidebands 11 and 13 because of the low-valued D/U ratio of −20 dB. In order to prevent excessive amounts of interference, the outer edge of the IBOC DAB signal sidebands 11 and 13 should not exceed a frequency offset of about 200 kHz away from center frequency 1. Then, the outer edge of interfering sideband 35 is approximately adjacent to the outer edge of desired lower sideband 13. Similarly, the outer edge of interfering sideband 33 is approximately adjacent to the outer edge of desired upper sideband 11. In this circumstance, although sidebands 11 and 13 may be surrounded by substantial sources of interference (sideband 33 and sideband 35, respectively), the interfering signals are still approximately frequency-orthogonal and may be separated from the desired sideband signals by bandpass filtering.

The drawing of sidebands 11, 13, 33, and 35 as having a rectangular frequency spectrum in FIG. 1–3 is idealized. It is not practical to implement signals whose spectrum envelope is perfectly rectangular. In general, there may be a small amount of overlap in frequencies between sidebands 13 and 35 and between sidebands 11 and 33 without causing significant degradation of the desired IBOC DAB signal receiver performance (which demodulates sidebands 11 and 13). The amount of frequency overlap that may exist without causing an excessive bit error rate, determined at the receiver, depends upon the method of modulation which is used to generate the IBOC DAB signal in the sidebands. In general, the method of modulation should be optimized together with the shape of the IBOC DAB signal so that the received IBOC DAB signal in the worst-case expected second-adjacent interference circumstance does not cause failure of the IBOC DAB signal receiver. When narrowband modulation methods are used to generate the IBOC DAB signal in the sidebands, for example, "Coded Orthogonal Frequency Division Multiplexing" (COFDM, a.k.a. OFDM, DMT) [reference: W. Y. Zou and Y. Wu, "COFDM: an overview," *IEEE Transactions on Broadcasting*, Vol. 41, No. 1, pp. 1–8, March 1995], then the outer edge of the IBOC DAB sidebands is less than about 200 kHz because the outer narrowband subcarrier signals may be substantially occluded even when the amount of frequency overlap is small. However, when wideband modulation methods are used to the implement the IBOC DAB signal, for example, "spread-spectrum" modulation [reference: R. L. Pickholtz, D. L. Schilling, and L. B. Milstein, "Theory of spread-spectrum communications—a tutorial," *IEEE Transactions on Communications*, Vol. 30, No. 5, pp. 855–884, May 1982], then there may be a greater amount of frequency-overlap. Because of the small D/U ratios that are possible for second-adjacent interference, it is important that the "shape-factor" of the IBOC DAB signal be relatively small (i.e. closer to 1 than 2), so that the increase in attenuation at the edges of the IBOC DAB signal sidebands is relatively steep. The IBOC DAB signals which may exist in second-adjacent interference sidebands 33 and 35 typically do not significantly degrade the performance of the receiver for analog FM-band signal 7 because the interfering sidebands are frequency-orthogonal to analog signal 7 and so are substantially attenuated by the IF bandpass filter in the analog FM-band receiver. However, the interfering IBOC DAB sidebands 33 and 35 in the second-adjacent circumstance may cause an increase in the noise level determined in the analog FM-band receiver when the IF bandpass filter is not sufficiently narrow.

During initial deployment of IBOC DAB systems, second-adjacent interference may not be a concern because there will be relatively few analog FM-band transmitters equipped with corresponding transmitters for IBOC DAB signals. This is in contrast to the first-adjacent circumstance, where the large number of pre-existing analog FM-band transmitters may cause significant amounts of interference even upon initial deployment. However, as IBOC DAB systems are more fully deployed to eventually replace analog FM-band systems, second-adjacent interference becomes an important consideration. While attenuating or turning off the analog FM-band signals will substantially diminish the first-adjacent problem in the long-term, the elimination of the analog FM-band signal has no effect on the primary source of second-adjacent interference on the IBOC DAB signal, which is another IBOC DAB signal. When considering the performance of the receiver for the desired IBOC DAB signal, the most severe first-adjacent interference is caused by the first-adjacent analog FM-band signal, and not by the first-adjacent IBOC DAB signal, while the most severe second-adjacent interference is caused by the second-adjacent IBOC DAB signal, and not by the second-adjacent analog FM-band signal.

The deleterious effects of co-channel, first-adjacent, and second-adjacent interference may be present even when there is line-of-sight (LOS) propagation between the transmitter and receiver. However, in many circumstances, particularly when the receiver is mobile, as in a vehicle, multipath propagation may also cause substantial distortion in the received signal. Multipath propagation arises when the LOS propagation path is occluded or when there are strong specular reflectors, which generate echo signals with large amplitudes. As described previously, multipath is generally frequency-selective; the effects vary with frequency. The frequency components which make up the transmitted signal may be altered with varying effects on the amplitude, phase, and delay, which causes distortion in the received signal. For example, multipath propagation may cause the occurrence of narrowband "notches", which are approximate transmission zeroes in the RF channel frequency response. Frequency components of the analog FM-band signal and/or IBOC DAB signal near the notch frequency may be substantially attenuated. The attenuation depth and frequency width of the notches depend upon the echo delay and amplitude characteristics. When the difference in the times-of-arrival of the various received signals is small compared to the reciprocal of the bandwidth of the transmitted signal, then the effect of the notch in the RF channel frequency response is approximately uniform for all frequency components in the signal. This circumstance is known as a "flat-fade". The field strength (i.e. amplitude) of the received signal in the case of flat-fades is often modeled with a "Rayleigh" statistical distribution. The flat-fade typically occurs when there is no LOS propagation path or a LOS path that is significantly attenuated, for example, when obstructed and when the signal reflections are diffuse. Flat-fading may cause a substantial loss in the received signal amplitude. Fortunately, the probability of the occurrence of a loss in signal amplitude of a given amount decreases as the amount of the loss increases. For example, for a single-path Rayleigh distribution, the probability of a loss in amplitude of at least 20 dB with respect to the RMS signal amplitude is about one percent, while the probability of a loss in signal amplitude of at least 30 dB with respect to the RMS signal amplitude is about one-tenth percent. Since the power of the IBOC DAB signal is already small when compared to the corresponding analog FM-band signal power, the effect of Rayleigh fading on the receiver performance may be catastrophic (i.e. weak-signal failure) even with large amounts of error protection redundancy in the IBOC DAB signal.

A known method to combat the deleterious effects of flat-fading multipath is receiver "diversity" [reference: W. C. Y. Lee. *Mobile Communications Design Fundamentals*. Indianapolis, Ind.: Howard W. Sams & Co., 1986, pp. 113–133]. In a receiver diversity system, multiple receiving antennas are used in the implementation of the receiver. In certain circumstances, the antennas are separated by a physical distance which is about one-half of the RF carrier (center-frequency 1) wavelength. In other circumstances, the antennas may be separated by a distance equivalent to many RF carrier wavelengths. By separating the antennas with a sufficient amount of distance, the signal received at each antenna will be approximately uncorrelated and independent of the other received signals. The principle of diversity reception for combating flat-fading is that since the received signals are uncorrelated, the probability of both of the received signals being substantially attenuated by the effects of Rayleigh fading at the same time is substantially less than in the circumstance with only one receiver antenna. A disadvantage of receiver diversity is that it requires at least two receiver antennas.

It is also possible to use diversity at the transmitter site by having multiple (at least two) broadcast antennas. In this circumstance, only a single antenna at the receiver is required. The receiver antenna sums the received signals from the plurality of transmitter antennas. Most analog FM-band transmitters and their corresponding antenna systems do not use transmitter diversity. Furthermore, transmitter diversity systems require that the total licensed power be divided among a plurality of antennas, so that the power available for broadcast in a single antenna is reduced. Diversity may be accomplished with two transmission antennas without physical separation between the antennas by methods known as "polarization" diversity, and "field-component" diversity.

A further known method of diversity is "time-diversity". Time diversity does not require additional transmitter or receiver antennas. In time diversity, two identical messages are transmitted at different instances in time. When the receiver is in motion, as in a vehicle, the received signals at the two different instances in time will be approximately uncorrelated when the time-difference corresponds to about at least one-half RF carrier wavelength. The required distance depends upon the velocity of the receiver so that time-diversity is ineffective at combating flat-fading when the receiver is not in motion. "Interleaving" [reference: J. L. Ramsey, "Realization of optimum interleavers," *IEEE Transactions on Information Theory*, Vol. 16, No. 3, pp. 338–345, May 1970] is a method of time-diversity in which estimates of the determined bits are shuffled by an order-randomizing algorithm in order to substantially mitigate correlated probabilities of error for consecutive bit estimates. Interleaving does not change the probability of error prior to consideration of the error correction code decoding, but it does cause a redistribution of probable errors. Spreading probable burst errors over a larger time interval typically improves the performance of the ECC decoding algorithm, particularly for convolutional codes. A disadvantage to many known diversity systems is that in the corresponding receiver systems, the determination as to which signal path corresponds to a less-affected signal is made by determining a signal-to-noise (SNR) estimate of the signal itself. However, for digital communication systems, it may be difficult to determine the signal SNR estimate with sufficient accuracy. A very small difference in SNR values may result in a large difference in decoded bit error probability.

Prior art systems for new-band DAB and IBOC DAB are known. The Eureka-147 system [reference: G. Plenge, ibid.] is a new-band DAB system which makes use of COFDM modulation with a plurality of narrowband carriers. The Eureka-147 DAB signal represents a multiplex of digital audio sources, which are combined, and transmitted together. The minimum occupied bandwidth of the Eureka-147 DAB signal is 1.536 MHz. The operating frequency range for Eureka-147 is not the same for all countries, although a common allocation at L-band has been proposed. The bandwidth of the Eureka-147 DAB signal is significantly larger than that for conventional analog FM-band broadcast, even when considering the upper and lower sideband regions in the RF emission mask. Thus, the Eureka-147 DAB system is not compatible with the narrowband emission and independent transmission characteristics of IBOC DAB. The Eureka-147 system is unrelated to the instant invention.

U.S. Pat. No. 5,465,396 to Hunsinger, et. al., entitled "In-band On-Channel Digital Broadcasting" describes an IBOC DAB method and system where the IBOC DAB signal is generated in the transmitter so that its instantaneous carrier frequency is phase-quadrature to the analog FM-band signal (i.e. AM-over-FM). The IBOC DAB signal bandwidth substantially overlaps that of the occupied bandwidth of the analog FM-band signal. The IBOC DAB signal itself is composed of a plurality of narrowband sinusoid-like signals, which are summed together with a reference signal and combined with the analog FM signal. Since there is considerable overlap in the frequency regions of the IBOC DAB signal and the analog FM-band signal, the signals can be reliably separated only when the IBOC DAB signal and the analog FM-band are phase-orthogonal (i.e. quadrature). It has been previously discussed that the phase-orthogonality may be significantly disrupted by the effects of multipath and frequency-selective distortion. A further disadvantage of the '396 system is that it requires the transmission of an analog FM-band signal (at least the carrier) for proper operation of the IBOC DAB receiver because the carrier frequency estimate and the baud frequency estimate of the IBOC DAB signal determined in the receiver are derived from the analog FM-band signal. Narrowband notch interference which substantially attenuates the carrier and/or pilot frequency component of the analog FM-band signal may then deleteriously affect the IBOC DAB signal, even if most of the bandwidth of the IBOC DAB signal was not affected by the frequency-selective distortion. Finally, the bandwidth of the '396 system is about 400 kHz when there is no analog FM modulation. With modulation, the bandwidth exceeds 400 kHz so that there may be significant second-adjacent interference between IBOC DAB signals.

U.S. Pat. No. 5,278,826 to Murphy, et. al., describes an IBOC DAB system which makes use of a plurality of narrowband COFDM subcarrier signals which are data-modulated with QPSK (i.e. four phase states) modulation and which are simultaneously transmitted. The composite signal is phase-locked to the analog FM-band signal 19 kHz stereo pilot component. The bandwidth of the DAB signal is about 200 kHz and the spectrum of the DAB signal and the analog FM-signal overlap significantly except when there is very little analog FM modulation, which is an uncommon occurrence for conventional analog FM-band signals which are highly processed. The disadvantages of spectrum overlap between the IBOC DAB signal and the analog FM-band signals have been described. In addition to being susceptible to interference from the analog FM-band signal, the system described in the '826 patent is further significantly degraded by first-adjacent analog FM-band interference, which may occupy a bandwidth which substantially overlaps the DAB signal. The '826 patent describes an IBOC DAB system whose subcarrier signal characteristics are similar to the single-sideband COFDM "AT&T Amati LSB" system, described below, but with a larger DAB composite signal bandwidth so that the interchannel interference conditions encountered are more severe. A disadvantage of the '826 system is that when the analog FM-band signal is substantially distorted, the DAB receiver system may not operate properly because it requires the recovery of the analog FM-band signal for IBOC DAB synchronization.

Several new-band and IBOC DAB systems were submitted for laboratory and field testing in the United States. The tests are being conducted by the Electronic Industries Association (EIA) Digital Audio Radio Subcommittee in order to determine a recommendation for a digital audio radio standard. The systems are described in a laboratory test report published by the Electronic Industries Association Consumer Electronics Group (EIA CEG) on Aug. 11, 1995 [reference: "Digital Audio Radio; Laboratory Tests; Transmission Quality Failure Characterization and Analog Compatibility," published by Electronic Industries Association Consumer Electronics Group, Digital Audio Radio Subcommittee, Aug. 11, 1995, sections A, AD, AE, AG, AH, AK, AL]. The objective of the EIA CEG was to compare and contrast the performance of the IBOC DAB and new-band DAB systems under a wide variety of circumstances, in order to determine the effects of noise, multipath, co-channel, first-adjacent allocation, and second-adjacent allocation interference on the receiver performance. According to the report, two different IBOC DAB systems were submitted for testing by USA Digital Radio (USADR). These systems are referenced in the EIA report by the system labels "USADR FM-1" and "USADR FM-2". Two different IBOC DAB systems were also submitted by AT&T Corporation in cooperation with Amati Communications (AT&T/Amati) known as "AT&T Amati LSB" and "AT&T Amati DSB". The USADR FM-1 and AT&T Amati DSB systems were modified during the testing process, resulting in system variations with the labels "USADR FM-1 Rev B" and "AT&T Amati DSB Rev B". AT&T Corporation also submitted a DAB system described as being "In-band Adjacent-channel" (IBAC) with the system label "AT&T". An IBAC signal occupies 200 kHz bandwidth, is generated to occupy either the positive-offset first-adjacent frequency allocation (+200 kHz) or the negative-offset first-adjacent frequency allocation (−200 kHz), but not both, and operates at a relatively high power level. Thus, an IBAC DAB signal is not spectrally confined to within the upper and/or lower sideband regions and does not approximately comply with the FCC emission mask. IBAC DAB systems are unrelated to the instant invention.

According to the proponent self-descriptions included in the report, the USADR FM-1 system transmits a IBOC DAB signal, which is composed of a simultaneous multiplex of 48 modulated orthogonal signals together with a reference waveform. Each orthogonal signal, which is a subcarrier signal, spans a bandwidth of about 450 kHz, centered on the analog FM-band center frequency. The subcarrier frequency spectrum has about a 220 kHz void in the center. This is approximately equivalent to having the IBOC DAB signal in the upper and lower sidebands, as described previously. The void in the center of the spectrum causes the IBOC DAB signal to be approximately frequency-orthogonal to the analog FM-band signal, which is desirable. The IBOC DAB signal is unrelated to the analog FM-band signal. The total bit rate of the IBOC DAB signal is 384 kbit/sec and the IBOC DAB signal baud interval is about 125 microseconds. A disadvantage of the USADR FM-1 system is that since each subcarrier signal waveform spans both the upper and lower sidebands simultaneously, large amounts of interference in only one of the sidebands may cause the receiver system to fail by causing a negative SNR ratio for all of the subcarrier signals, whereas in a narrowband system, only some of the subcarrier signals would be deleteriously affected. According to the published EIA CEG test data, the onset of the IBOC DAB receiver system failure, which is known as point-of-failure or POF, for the USADR FM-1 system occurs when the D/U ratio at the receiver is about +7 dB for co-channel interference (versus +20 dB by FCC Part 73), about +22 dB for one-sided first-adjacent interference (versus +6 dB), and about −2 dB for one-sided second-adjacent interference (versus −20 dB). The amount of distortion produced in the recovered audio signal at the POF point is significant. The type of distortion at POF may include silence (mutes), honks, bandwidth-restriction, or extended periods of noise. The EIA data also includes characterizations of the receivers for a performance threshold known as the threshold-of-audibility or TOA. The onset of TOA occurs when lessor audio artifacts (e.g. occasional gurgles, chirps, and whistles) become detectable. Thus, the receiver degradation at TOA corresponds to a milder form of receiver failure than at POF. However, the onset of TOA is typically more rapid than POF. The reference to the POF threshold D/U ratios in this disclosure instead of TOA thresholds is an optimistic measure of IBOC DAB receiver performance. In other words, the recovered audio may be objectionable at a point which corresponds to a less serious noise and/or interference condition than the POF threshold. Although the onset of TOA is more rapid than POF, the difference in the corresponding interference ratios is typically small (e.g. less than four decibels). The first-adjacent (+22 dB) and second-adjacent (−2 dB) D/U ratios for the USADR FM-1 system at the POF threshold are significantly larger than the FCC permitted D/U ratios (+6 dB and −20 dB, respectively). As a result, the first-adjacent and second-adjacent interference-limited coverage of the USADR FM-1 IBOC DAB system may be substantially smaller than the interference-limited coverage of the corresponding analog FM-band signal, which is undesirable.

According to the proponent self-description of the USADR FM-2 IBOC DAB system, the FM-2 system uses phase-orthogonal modulation so that the analog FM-band signal and the IBOC DAB signal are generated in the transmitter to be quadrature. This is similar to the '396 patent to Hunsinger, where the IBOC DAB signal is quadrature to the instantaneous analog FM-band carrier frequency. However, the subcarrier signals in the '396 patent are narrowband while the subcarrier signals used in the FM-2 system are wideband. The FM-2 subcarrier signals are described as being synchronous orthogonal Code-Division Multiple Access (CDMA) signals. Orthogonal CDMA signals are known; see, for example, U.S. Pat. No. 4,460,992 to Gutleber. The bandwidth of the USADR FM-2 IBOC DAB signal substantially overlaps the analog FM-band signal so that separation of the signals depends upon the phase-orthogonality property. As a result, the FM-2 system has significant performance disadvantages when there is multi-path or frequency-selective distortion, as described previously. The bandwidth of the USADR FM-2 signal is about 250 kHz, but there are sidebands which extend further out as a result of the "sinc" spectrum shape of the CDMA signals, which is a further disadvantage; in other words, systems with conventional CDMA signals typically have a low spectrum efficiency unless high-order data modulation is also implemented. The total bit rate of the USADR FM-2 system is about 384 kbit/sec and the baud interval is about 500 microseconds. According to EIA data, the D/U ratios at the receiver POF threshold for co-channel, first-adjacent, and second-adjacent interference for the USADR FM-2 system are about +40 dB, about +28 dB, and about +28 dB, respectively. These ratios are substantially larger than the FCC permitted ratios (+20 dB, +6 dB, and −20 dB, respectively), and substantially larger than the corresponding FM-1 system ratios (+7 dB, +22 dB, −2 dB, respectively), so that the coverage of the USADR FM-2 IBOC DAB system may be very poor when compared to the existing analog FM-band signal coverage and the coverage possible with the FM-1 IBOC DAB system. Thus, the FM-2 system appears to be undesirable for DAB.

The remaining IBOC DAB systems described in the EIA CEG report were submitted by AT&T Corporation in cooperation with Amati Communications. These systems are "AT&T Amati LSB" and the revised system "AT&T Amati DSB Rev B". Both systems use Coded Orthogonal Frequency-Division Multiplexing (COFDM), also known as Discrete Multitone (DMT) modulation. In COFDM, a plurality of narrowband orthogonal subcarriers signals are simultaneously transmitted. The simultaneous multiplex allows for the use of a long signaling interval for each individual subcarrier without adversely affecting the system bit rate throughput. Because the bandwidth of each subcarrier is very narrow (typically between about 1 kHz and about 15 kHz), the effects of multipath fading may be modeled as a flat-fade for each subcarrier even when the multipath has specular characteristics. In COFDM, the long signaling interval includes an amount of time known as the "guard interval". When the RF channel multipath delay spread is within the guard interval, then the deleterious effects of intersymbol interference are substantially mitigated.

In the AT&T/Amati IBOC DAB systems, the COFDM signal is generated in the upper and/or lower sideband regions around the analog FM-band signal, as in FIG. 1. The total occupied bandwidth, including the analog FM-band signal, is about 400 kHz. The primary difference between the two AT&T/Amati system configurations is that in the AT&T/Amati LSB system, only one of the sideband signals is transmitted (i.e. either the upper or lower sideband), while in the AT&T Amati DSB system, COFDM signals in both the upper and lower sidebands, with different encoded source bit information, are transmitted. In the AT&T/Amati DSB, the upper and lower sideband signals are unrelated; in other words, the sidebands convey different encoded source bit information. In both configurations, the baud symbol rate is about 4 kHz. According to the proponent self-description, the total bit rate is 192 kbit/sec, and there are about 18 COFDM subcarrier signals in the AT&T/Amati single-sideband (LSB) system. The total bit rate is 256 kbit/sec, and there are 32 COFDM subcarrier signals in the AT&T/Amati double-sideband (DSB) system. The co-channel, first-adjacent, and second-adjacent D/U ratios for IBOC DAB receiver POF threshold are about +15 dB, about +38 dB, and about −2 dB (worst case), respectively, for the AT&T Amati LSB system. Both the first-adjacent and second-adjacent D/U ratios are significantly worse (greater) than the FCC permitted interference ratios of +6 dB and −20 dB, respectively. However, the AT&T Amati LSB system has the advantage that it is insensitive to large amounts of first-adjacent interference when the frequency offset of the first-adjacent source has a polarity opposite to the frequency offset of the one sideband (either upper or lower) which is transmitted. For example, when the first-adjacent interference source is at +200 kHz (15 in FIG. 2), and when the IBOC DAB signal for the AT&T Amati LSB system is substantially confined to lower sideband 13, then the IBOC DAB signal may be robust against the effects of first-adjacent interference, even at high interference levels, because the IBOC DAB signal and the first-adjacent analog FM-band interference source are frequency-orthogonal. Unfortunately, in general, it is not possible to know at the transmitter system (which is where the single-sideband IBOC DAB signal is generated) whether the dominant source of first-adjacent interference at the receiver is due to an analog FM-band transmitter with a positive 200 kHz frequency offset or a negative 200 kHz frequency offset relative to the desired station's frequency because that determination depends upon the physical location of the IBOC DAB receiver (antenna). In a simplex system, such as analog FM-band and IBOC DAB, the transmitter is not aware of the receiver location. Furthermore, in such broadcast communication systems, there are typically a large plurality of receivers at different locations. The different receivers are subject to varying RF propagation and interference effects, so that the resulting D/U ratios, which are determined at the receiver, vary considerably. Another disadvantage of this method is that other sources of interference which may be generated in the same frequency spectrum region as the single-sideband IBOC DAB signal, or which may affect said frequency spectrum region (e.g. multipath), could significantly disturb the IBOC DAB receiver.

The AT&T/Amati DSB system (known as "AT&T Amati DSB") transmits different encoded source bit information in both the upper and lower sidebands. The performance of the revision of the AT&T/Amati system (known as "AT&T Amati DSB Rev. B") is significantly better than the originally submitted system, so that only the performance of the revised system is considered in this disclosure. The co-channel, first-adjacent, and second-adjacent D/U ratios for the IBOC DAB receiver POF for the revised AT&T Amati DSB Rev. B. system are about +9 dB, about +20 dB, and about −20 dB. When compared to the FCC D/U interference levels, the co-channel D/U ratio for the AT&T/Amati DSB Rev B. system at POF is more than adequate (+9 dB versus +20 dB), and the second-adjacent ratio is just adequate (−20 dB versus −20 dB), without consideration of other effects, for example, multipath, which may cause further attenuation of the desired signal. However, the first-adjacent D/U ratio of +20 dB at the receiver POF still differs substantially from the +6 dB FCC-determined ratio.

U.S. Pat. No. 5,359,625 to Vander Mey, et. al., describes a spread spectrum modulation system in which two sidebands are generated by modulating an RF carrier frequency signal with a baseband signal; the frequency spectrum of the baseband signal, which is a spread-spectrum signal, has a passband or bandpass frequency spectrum. In general, the amplitude modulation of an RF carrier signal by a non-zero frequency results in a RF signal with two identical frequency sideband signals with or without an unmodulated RF carrier frequency signal; known as double-sideband large carrier (DS-LC) or double-sideband suppressed carrier (DS-SC), respectively.

A disadvantage of amplitude-modulation systems for IBOC DAB is that the demodulation method for amplitude-modulation, which involves multiplying (mixing) the received signal by the RF carrier signal, inherently combines both sideband signals in determining the baseband signal. Combining the sideband signals in the receiver when one of the sidebands is substantially disturbed may result in a much lower signal-to-noise ratio (SNR) than if one (disturbed) sideband signal is discarded. The use of amplitude modulation alone precludes the representation of different encoded source bit information in the upper and lower sideband signals at the same instant in time.

U.S. Pat. No. 5,369,800 to Takagi, et. al., describes a communication system with identical upper and lower sideband waves (signals). The identical sideband signals are generated by mixing signals with different frequencies in the transmitter system. In the corresponding receiver system, a diversity section determines whether to select between one of the incoming upper or lower sideband waves (signals) or to synthesize a wave from the combination of waves. The '800 system has frequency diversity through the duplication of sideband signals in contradistinction to the duplication of encoded source bit information. Duplication of sideband signals does not necessarily imply duplication of the encoded source bit information, for example, when the bit-to-symbol mapping for the upper and lower sideband signals is not the same. A disadvantage of the '800 system transmitter is that identical upper and lower modulated sideband signals precludes the use of time diversity across the upper and lower sidebands, in which case the sideband signals are not the same at an instant in time. Another disadvantage of the '800 system receiver is that the diversity section in the receiver precedes demodulation and decoding of the source bit information. As described previously, a small difference in SNR values may result in a large difference in decoded bit error rates, and it may be difficult to accurately determine the effective SNR with sufficient precision without use of information obtained after demodulation. Furthermore, the '800 system selects the sideband signal with the greater magnitude. For IBOC DAB, large amounts of interference in a sideband may result in a large apparent sideband signal, the selection of which is disadvantageous.

U.S. Pat. No. 5,265,122 to Rasky, et. al., describes a receiver with antenna diversity. As described previously, multiple receiving antennas (branches) may not be practical for many IBOC DAB receivers. The primary advantage of antenna diversity is the reduction of the deleterious effects of flat-fading and not the reduction of the effects of sideband interference and frequency-selective fading. The '122 receiver system implements a "max-ratio" diversity combiner or "selection" diversity combiner. The combiner weighting parameters are adjusted using coefficients determined from the re-encoding of decoded codewords.

U.S. Pat. No. 5,157,672 to Kondou, et. al., describes an interference detection method for use in an antenna diversity system in a receiver. The disadvantage of antenna diversity for IBOC DAB was described previously. The '672 system determines whether or not there is a substantial amount of interference in a received signal which has been convolutionally encoded by comparing the minimum difference between path metrics, determined by Viterbi decoding, to a predetermined value. A disadvantage of the '672 system is that for convolutional codes with large constraint (K), the minimum difference in path metrics is determined over all $2^{k-1}$ code states, which may be a substantial number of states.

Accordingly, it is apparent from the above that there exists a need in art for a method and system for IBOC DAB which: (i) is able to operate with large amounts of either upper-sideband or lower-sideband first-adjacent interference without a priori knowledge of which sideband is most adversely affected; (ii) is able to operate with large amounts of second-adjacent interference; (iii) is robust against the effects of multipath, particularly short-duration flat-fading; and (iv) provides sufficient bit rate throughput for high quality audio and/or ancillary data services.

SUMMARY OF THE INVENTION

This invention fulfills the above-described needs in the art by providing a method and system for the transmission and reception of an IBOC DAB signal. The transmitter system of the invention generates a digitally-modulated RF signal which conveys source bit information, representing a digital audio signal together with ancillary data. The IBOC DAB signal is a composite of two further digitally-modulated signals which occupy the upper and lower sideband frequency regions, respectively. The source bit information is conveyed redundantly through replication of the encoded source information by modulating signals in both the upper and lower sidebands with the same encoded codeword. The upper and lower sideband regions are located around the conventional analog FM-band signal and occupy the frequency region from about a ±100 kHz frequency offset to about a ±200 kHz frequency offset from the analog FM-band channel's center frequency. In certain embodiments, the IBOC DAB upper and lower sideband composite signals are approximately confined within the analog FM-band RF spectrum emission mask by limiting the transmitted IBOC DAB signal power.

The emitted IBOC DAB RF signal is the linear summation of a composite upper sideband signal and a composite lower sideband signal. The spectrum of each of the two composite IBOC DAB sideband signals in the sum is substantially confined to either the upper sideband region (to be known as the upper sideband composite signal), at a frequency offset of between about +100 kHz and +200 kHz, or the lower sideband region (to be known as the lower sideband composite signal) at a frequency offset of between about −100 kHz and −200 kHz. Each of the upper and lower sideband composite IBOC DAB signals may be a further composite of one or a plurality of simultaneously transmitted and synchronous subcarrier signals. When the spectrum of each of the two composite sideband signals is substantially confined within one of the sidebands, the spectrum of each subcarrier signal is similarly confined. The subcarrier signals are distinct. In certain embodiments, the subcarrier signals are orthogonal or approximately orthogonal (substantially orthogonal) and are transmitted synchronously with about the same signal extent and alignment of signal intervals. The subcarrier signals in the upper sideband composite signal are frequency-orthogonal to the subcarrier signals in the lower sideband composite signal because of the frequency separation of about 200 kHz between the upper and lower sideband regions. The subcarrier signals are also approximately frequency-orthogonal to the analog FM-band signal except for transient interference caused by high-order nonlinear FM harmonics.

The spectrum of each of the subcarrier signals for both the upper and lower sideband composite signals may be either narrowband or wideband. When the subcarrier signal is wideband, according to the invention, the spectrum of each subcarrier is still substantially confined within one of the sidebands. When the subcarrier signal spectrum is wideband, the spectrum of the composite of the upper (lower) subcarrier signals is substantially confined with the upper (lower) sideband region. The subcarrier signal generators which emit the narrowband or wideband subcarrier waveforms may be implemented with conventional memory and multiply/accumulate electronic devices. In certain embodiments, wideband signals are mapped onto narrowband OFDM signals. Each subcarrier signal conveys a fraction of the total source bit information from the transmitter to one or a plurality of receivers according to the data modulation of the subcarrier signal. In order to accommodate the typical bit rate throughput requirements of IBOC DAB, the source bit efficiency of the transmitted signal (i.e. not including the bits required for the error correction code redundancy, synchronization and/or equalization) over the plurality of simultaneously transmitted subcarrier signals in either one, but not considering both sidebands at once, is between about one source bit per second per Hertz (1 bit/sec/Hz) and three source bits per second per Hertz (3 bits/sec/Hz), and preferably about two (2) source bits/sec/Hz in certain embodiments. When the digital audio representation requires about 128 kbit/sec for a stereo near CD-quality audio signal, the throughput of the IBOC DAB system for an exemplary embodiment is about 200 kbit/sec, so that a reasonable amount of ancillary data throughput (about 64 kbit/sec) is available. The corresponding encoded bit rate throughput of the transmitter system, including the redundancy bits for error correction coding, is about 300 kbit/sec for the composite sideband subcarrier signals in each of the upper and lower sidebands so that an average rate $2/3$ error correcting code may be accommodated. Substantially redundant encoded source bit information is transmitted by data-modulating the upper and lower sideband signals separately at about 300 kbit/sec so that the total bit rate for both sidebands together is about 600 kbit/sec. The subcarrier signals in each of the upper and lower sideband composite signals are modulated by the encoded source bit information to generate a plurality of phase and/or amplitude states for each subcarrier signal, which is constant for the duration of the subcarrier signal baud interval. In certain embodiments, the subcarrier signals in each sideband are considered as narrowband or wideband signal pairs. In each signal pair, one subcarrier signal is labeled as the in-phase (I) signal and the other is the quadrature (Q) signal. For wideband signals, the labels "in-phase" and "quadrature" are arbitrary and have no specific meaning since the signals are orthogonal, but are not, in general, phase-orthogonal. In certain embodiments, for each baud interval, each subcarrier pair is modulated with one of two kinds of 4-ary phase-shift-keying (4-ary PSK) according to a "selection" bit. Each subcarrier pair represents three encoded bits in each baud interval; one selection bit and two "phase" bits which determine the specific 4-ary PSK state. The selection and phase bits may be equally error protected with an average rate $2/3$ ECC code. However, in certain circumstances, it is advantageous to encode the selection bits with additional ECC redundancy compared to the phase bits, for example rate $1/3$ ECC coding for the selection bits and rate $5/6$ ECC coding for the phase bits, so that the average ECC code rate is still about $2/3$. In another embodiment, the subcarrier signals are narrowband orthogonal signals and are modulated by phase-modulation, for example, as in the known modulation method of COFDM. According to the invention, in said embodiment, the narrowband COFDM quadrature subcarrier signal pairs are modulated with 8-ary phase-shift keying (8-ary PSK) and rate $2/3$ ECC encoding. ECC coding methods which may be implemented include, but are not limited to: rate $2/3$ Gray coding with block (multiple-bit and binary) and convolutional coding; 8-ary PSK, 2 bits/sec/Hz Ungerboeck trellis coding; and 8-ary PSK, 2 bits/sec/Hz pragmatic trellis coding, which is the combination of partial Gray code bit-to-symbol mapping, half-plane set partitioning, and binary convolutional coding. These coding methods may be implemented even when the subcarrier signals are wideband, in which case the subcarrier signals within a sideband are arbitrarily organized as orthogonal signal pairs.

In the transmitter system of the invention, the composite sideband signals may be transmitted with approximately the same transmitted power for each composite sideband signal, or with different amounts of power for the upper sideband composite signal and lower sideband composite signal. In circumstances when the frequency offset of a substantial source of interference (e.g. first-adjacent) is known and where the deleterious effects of said interference are substantially independent of the receiver location within the desired coverage contour, the sideband which is most deleteriously affected may be, but is not necessarily, transmitted with either i) an increased amount of power relative to the other sideband signal in order to attempt to overcome the amount of interference or ii) a decreased amount of power in order to maximize the power available in the remaining sideband (which is less likely to be adversely affected by the known interference source).

In many embodiments, the transmitted source bit information represents a digital audio signal together with ancillary digital data. The source bit information is encoded with an error correction code (ECC) in the transmitter system in order to generate a plurality of ECC codewords. Each ECC codeword is composed of a predetermined plurality of ECC codeword bits. Groups of one or a plurality of ECC codeword bits are used to data-modulate the subcarrier signals in each subcarrier baud interval. The length of the ECC codeword in bits is typically larger than the number of bits which are conveyed in a single composite sideband subcarrier signal, so that the ECC codeword represents a plurality of signal baud intervals. Convolutional and/or block ECC coding, including combinations thereof (e.g. concatenated coding, and "turbo" coding) may be implemented. Since the ECC codeword has a predetermined bit length, when convolutional codes are implemented in the transmitter and receiver systems (which are in general of indefinite-length), the sequence of source bits for each codeword is terminated with a predetermined data pattern, for example, binary zeroes, prior to ECC encoding with the convolutional code. In certain embodiments, the ECC code rate is between about $1/2$ and about $3/4$, preferably with an average ECC rate of about ⅔. In the transmitter system, each encoded ECC codeword is organized into groups of bits to be conveyed for a particular signal baud. The groups of bits may be further subdivided into additional subgroups of one or a plurality of bits. Each bit or subgroup of bits is used to data-modulate at least two subcarrier signals in each signal baud; one of the upper sideband subcarrier signals and one of the lower sideband subcarrier signals. Thus, the information in each codeword is represented by both a upper sideband composite signal and a lower sideband composite signal over one or a plurality of baud intervals. In many embodiments, the size of the bit subgroup is three (3) bits, which are used to modulate pairs of upper sideband signals and pairs of lower sideband signals by 8-ary modulation.

In order to facilitate synchronization between the transmitter and the receiver system, two reference signals may be simultaneously transmitted together with the data-modulated sideband composite signals. The spectrum of each of the two reference signals is substantially confined to either the upper or the lower sideband region. The two reference signals are required to be in different sideband regions. In certain embodiments, the two reference signals, which are summed together, are each confined to different (upper or lower) sideband regions. Thus, each of the upper (lower) sideband composite signals has an associated upper (lower) reference signal, which is confined with the same sideband. The spectrum of the reference signals may be narrowband (e.g. pilot tones) or wideband, substantially within the particular sideband region.

Each bit or group of bits within each ECC codeword is represented by the modulated state of both one or a plurality of upper sideband subcarrier signals and one or a plurality of lower sideband subcarrier signals. In certain embodiments of the transmitter system, prior to data modulation of the subcarrier signals by the ECC codewords, a replica of each of the ECC codewords to be transmitted redundantly is generated and delayed by an amount of time which is significantly larger than the expected time-duration of a deleterious event, for example, the duration of a flat-fade. In general, the required amount of time depends upon the expected receiver velocity, but a delay between 10 ms (milliseconds) and 500 ms may be adequate in many circumstances. The delayed replica of the ECC codeword is used to modulate either the upper (lower) sideband subcarrier signals over a plurality of baud intervals, while the original (i.e. non-delayed) ECC codeword is used to modulate the remaining lower (upper) sideband subcarrier signals. As a result, the redundant upper and lower sideband composite signals which correspond to a specific transmitted ECC codeword may be transmitted at substantially different instances in time (diversity delay). Furthermore, prior to data modulation and generation of the delayed ECC codeword replica, the bits within one or a plurality of consecutive ECC codewords are bit-interleaved or symbol-interleaved, depending upon the ECC method, so that after corresponding deinterleaving in the receiver, the probable error events across consecutive bit or symbol boundaries within the interleaver length are approximately uncorrelated. In certain embodiments, the amount of time which corresponds to the interleaver length is equal to or less than the amount of the diversity delay. In time delay embodiments, in the receiver, the redundant source bit information is received at the same time because of the diversity delay compensation. However, the redundantly-modulated sideband signals are not received at the same time due to the delay in the transmitter.

In the receiver system of the invention, the received signal, which represents both upper and lower sideband signals combined together with noise, distortion, and interference, is demodulated to determine ECC codeword estimates. The demodulation of the upper sideband composite signal is independent of the demodulation of the lower sideband composite signal except that the signal intervals are known to be synchronous because of the transmitter invention. In certain embodiments, synchronization is accomplished with separate implementations of the baud clock and carrier frequency recovery algorithms for the upper and lower sideband composite signals, which may make use of the distinct transmitted reference signals for each sideband. However, because of the common timing for the upper and lower sideband signals, baud synchronization for only either the upper sideband composite signal or the lower sideband composite signal is needed.

Each transmitted codeword is represented by a redundant composite sideband subcarrier signal in the upper and lower sidebands over a plurality of baud intervals. In certain embodiments, the redundant codewords are separated in time by the diversity delay. In the receiver system of the invention, two codeword estimates for each transmitted codeword are determined; one codeword estimate from demodulation of the upper sideband signals over a plurality of baud intervals and one codeword estimate from the demodulation of the lower sideband signals over a plurality of baud intervals. When a replica of the ECC codeword for use in the data-modulation of the upper (lower) sideband composite signals has been delayed in the transmitter system (i.e. diversity delay), the receiver system implementation includes a delay of the same amount of time after the demodulation of the lower (upper) sideband composite signals, so that the two redundant codeword estimates which correspond to the same transmitted codeword (and consequently the same source bit information) may be compared at about the same time.

According to the invention, the receiver system determines two codeword estimates for each transmitted codeword because of the replication of the codeword for use in the data modulation of both the upper and lower sideband composite signals. The receiver system either i) combines the two (i.e. upper and lower sideband signal) codeword estimates together to form one estimate, which is then decoded or ii) selects one of the two decoded estimates, thereby discarding the remaining decoded estimate, in order to determine the received decoded codeword estimate which is less likely to be erroneous (i.e. having one or a plurality of bit errors in the decoded source bit information). The determination between pairs of received and demodulated codewords is made on a codeword-by-codeword basis and does not require a priori knowledge of which transmitted codeword (i.e. corresponding to the upper or lower sideband signals) is more likely to have been perturbed by noise, interference, or RF propagation channel distortion, such as multipath. The determined decoded codeword estimate for each pair of ECC codewords is the estimate of the source bit information which may be further decoded by the appropriate known source-decompression methods (e.g. decoding of digital audio by MPEG layer II decompression).

For each pair of received codeword estimates, the receiver system combines codeword estimates or selects between decoded codewords by determining a metric which corresponds to the probability of error in each of the decoded codeword estimates. In certain embodiments, the metric is computed by ECC decoding some or all of the bits for both received codeword estimates and then re-encoding the two decoded estimates to re-generate the pair of ECC codewords. The number of differences in bit positions (i.e. the Hamming distance) between each of the re-encoded estimates and the corresponding received estimate, prior to decoding and re-encoding, is approximately proportional to the bit error rate (BER) for the codeword prior to decoding. When the determined BER estimates for the two codeword estimates are substantially different, the receiver system selects the decoded codeword from the pair with the lower BER (smaller Hamming distance) for propagation as the most probable source bit information for that codeword. In certain embodiments of the receiver, when the BER estimate is substantially equal for both codewords in each pair, the codeword estimates are combined in order to increase the signal-to-noise ratio (SNR) since the redundant contributions add approximately coherently and the noise contributions add approximately incoherently. In this circumstance, the combined codeword estimate is then ECC decoded to generate the source bit message estimate for the codeword. Since the error metrics are not determined until after first decoding the upper and lower codewords separately, this requires a second decoding step. In certain embodiments of the invention, instead of determining the error metric by comparing the bit differences between the codeword and re-encoded codeword estimate after ECC decoding, when convolutional encoding is implemented with maximum-likelihood Viterbi decoding, the accumulated Viterbi algorithm branch metrics for the terminal state of each codeword are compared. The terminal state of each codeword is known without ambiguity in the receiver because of the finite-length codewords in the transmitter invention. When the difference between accumulated Viterbi algorithm branch metrics for the upper and lower codeword estimates is small, the codewords may be combined and re-decoded. When the difference in branch metrics is substantial, the decoded codeword with the smaller branch metric sum is propagated as the source bit estimate. In embodiments where the upper and lower sideband codewords are combined when the error metrics are sufficiently similar, the bit estimates which constitute the codeword may be combined (summed) directly or the demodulator samples (e.g. correlation sums determined by matched filtering and sampling) may be combined (summed), and the combined codeword estimate, to be decoded, determined from the combined demodulator samples (information), depending upon the modulation method.

According to the invention, the duplicate representation of the encoded source bit information in both the upper and lower sidebands independently causes the system to have the advantage of frequency diversity. The frequency diversity is effective at combating large amounts of interference which may be generated by dominant first-adjacent interference or dominant second-adjacent interference with associated IBOC DAB signal because, in these circumstances, the spectrum of only one of the two sideband composite signals (i.e. either upper or lower sideband signal) is significantly occluded by the interference, even when the D/U ratio is very small. Thus, the unaffected sideband composite signal may be separated from the disturbed composite signal by bandpass-filtering, which is automatically accomplished by the subcarrier correlation demodulation, and the source bit information is accurately recovered in the receiver.

In certain circumstances, a further advantage of the invention is the time-diversity across side-bands caused by transmitting the duplicate codewords, which are conveyed from the transmitter to the receiver as data-modulated subcarrier signals, at different times, in each of the upper and lower sidebands. When the separation in time between the transmitted redundant codewords is large compared to the expected RF channel correlation time interval, then the error rates for the two codeword estimates which are determined in the receiver for the corresponding redundant upper and lower sideband composite signals may be approximately unrelated, unless the receiver is not in-motion. Thus, even when deleterious interference, noise, and/or distortion affects both the upper and lower sideband composite signals simultaneously, when the duration of the impairment is short compared to the diversity delay implemented in the system, one of the two sideband composite signals corresponding to the same source bit information may be substantially unaffected due to the delay. In general, the advantage of time-diversity is more significant in combating the deleterious effects of flat-fade multipath than the effects of interchannel interference, while the frequency-diversity is more effective at combating interchannel interference and frequency-selective multipath.

BRIEF DESCRIPTION OF THE DRAWINGS

Prior art

Prior art

FIG. 15 is the demodulator embodiment in the receiver system which corresponds to the FIG. 8 IBOC DAB composite signal generator in the transmitter system.

DETAILED DESCRIPTION OF CERTAIN EMBODIMENTS OF THIS INVENTION

Figure 1:
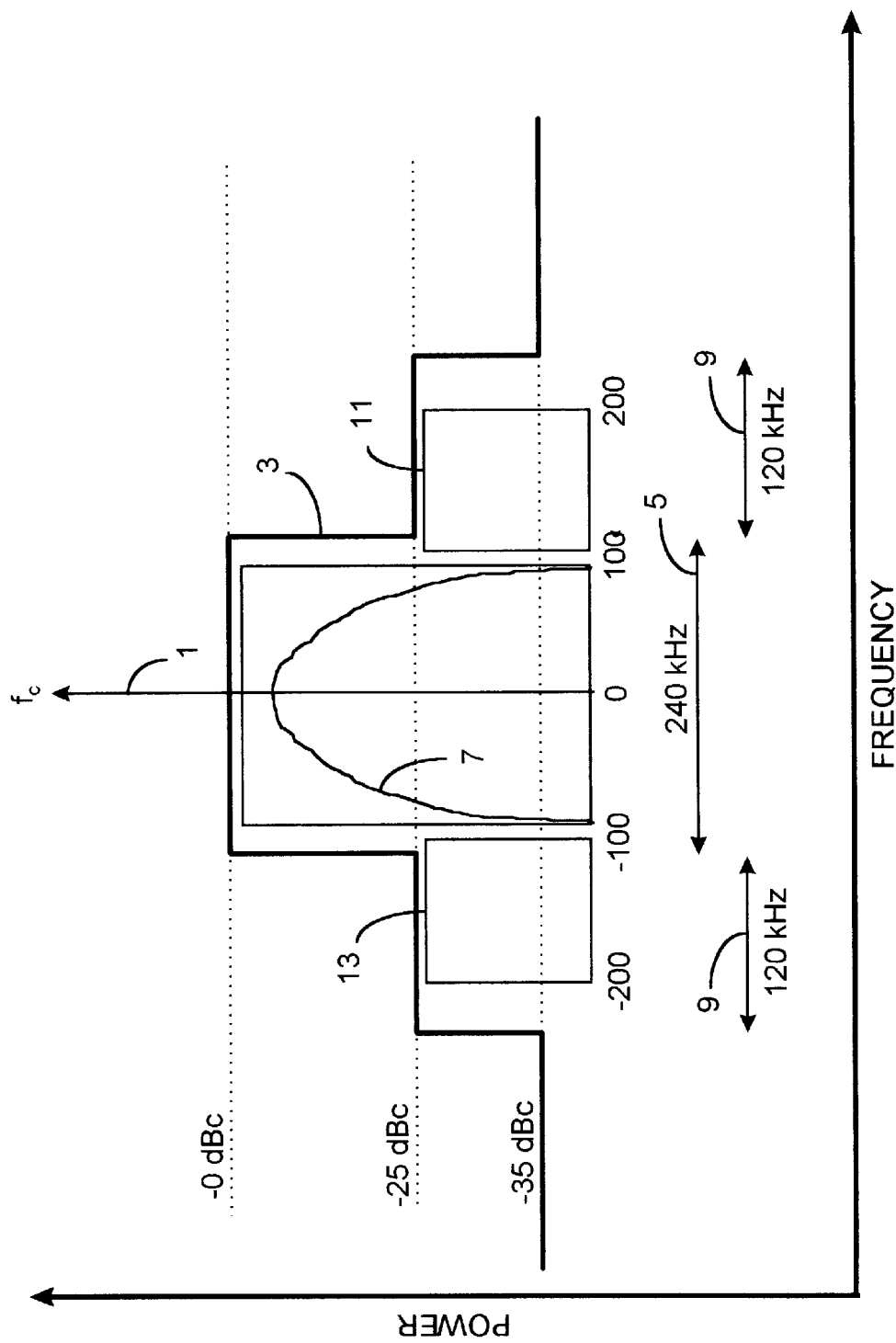
FIG. 1 is a prior art graphical representation of the frequency spectrum and RF emission mask for conventional analog FM-band broadcast which shows the upper and lower sideband regions located around the analog FM-band signal.
Figure 2:
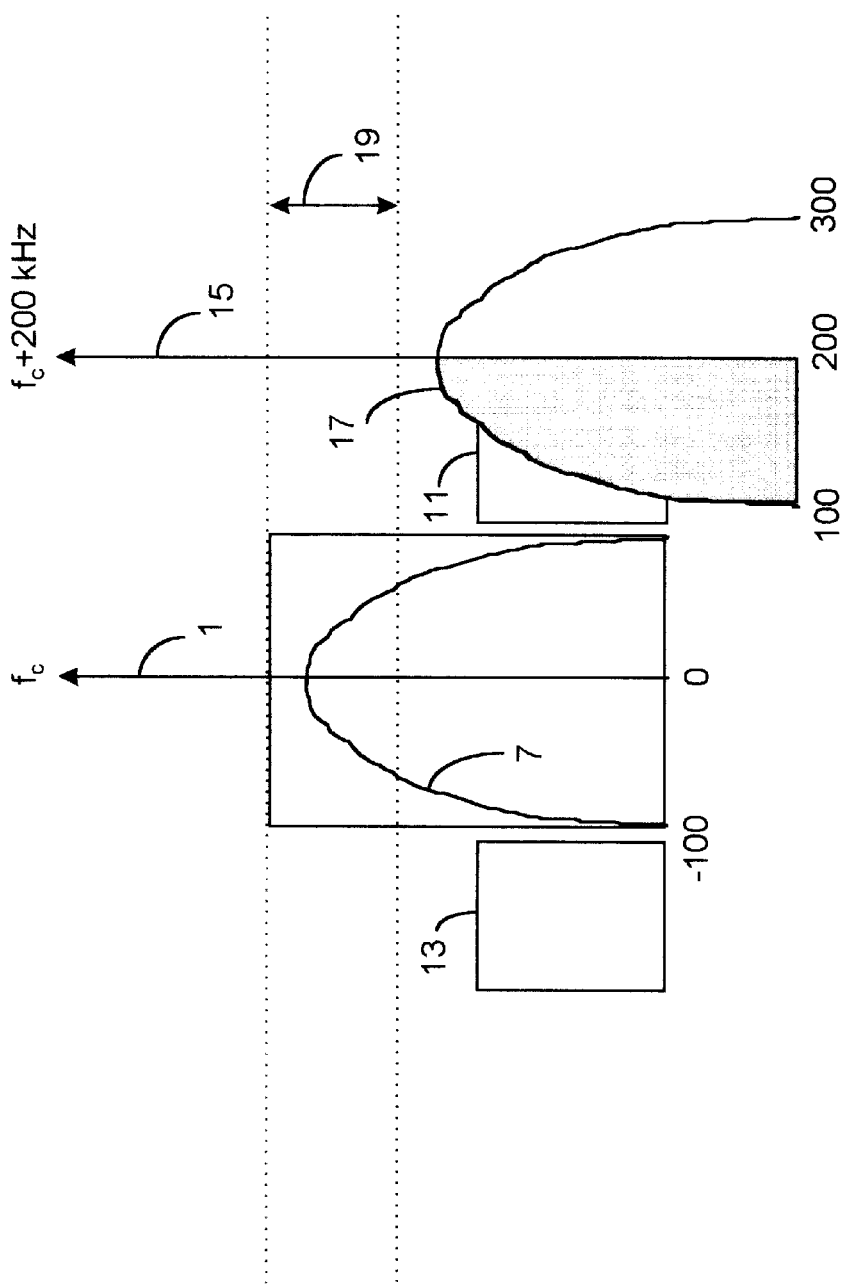
FIG. 2 is a graphical representation of the deleterious interchannel interference circumstance which occurs when there is a substantial overlap in frequency spectrum between the upper sideband and the analog FM-band signal from a first-adjacent analog FM-band signal with a positive-frequency offset.

Referring now more particularly to the accompanying drawings in which like reference numerals indicate like parts throughout the several views.

Figure 4:
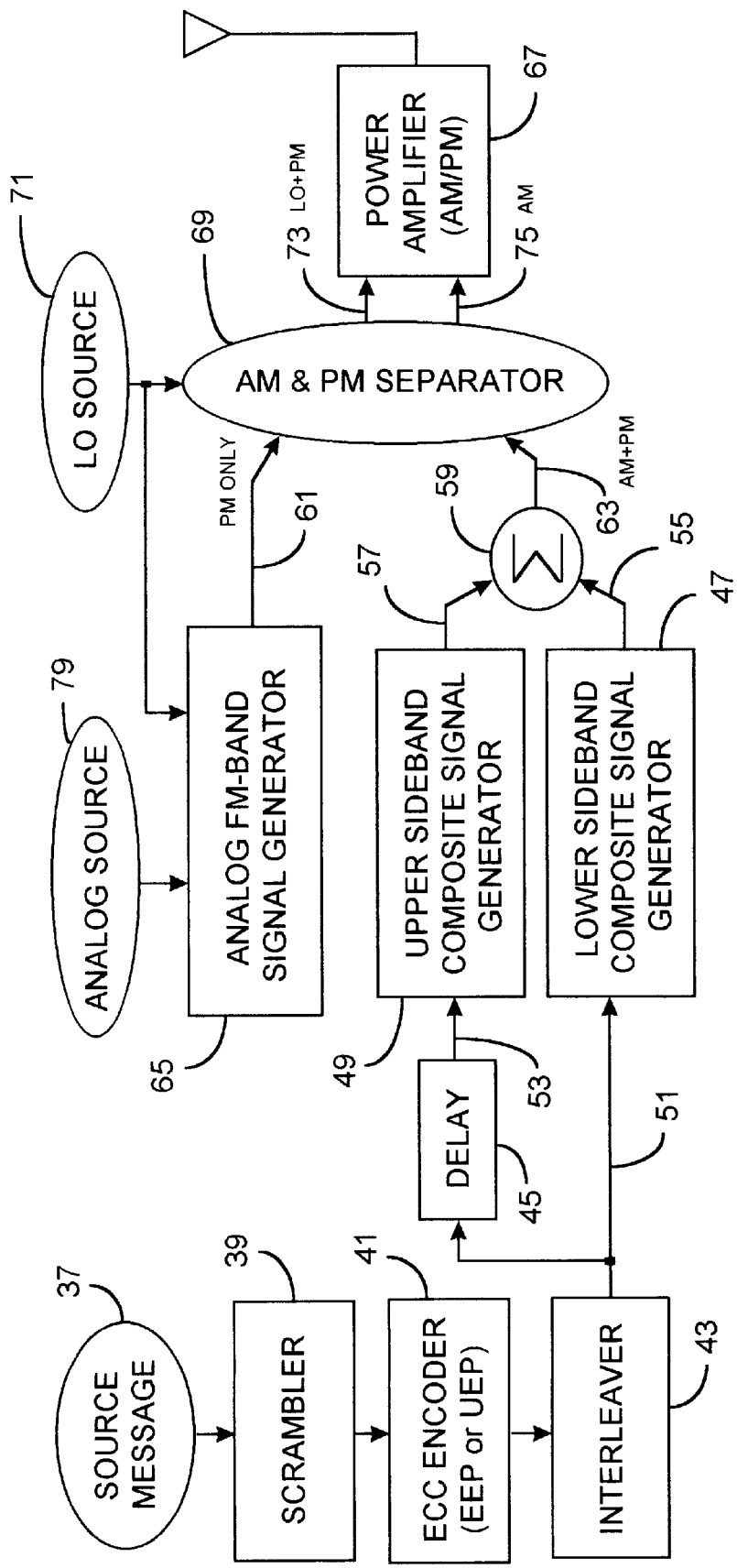
FIG. 4 is a block diagram of an IBOC DAB transmitter and system for combining the generated IBOC DAB signal and the conventional analog FM-band signal with a common apparatus for high-power amplification and emission according to an embodiment of this invention.

FIG. 4 is a block diagram of a transmitter system according to an embodiment of the invention. Source message 37 is the digital information (bits) to be conveyed from the transmitter to one or a plurality of receiver systems by the generation, propagation, reception, and determination of an RF signal. In certain embodiments, source message 37 is digital data which represents an encoded digital audio signal, preferably stereo and near-CD quality, together with ancillary data. Specific implementations of the encoding and decoding of the digital audio signal and the ancillary data are known, for example, by the MPEG layer II audio decoding algorithm. In certain embodiments, the source message bit rate throughput for the digital audio signal together with the ancillary data is at least about 128 kbit/sec, and preferably about 200 kbit/sec, where about 128 kbit/sec is needed for the digital audio signal and about 64 kbit/sec for the ancillary data. The division of the total bit rate throughput among digital audio signal bits and ancillary data bits is arbitrary and may vary dynamically; in other words, the amount of bit information for the digital audio signal may increase or decrease, depending upon the complexity of the audio signal, which facilitates a corresponding decrease or increase in the available ancillary data. Suitable algorithms and their implementations which are able to encode and decode near CD-quality stereo audio at low bit rates are known and include ISO MPEG-2 layers II and III, MPEG-2 NBC, MPEG-4 audio, AT&T PAC, and Dolby AC-3, referenced previously.

Source message 37 is optionally scrambled by bit scrambler 39. Bit scrambler 39 eliminates long consecutive runs of binary digits zero and one and causes binary digits zero and one to have approximately equal probabilities of occurrence after scrambling. The function of scrambler 39 is used in certain embodiments because certain types of error correction coding, synchronization, and/or equalization methods presume that the transmitted data is approximately random for optimum performance. Scrambler 39 is typically implemented by multiplying source message 37 by certain types of binary polynomials and summing using binary arithmetic. The binary polynomials are typically known as m-sequences (also PN-sequences and maximal-length sequences) [reference: W. T. Webb and L. Hanzo. *Modern Quadrature Amplitude Modulation*. London: Pentech Press, Ltd., 1994, pp. 266–268]. Scrambling algorithms may often be implemented with hardware devices known as linear-feedback shift registers (LFSR). The scrambling process establishes a bijection between source message 37 and the scrambled source message, which may be reversed in the receiver system to recover the source message. In certain embodiments, not all of the source message bits to be transmitted have the same relative importance. This occurs, for example, in digital audio encoding with compression. Bits associated with header data fields and scale-factors may be more important than some bits associated with lessor magnitude information. The "importance" of a bit is an indication of the expected receiver performance when an error occurs in the determination of said bit. When an error in a particular bit may cause substantial degradation of the receiver performance, then that bit is considered as more important than some other bit whose erroneous determination results in less severe degradation. Bits of substantially differing importance are required to be scrambled separately; in other words, with separate implementations of the scrambling process. Otherwise, the error rate of high importance bits and low importance bits may be coupled together as the result of the scrambling, which is generally undesirable, because of the interrelationship between bits created by the scrambling polynomial.

After scrambling 39, redundancy is added to the scrambled source bit information by error correction code (ECC) encoder 41. ECC encoder may either generate additional binary digits which are appended to the scrambled source message, known as "systematic" encoding, or generate an entirely different message, known as "nonsystematic" encoding. The length of the encoded message in bits is made larger than the scrambled source message by the amount of redundancy. "Convolutional" ECC encoding methods [reference: A. J. Viterbi, "Convolutional codes and their performance in communications systems," *IEEE Transactions on Communications*, Vol. 19, No. 5, pp. 751–772, October 1971], "block" ECC encoding methods, and combinations thereof known as "concatenated" ECC encoding methods, and "turbo" ECC encoding methods are suitable in certain embodiments.

According to the invention, the resulting ECC codewords are of a predetermined size in bits, and thus have specific codeword boundaries. This is the case with block ECC encoding using Reed-Solomon or BCH block codes, for example, because the construction of the codeword has a specific characteristic bit length. For block codes, the codeword length is equal to the characteristic ECC block code length, or a shortened version thereof. However, convolutional encoding is typically a continuous encoding process, and there are not well-defined block boundaries. In order to use convolutional encoding with the invention, the convolutional codeword is terminated at a predetermined length. The scrambled source message is divided into groups of bits to be transmitted in each distinct codeword. Each group of bits is terminated with a number of predetermined binary digits prior to ECC encoding in the transmitter system so that the terminal state of the encoder is known without ambiguity for each codeword. For example, for a binary rate 1/n convolutional code with an input constraint length of K bits, K-1 binary zeroes are appended to each group of source bits to be encoded as a single ECC codeword. The terminating binary digits do not convey user information and so they represent bit rate overhead. As a result, it is desirable that the length of the encoded convolutional codeword be relatively long when compared to the length of the encoded terminating sequence, for example, a ratio (i.e. codeword length divided by the termination length) of greater than ten-to-one (10:1), preferably at least twenty-to-one (20:1). The ECC code rate expresses the bit rate overhead of the redundancy information. In certain embodiments of the invention, the average ECC code rate for each codeword, which is the average ratio between the number of source bits represented by the codeword and the corresponding number of bits in the ECC encoded codeword and/or trellis encoded codeword, is between about ½ and ¾, preferably about average rate ⅔.

In certain combined modulation and error correction coding methods, not all source bits are encoded with an error correcting code. For example, in the known method of rate ⅔ 8-ary pragmatic trellis coded modulation (PTCM) [reference: A. J. Viterbi, J. K. Wolf, E. Zehavi, and R. Padovani, "A pragmatic approach to trellis-coded modulation," *IEEE Communications Magazine*, Vol. 27, No. 7, pp. 11–19, July 1989], for each pair of source bits, one bit is encoded with a rate ½ binary convolutional code, resulting in two encoded bits, and the other bit is used to determine the signal half-plane in the trellis bit-to-symbol mapping only, and is otherwise uncoded. In this embodiment, it is found that the second (uncoded) bit in each pair of source bits (one encoded and one uncoded) is more susceptible to bit errors than the coded bit, despite the trellis modulation. In certain embodiments, this bit is further encoded with a high rate (close to one) code, for example, with at least a Hamming single-bit error correcting code. In general, the source bit in each pair which is the uncoded or minimally coded half-plane trellis bit for rate ⅔ PTCM is not used for high-importance source bit data.

ECC encoding 41 may implement equal error protection (EEP) or unequal error protection (UEP) methods. After ECC encoding 41, the encoded and scrambled source message bit information is a plurality of consecutive ECC codewords, each with a predetermined bit length. Optional interleaver 43 shuffles the bits within one or a plurality of consecutive ECC codewords. The shuffling process in interleaver 43 acts on groups of one or a plurality of bits within each codeword, depending upon the method implemented for ECC encoder 41. When the subgroup size is one bit, then for convolutional ECC methods and binary block codes, interleaver 43 shuffles consecutive bits. However, for Reed-Solomon block codes, for example, interleaver 43 shuffles groups of bits, known as "symbols", but preserves the bit order within each symbol. In certain circumstances, the symbol size is selected to correspond to the size of the primitive (or "characteristic") element for the block code. For a Reed-Solomon block code over the Galois field $GF(2^8)$, the optimum symbol size is eight bits or an integer multiple thereof. In many embodiments, the subgroup size and consequently interleaver symbol size is 3 (three) bits or integer multiple thereof as in the case, for example, when implementing 8-ary modulation with average rate ⅔ ECC.

The interleaver length in bits, known as an interleaver "frame", corresponds to an integer multiple of the ECC codeword length so that a codeword is not split across consecutive interleaver frames by the shuffling process. An interleaver may often be implemented with a shuffling-algorithm and random-access-memory (RAM) hardware [reference: J. L. Ramsey, ibid.]. The maximum interleaver length is typically limited by the amount of RAM available for the implementation and by the allowable system throughput delay. For IBOC DAB, it is desirable in certain embodiments that the acquisition time of the receiver be no more than about one second so that there is not a long delay when a listener switches between channels. As a result, the interleaver length in time is between about 10 milliseconds and 500 milliseconds, preferably equal to or less than about 250 milliseconds.

The function of interleaver 43 is to substantially mitigate the probability of a strong correlation between the error probabilities of consecutively transmitted symbols determined at the receiver. The shuffling algorithm of the interleaver disperses transient bursts of consecutive bit errors over a longer time interval in order to cause a more uniform and random error distribution after corresponding deinterleaving in the receiver system.

After interleaving 43, resulting bit sequence 51 corresponds to consecutive groups of re-ordered (shuffled) ECC codewords. The re-ordered ECC codewords are used to data-modulate a set of subcarrier signals in each sideband, for example, as shown in the FIG. 7 subcarrier group modulator. In general, there are a plurality of subcarrier signals which are simultaneously transmitted and which have about the same signal interval length and which are synchronized. Each subcarrier signal conveys a fraction of the total bit rate throughput. In certain embodiments, the subcarrier signals are orthogonal or approximately orthogonal. According to certain embodiments, the frequency spectrum occupied by each subcarrier signal is substantially confined to either the upper sideband region or the lower sideband region (e.g. 11 and 13, respectively, in FIG. 1), but not both.

In certain embodiments, there are an even number of subcarrier signals, and half of the subcarrier signals have a spectrum which is substantially confined to the upper sideband region. These signals are defined as the "upper sideband group". Similarly, half of the subcarrier signals have a spectrum which is substantially confined to the lower sideband region, and these signals are defined as the "lower sideband group". Each bit or group of bits in each re-ordered ECC codeword from interleaver 43 is used to modulate at least two subcarrier signals; one subcarrier signal from the lower sideband group and one subcarrier signal from the upper sideband group. In general, the length of the ECC codeword in bits is greater than the bit rate throughput of a single subcarrier signal in a single information baud. Thus, in order to convey all of bits in each ECC codeword, subcarrier signals from the upper sideband group and lower sideband group are data-modulated over a plurality of baud intervals.

According to certain embodiments of the invention, each encoded bit determines the data-modulation of both one or a plurality of upper sideband subcarrier signals and one or a plurality of lower sideband subcarrier signals. An advantage obtained by modulating subcarrier signals from both the upper and lower sideband groups with the same ECC codeword is that said transmitter system has the advantage of frequency-diversity. Subcarrier signals in the upper sideband group are frequency-orthogonal to subcarriers in the lower sideband group. Furthermore, the upper sideband frequency region is separated from the lower sideband frequency region by about 200 kHz. Thus, noise, distortion, and interference which is frequency-selective may, in certain circumstances, only deleteriously affect subcarrier signals in one of the sideband groups (i.e. either upper or lower). For example, in most circumstances, significant amounts of first-adjacent analog FM-band interference into the desired IBOC DAB signal, with very low resulting D/U ratios, due to spectrum overlap occurs only in either the upper or lower sideband region, but not both at once. Since substantially redundant source bit information is conveyed by signals in both sideband regions in the transmitter according to certain embodiments of this invention, the corresponding receiver system is able to recover the transmitted source bit information when signals from only one of the sideband regions may be accurately determined. A similar advantage occurs when multipath propagation deleteriously affects one of the sideband regions by causing, for example, significant loss of signal amplitude in either the upper or lower sideband region, but not both. The frequency-diversity also helps to mitigate second-adjacent IBOC DAB interference when the second-adjacent IBOC DAB signal has significantly larger received signal energy than the desired signal. Although the second-adjacent IBOC DAB signal may be approximately frequency-orthogonal to the desired IBOC DAB signal when the outer band-edges of the IBOC DAB signal do not extend beyond 200 kHz from the analog FM-band center frequency, there may be some amount of frequency overlap due to the transmitter and/or receiver nonlinearities and the finite transition bandwidth. Since, according to certain embodiments of the invention, reliable determination of the signals in only one of the two sidebands is needed for adequate IBOC DAB receiver performance, the effect of frequency overlap on either the upper or lower sideband regions by a dominant interfering second-adjacent IBOC DAB signal is less severe. This advantage facilitates the use of a slightly wider IBOC DAB signal bandwidth (e.g. an increase in the outer band-edge frequency by about 10 kHz to 20 kHz) in certain circumstances, which may simplify the implementation of transmitter and receiver bandpass filtering by permitting a larger shape factor.

The ECC codeword bits 51 are used to data-modulate the subcarrier signals for both sideband signal groups. In FIG. 4, the one or plurality of modulators for the subcarrier signals in the upper sideband group is shown as upper sideband composite signal generator 49. The one or plurality of modulators for the subcarrier signals in the lower sideband group is shown as lower sideband composite signal generator 47. The data-modulated subcarrier signals for the upper sideband group are linearly summed together within generator 49 to form upper sideband composite signal 57. The data-modulated subcarrier signals for the lower sideband group are linearly summed together within generator 47 to form lower sideband composite signal 55. Signals 55 and 57 are frequency-orthogonal because the component subcarrier signals are frequency-orthogonal. Overall IBOC DAB composite signal 63 is generated by linearly summing 59 upper sideband composite signal 57 and lower sideband composite signal 55.

In certain embodiments, both composite signal generators 47 and 49 receive ECC codeword bit information 51 from optional interleaver 43 at the same time. However, in one preferred embodiment, one of the composite signal generators (either 47 or 49, but not both) receives the ECC codeword bit information with latency. In FIG. 4, upper sideband composite generator 49 is shown as having additional latency in receiving bit information 51 from interleaver 43 when compared to lower sideband composite signal generator 47, but the latency may be generated in either path. The latency is shown as diversity delay 45, which may be implemented with a first-in first-out (FIFO), binary shift register, or a random-access memory (RAM). According to this embodiment of the invention, the latency in bits created by delay 45 is an integer multiple of the ECC codeword length in bits. In certain embodiments, delay 45 is also equal to or larger than the length of interleaver 43 in bits so that the time intervals in which signals representing a ECC codeword and delayed replica are transmitted do not significantly overlap in occurrence.

The function of delay 45 is to add latency to either the bit information delivered to upper sideband composite signal generator 49 or to lower sideband composite signal generator 47. As the result of the delay, at a specific instant in time, composite signals 55 and 57 from generators 47 and 49, respectively, correspond to different ECC codewords. According to certain embodiments, delay 45 creates time-diversity in the system. Thus, the system has the advantages of both frequency-diversity and time-diversity. The time-diversity is ineffective at combating the deleterious effects of noise, interference, and distortion when these effects are approximately wide-sense stationary. However, in many circumstances, the receiver is in motion, for example, as in an automobile receiver. The time-diversity brought about by the invention may mitigate the deleterious effects caused by transient flat-fading (i.e. Rayleigh) multipath propagation when the duration of the fade is short compared to the delay length.

Although interleaver 43 causes the error distribution within an interleaver frame to be random and uncorrelated, when there is a transient period of time where there are a substantial number of errors, interleaving alone may be insufficient. Time-diversity is less effective at reducing the deleterious effects of adjacent-channel interference except when the received D/U ratio has been further compromised by, for example, Rayleigh multipath flat-fading. Interleaving, frequency-diversity, and time-diversity together in the transmitter system results in robust receiver performance when subjected to various forms of time-selective and frequency-selective distortion.

The presence of delay 45 causes additional latency in the transmitter and thus in the overall system. The total latency caused by delay 45 together with interleaver 43 is preferably less than about 500 milliseconds. In order to maximize the time-diversity advantage of delay 45, particularly for mobile receivers with low vehicle velocities, the length of delay 45 is about one-half of the total transmitter system latency (e.g. an interleaver length of about 250 milliseconds and a diversity delay of about 250 milliseconds).

In FIG. 4, the interleaved ECC codewords 51 are used to data-modulate the subcarrier signals in lower sideband composite signal generator 47 while the delayed and interleaved ECC codewords are used to modulate the subcarrier signals in upper sideband composite signal generator 49. Without consideration of delay 45, in certain embodiments, the codewords which are used to data-modulate the upper and lower sideband signals are not necessarily identical, but may be directly related to each other. For example, ECC codewords 53 for upper sideband composite generator 49 may be formed by inverting (i.e. binary ones to zeroes and vice versa) all of the binary digits in codeword sequence 51, or by using different ECC encoding algorithms for encoding the bits which modulate the upper and lower sideband signals. Such variations are considered within the scope of the invention of this disclosure because the underlying source bit information that is conveyed by the encoded codewords and by the modulation of both the upper and lower sideband subcarrier signals is substantially the same, including inverses and other reversible transformations.

Upper sideband composite signal generator 49 generates upper sideband composite signal 57. Lower sideband composite signal generator 47 generates lower sideband composite signal 55. The spectrum of composite signal 57 is substantially confined to the upper sideband region and the spectrum of composite signal 55 is substantially confined to the lower sideband region. In certain embodiments, signals 55 and 57 have substantially the same signal extent and are synchronous. Signals 55 and 57 may be generated directly at an RF carrier frequency suitable for analog FM-band emission or they may be generated at a lower frequency, which may be zero, and then frequency-translated to the desired FM-band carrier frequency. Composite IBOC DAB signal 63 is the linear summation of upper sideband composite signal 57 and lower sideband composite signal 55. The spectrum of composite IBOC DAB signal 63 is substantially confined to the upper and lower sideband regions together.

In certain embodiments, the IBOC DAB composite signal 63 is emitted from the same antenna system at the transmitter site as the conventional analog FM-band signal. Because the analog FM-band signal and the IBOC DAB signal 63 are unrelated and approximately frequency-orthogonal, the IBOC DAB signal 63 may be generated independently of the analog FM-band signal. In certain embodiments, a low power IBOC DAB signal is generated in the IBOC DAB transmitter and the resulting signal is raised to a higher power, suitable for RF emission, by a power-amplifier. In general, the IBOC DAB signal has simultaneous amplitude-modulation and phase-modulation, so that an approximately linear power-amplifier is required (e.g. class A, class AB). The high-power IBOC DAB signal may then be combined with the conventional high-power analog FM-band signal with a high-power hybrid waveguide coupler (not shown). The amount of power in the IBOC DAB signal is determined by the amount of power in the low-power IBOC DAB signal and the characteristics of the IBOC DAB high-power amplifier. The amount of power in the IBOC DAB signal is restricted so that the ratio between the IBOC DAB signal power and the analog FM-band signal power is approximately constant and within the emission mask. In certain embodiments, the total IBOC DAB RMS power is attenuated by between about 10 decibels and about 30 decibels, relative to the analog FM-band RMS power, and preferably attenuated by between about 12 decibels and about 20 decibels.

A disadvantage of combining the IBOC DAB signal and the analog FM-band signal at high-power is that the hybrid coupler exhibits significant insertion loss, resulting in wasted (heat) RF power. There is a reciprocal relationship between the amount of loss between the hybrid coupler port which is connected to the analog FM-band signal and the loss for the coupler port which is connected to the IBOC DAB signal. Minimizing the analog FM-band signal loss unfortunately minimizes the emitted power for the IBOC DAB signal. At high power levels (typically, tens of kilowatts), the signal loss may adversely affect the resulting coverage unless the loss is compensated for by increasing the transmitter power of the IBOC DAB signal and/or analog FM-band signal, which may not be practical at high power levels. A further disadvantage of this approach is that it requires separate power-amplifiers for the analog FM-band signal (typically, Class C saturating amplifiers) and for the IBOC DAB signal, which requires approximately linear amplification in the general case.

According to certain embodiments of the invention, shown in FIG. 4, the analog FM-band signal and the IBOC DAB signal may be combined prior to power amplification 67 and antenna emission. Analog FM-band signal 61 is generated by conventional analog FM-band signal generator 65. In many such implementations, conventional generator 65 is a voltage-controlled oscillator (VCO), or a numerically-controlled oscillator (NCO) for digital embodiments, which frequency-modulates a sinusoidal signal from LO signal generator 71 with analog FM baseband source signal 79 in order to generate the conventional FM-band signal. LO signal generator 71 is a sinusoidal signal generator whose frequency is equal to analog FM-band center frequency 1, $f_c$; in other words, LO source 71 is a RF carrier frequency reference. Resulting analog FM-band signal 61 is frequency-modulated and is directly related to a phase-modulation signal with a constant signal envelope. As described previously, power amplifiers for analog FM-band signals are typically Class-C saturating amplifiers, which maintain an approximately constant signal envelope. In general, a conventional Class-C saturating amplifier is not used for amplifying the low-power IBOC DAB signal, which requires linear amplification for simultaneous amplitude-modulation and phase-modulation. However, in certain implementations, a Class-C amplifier may be modified so that the amplifier is capable of generating a limited amount of amplitude-modulation, for example, less than fifty-percent (50%), together with the phase-modulation signal, for example, by modulating the screen voltage (with group delay and nonlinearity compensation) in a electron tube (e.g. VHF power tetrode such as Varian EIMAC 8989) power amplifier. Since the IBOC DAB signal is substantially smaller in power than the analog FM-band signal and since the analog FM-band signal requires only phase-modulation, the modified class-C power amplifier may be capable of amplifying a combined analog FM-band and IBOC DAB signal without substantial amounts of distortion.

In FIG. 4, power amplifier 67 is shown as being capable of phase-modulation and a limited amount of amplitude-modulation. The bandwidth of amplifier 67 is somewhat larger than the bandwidth occupied by the IBOC DAB signal together with the analog FM-band signal (i.e. greater than about 400 kHz), preferably about 600 kHz so that the IBOC DAB signal components towards the sideband outer edges are not distorted by the amplification. The input signals to the power amplifier are signals 73 and 75. Input signal 73 is the phase-modulated RF carrier frequency. Input signal 75 is the baseband amplitude-modulation signal; in other words, the signal which is multiplied together with the signal 73, affecting only the signal envelope, in order to generate the final signal to be emitted. When there is no IBOC DAB signal, signal 73 is the analog FM-band signal and signal 75 is a constant value (i.e. no amplitude modulation). When the IBOC DAB signal is present, a part of the IBOC DAB signal appears as amplitude modulation with respect to analog FM-band signal 61, which would ordinarily be absent, and a part of the IBOC DAB signal appears as further phase-modulation of analog FM-band signal 61. The phase-modulation and amplitude-modulation components of the IBOC DAB signal relative to the analog FM-band signal 61 are determined in AM&PM separator 69. The input signals to AM&PM separator 69 are analog FM-band signal 61, RF carrier frequency reference 71, and IBOC DAB signal 63. There are various implementations for AM&PM separator 69. In one embodiment, the analog FM-band signal and IBOC DAB composite signal are linearly summed together (with the appropriate power ratios) within AM&PM separator 69. The summed signal is decomposed into a baseband in-phase ($I_t$) signal and a baseband quadrature ($Q_t$) signal with respect to RF carrier frequency reference 71, by, for example, a hybrid I/Q demodulator and lowpass filters with matching amplitude and phase characteristics. The baseband phase-modulation component signal is then given by:

$$\theta_t \equiv \tan^{-1}\left(\frac{Q_t}{I_t}\right) \quad (1)$$

where $\tan^{-1}$ is the inverse tangent function. RF carrier reference frequency 71 is phase-modulated by the baseband phase-modulation component signal in Equation (1) to generate phase-modulated RF signal 73, LO+PM, so that:

$$LO+PM-\cos{(2\pi \cdot f_c + \theta_t)} \quad (2)$$

Baseband amplitude modulation component signal 75, AM, is the magnitude (envelope) of the vector sum of the in-phase and quadrature baseband component signals and is given by:

$$AM \equiv \sqrt{I_t^2 + Q_t^2} \quad (3)$$

The transmitter system may be phase-calibrated, for example, by ensuring that amplitude modulation component signal 75 is substantially a constant value when there is no IBOC DAB signal and that furthermore, in this circumstance, phase-modulated signal 73 substantially resembles analog FM-band signal 61.

Figure 5:
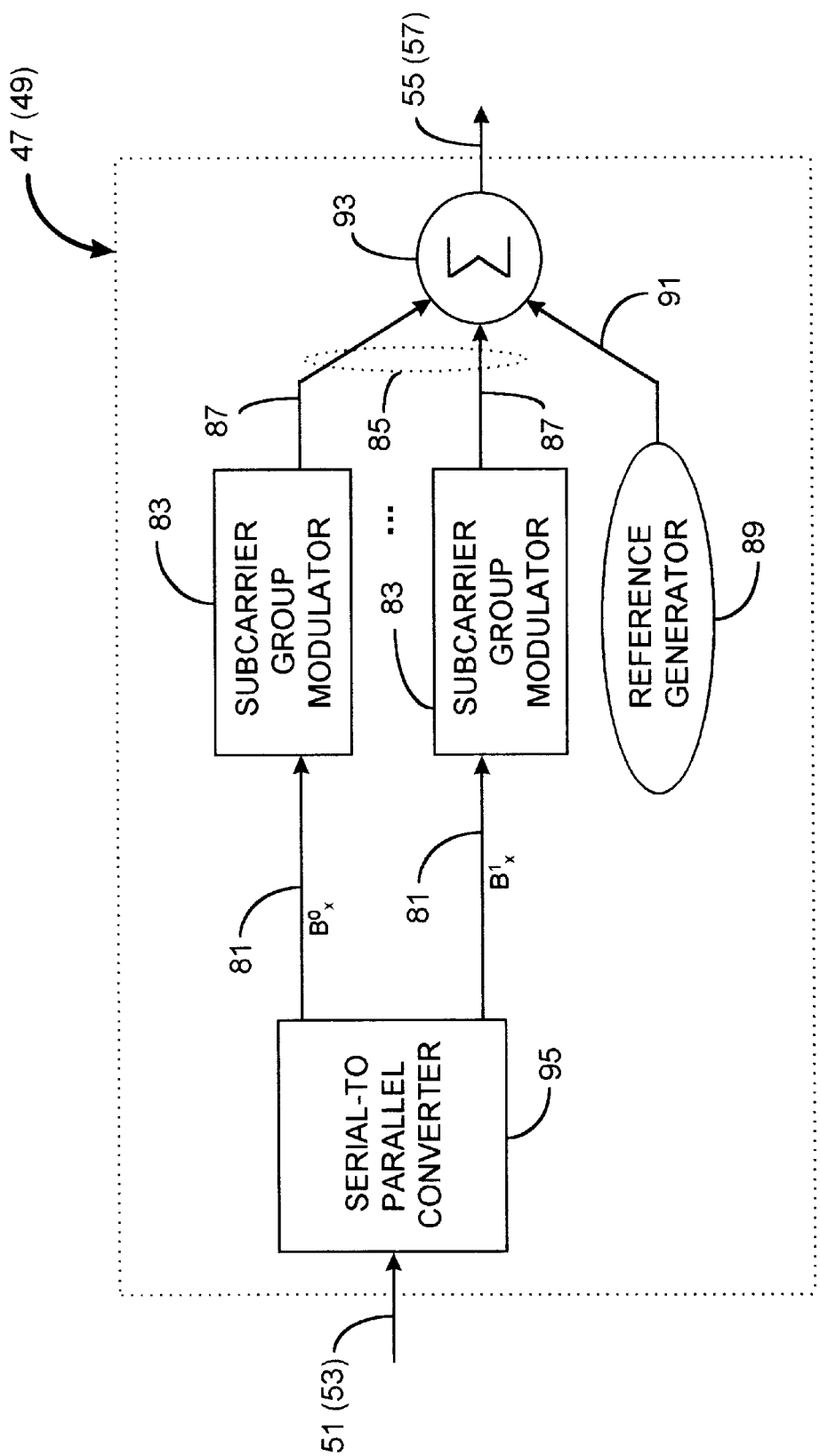
FIG. 5 is a block diagram of the implementation of each of the upper and lower sideband composite signal modulators in the FIG. 4 transmitter system when each composite signal is composed of a plurality of simultaneously transmitted subcarrier signals.

The implementation of upper sideband composite signal generator 49 and lower sideband composite signal generator 47 depends upon the specific modulation method used for the subcarrier signals and the form of subcarrier signal waveforms themselves. FIG. 5 is a block diagram for each of generators 47 and 49 for an embodiment with a plurality 85 of subcarrier signals which are simultaneously transmitted. Composite lower (upper) sideband signal 55 (57) is generated by the linear summation 93 of one or a plurality of data-modulated lower (upper) subcarrier signals 87. Composite lower (upper) sideband signal 55 (57) may optionally include summation 93 of reference signal 91 which is generated by reference generator 89 with plurality 85 of data-modulated subcarrier signals. The function of reference signal 91 is to facilitate equalization and/or synchronization in the receiver system.

In certain embodiments, reference signal 91 is a narrowband sinusoidal signal, in other words, a pilot tone, whose center frequency is approximately located about either i) the center of the lower (upper) sideband region or ii) located near the inner band-edge of the lower (upper) sideband region, which is the sideband edge closest to the analog FM-band signal. In general, it is not desirable to generate a narrowband pilot reference signal towards the outer band-edge because of the potential for large amounts of second-adjacent interference.

Each subcarrier group modulator 83 generates subcarrier signal 87, which is modulated according to bit data 81. Since there may be a plurality of subcarrier group modulators 83, lower (upper) sideband ECC codeword bit data 51 (53) is divided into groups of one or a plurality of bits in each signal interval by serial-to-parallel converter 95. Each subcarrier group modulator 83 generates subcarrier signal 87 using one or a plurality of subcarrier signals from the entire set of possible subcarrier signals for the lower (upper) sideband region. The possible subcarrier signals are partitioned into disjoint subsets which together span the set of lower (upper) subcarrier signals. Each subcarrier group demodulator 83 makes use of one of the determined subcarrier sets. In certain embodiments, not all of the signals from the total set of lower (upper) subcarrier signals may be transmitted in a specific baud interval, for example, with biorthogonal modulation, in which only one subcarrier signal in a group of subcarrier signals is emitted.

The implementation of subcarrier group modulators 83 depends upon the specific waveform shape and modulation method for the individual subcarrier signals. In the most general case, the subcarrier signal waveforms are sequences of numbers which are stored in a memory device, for example, a read-only memory (ROM) or generated by mathematical functions. In certain embodiments, the subcarrier signal waveforms are narrowband sinusoid shapes in the time-domain representation, as in the known method of OFDM and variations known as COFDM and Discrete Multitone (DMT) modulation. For an OFDM modulation embodiment, there are an even number, L, of narrowband subcarrier signals, organized as L/2 signal pairs, which when considered together have a spectrum which occupies the upper and lower sideband regions. Each pair of signals is substantially orthogonal to the remaining signal pairs. The spectrum of each signal pair in one half of the signal pairs is substantially confined within the upper sideband region and the spectrum of each signal pair in the remaining half (which is distinct and disjoint to the first half) is substantially confined within the lower sideband region. When considered as a composite, the spectrum of the lower (upper) sideband narrowband subcarrier signals substantially occupies the lower (upper) sideband region only. Within each pair of narrowband signals, the two subcarrier signals have the same frequency but are phase-orthogonal (i.e. quadrature or out-of-phase by π/2 radians) and are time-limited sinusoid-like waveforms. The signals are transmitted simultaneously and in synchronism. The duration in time of the signals (i.e.

the periodicity), $\Delta T$, is about the same for all signals. The frequency separation between signal pairs is, by the OFDM construction, the reciprocal of the signal extent, in other words, $1/\Delta T$. The preferred signal time-duration is between about 100 microseconds and about 1 millisecond for VHF frequencies and between about 50 microseconds and 200 microseconds for L-band frequencies. In the OFDM embodiment, consecutive signal intervals are separated by an additional amount of time known as the "guard" interval. The guard interval is determined to be larger than the expected multipath delay spread, preferably between about 20 microseconds and 100 microseconds. The guard interval is typically appended at the beginning of the signal interval. The waveform shape in the guard interval period may be substantially zero or a cyclic extension of the subcarrier signal.

For the method of OFDM, the narrowband spectrum of the subcarrier signals results in substantially flat-fading multipath effects even when the RF channel propagation characteristics are frequency-selective. The guard interval mitigates the deleterious effect of intersymbol interference because signal echoes from adjacent signal intervals may substantially overlap only within the guard interval, when the guard interval is sufficiently long; the guard interval is disregarded in the demodulation process. Phase-tracking of the narrowband subcarrier signals in the receiver system is facilitated by i) generating one of the OFDM subcarrier signals in each of the upper sideband region and lower sideband region without data-modulation, which is equivalent to generating two pilot tones, or by ii) periodically modulating the subcarrier signals with predetermined data, known as a training sequence or synchronization preamble. Other phase-tracking methods and differential modulation methods are known for OFDM modulation and its variation.

In certain OFDM embodiments, the overall IBOC DAB signal, which represents the linear sum of the upper and lower sideband composite signals, may be generated digitally so that separate signal generators 47 and 49 are not required. This is accomplished, for example, by digitally computing the Inverse Fast Fourier Transform (IFFT) algorithm of a frequency-domain sequence whose elements (coefficients) correspond to the modulation state for the plurality of narrowband sinusoid OFDM subcarrier signals. In general, the coefficients of the frequency-domain sequence are complex (i.e. having real and imaginary scalar values). Each complex coefficient corresponds to the amplitude-modulation and phase-modulation state of one of the plurality of quadrature signal pairs. For each complex coefficient in the sequence, the real scalar value corresponds to the modulation of the in-phase signal for each signal pair and the imaginary scalar value corresponds to the modulation of the quadrature signal in each signal pair. The resulting envelope (amplitude) and phase modulation for each quadrature subcarrier pair are given by Equations (2) and (1), described previously. Thus, for the L/2 signal pairs, there are L/2 complex non-zero frequency-domain coefficients. For digital representations and implementations of the subcarrier and composite signals in the transmitter system, a time-increment, in other words, a sample-time, is required so that a relationship between sequence coefficients and time-domain samples is established. The increment in the time-domain representation, $\Delta t$, is determined so that the quantity $1/(N \cdot \Delta t)$ is equal to the OFDM frequency increment, $1/\Delta T$, and where N is the length of the Inverse Fast Fourier Transform, typically an integer power of two and greater than the number of signal pairs, L/2.

Figure 6:
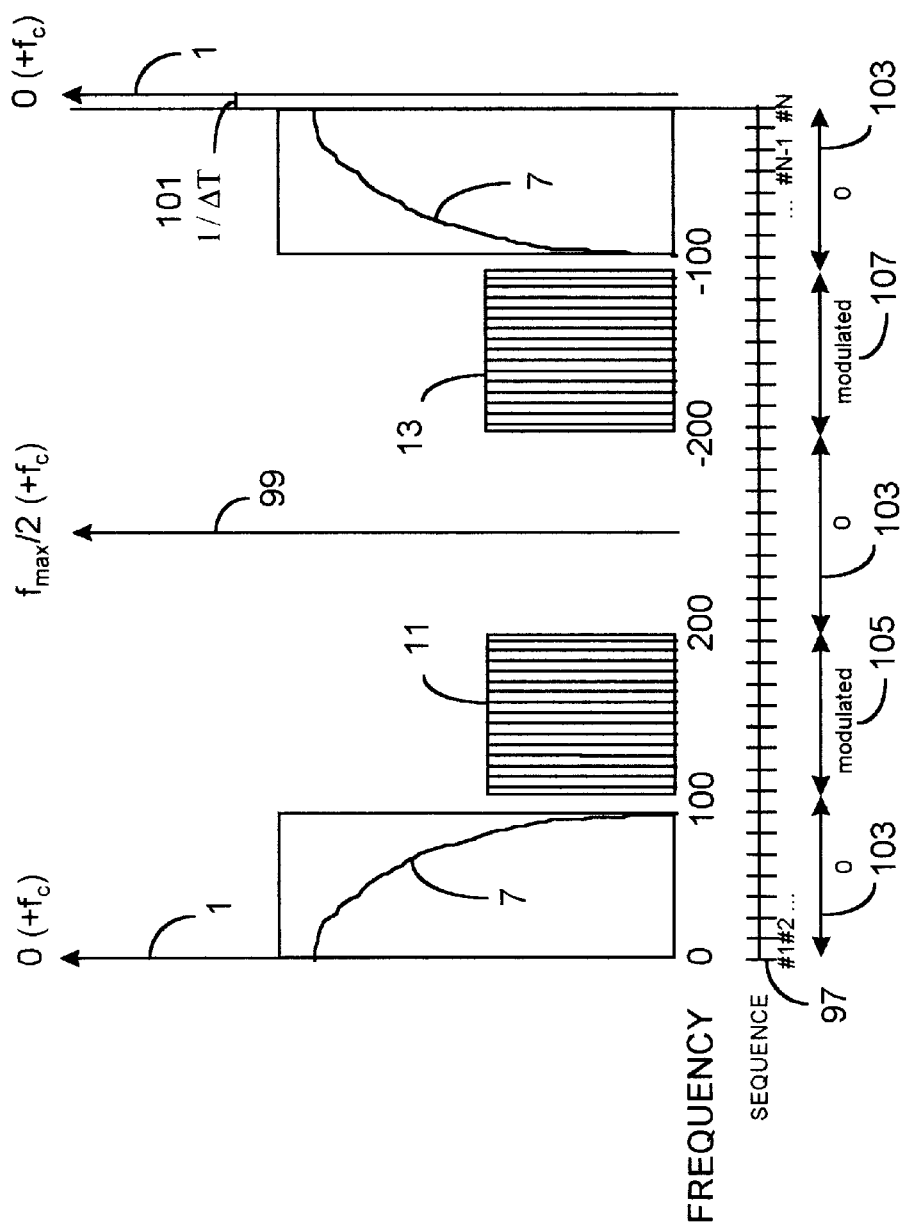
FIG. 6 is a representation of the frequency-domain coefficient sequence which is generated in an embodiment of the FIG. 4 transmitter system for narrowband subcarrier signals and ODFM modulation.

The mapping between frequency-domain coefficients and the IBOC DAB spectrum is shown in FIG. 6 for the generation of OFDM subcarrier signals. Frequency-domain complex sequence 97 corresponds to the modulated amplitude and phase state of a plurality of sinusoid-like subcarrier signals, beginning at a zero frequency offset relative to desired analog FM-band center frequency 1 and extending to maximum frequency offset 99 of about $N \cdot \Delta T/2$, with frequency separation 101 between narrowband subcarrier signals of about $1/\Delta T$. From the total of N elements in sequence 97, about the first N/2 elements span a frequency region which includes upper sideband region 11 (i.e. positive frequency offsets), while about the remaining N/2 elements span a frequency region which includes lower sideband region 13 (i.e. negative frequency offsets). Ordinal one (i.e. the first element) of complex sequence 97 corresponds to the DC-value of the signal at baseband (or the large carrier component at RF), which is typically about zero for IBOC DAB signals. Ordinal two corresponds to the positive frequency offset closest to the analog FM-band center frequency (the first non-zero positive frequency), which is $+1/\Delta T$. The first negative frequency offset, which is $-1/\Delta T$, corresponds to sequence ordinal N. The frequency region spanned by complex frequency-domain sequence 97 is typically larger than the frequency region occupied by sideband regions 11 and 13 together. The plurality of sequence coefficients 103 which correspond to frequency offsets outside of the desired sideband regions 11 and 13 are set to the value zero in the transmitter system implementation because the IBOC DAB signal does not have signal components at those frequencies. This zero-valued region includes spectrum region 7 where the analog FM-band signal is substantially located. The plurality of coefficients 105 and 107, which corresponds to frequency offsets that are within the desired upper sideband region 11 and lower sideband region 13, respectively, are set according to the modulating data sequence which is, in certain embodiments, the interleaved ECC codewords, 53 and 51, respectively. For each signal interval, after determining the frequency-domain sequence values, the Inverse Fast Fourier Transform of frequency-domain sequence 97 is computed in order to determine a complex sequence which is the corresponding time-domain representation of IBOC DAB signal 63 (upper and lower sidebands together) at baseband, having an in-phase signal component and a quadrature signal component with respect to the RF center frequency. The baseband in-phase and baseband quadrature signal components may be frequency-translated (not shown) to the desired analog FM-band center frequency 1 with, for example, a hybrid I/Q modulator and LO oscillator source 71 at center frequency 1 $f_c$, or by other known frequency-shifting methods, and combined with the analog FM-band signal as shown in FIG. 4.

Figure 3:
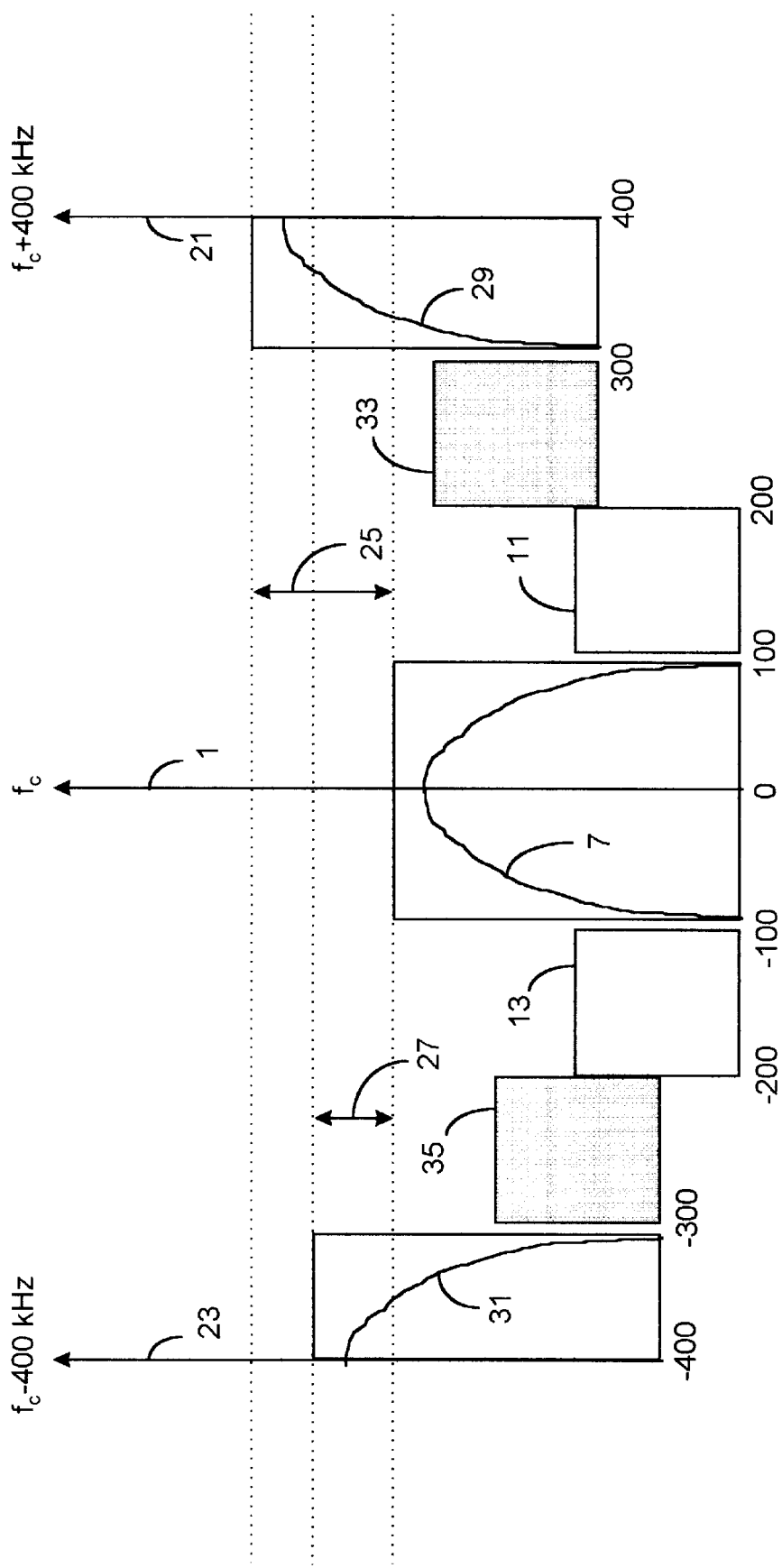
FIG. 3 is a graphical representation of the deleterious interchannel interference circumstance which occurs in the second-adjacent circumstance, when there are two simultaneous analog FM-band signals and associated IBOC DAB signals at positive and negative 400 kHz frequency offsets.

In another embodiment, upper sideband composite signal 57 and lower sideband composite signal 55 are generated independently, even when the subcarrier signals are implemented with OFDM. In this circumstance, two frequency-domain sequences are generated; one sequence corresponding to upper sideband region 11 only and one sequence corresponding to lower sideband region 13 only. Frequency sequence coefficients in the upper (lower) sideband sequence which correspond to the lower (upper) sideband frequencies are set to zero. Separate IFFT processing is required for the two sequences. The result of the separate transforms is two complex sequences which are the baseband time-domain representation of upper and lower sideband composite signals 57 and 55. The baseband time-domain sequences may be frequency-translated to the desired analog FM-band center frequency with a hybrid I/Q modulator and LO source 71, as described in the previous paragraph, but this is equivalent to the previous embodiment. In the variation of the embodiment, one of the sideband composite signals (either upper or lower) is frequency-translated to the desired analog FM-band center frequency, but also with a further frequency offset which is about equal to one-half (½) of the OFDM frequency increment, $1/\Delta T$, or odd multiple thereof, with either positive or negative polarity. The advantage provided by the additional frequency offset for one of the sideband composite signals occurs when second-adjacent IBOC DAB interference is present. As described previously, second-adjacent interference causes distortion in the received IBOC DAB signal because of some amount of frequency overlap between the second-adjacent IBOC DAB signal and the desired IBOC DAB signal. As shown in prior art FIG. 3, upper sideband 35 of second-adjacent IBOC DAB signal with center-frequency 23 (−400 kHz offset) may overlap lower sideband 13 of the desired IBOC DAB signal, and/or lower sideband 33 of second-adjacent IBOC DAB signal with center-frequency 21 (+400 kHz offset) may overlap upper sideband 11 of the desired IBOC DAB signal. By offsetting the frequency components of the composite signals in one of the sideband regions with respect to the other sideband region, the frequency-orthogonality between the upper and lower sideband regions is improved when there is spectrum overlap in the second-adjacent circumstance. According to the invention, the interfering upper (lower) IBOC DAB sideband composite signal components may be offset in frequency compared to desired lower (upper) IBOC DAB sideband signal components, which reduces the effect of spectrum overlap. In order for the additional frequency offset to provide an advantage, the frequency difference between the actual analog FM-band center frequency, for example as implemented in LO source signal generator 71, and the nominal center frequencies ($f_c$ and $f_c \pm 400$ kHz) for both the desired transmitter's IBOC DAB signal and interfering transmitter's IBOC DAB signal must be small when compared to the additional frequency offset, which is $1/(2 \cdot \Delta T)$ or odd multiple thereof. This may require the use of high-accuracy, high-stability frequency sources in the IBOC DAB transmitter systems. In certain embodiments, the OFDM frequency separation between subcarrier signals, $1/\Delta T$, is less than about 15 kHz, so that a frequency accuracy of better than about 1 kHz of the nominal center-frequency is preferable.

When the OFDM subcarrier signals are data-modulated with antipodal (i.e. polarity, bipolar, BPSK) modulation, each subcarrier conveys 1 encoded bit for each baud interval. Thus, each quadrature pair of signals conveys 2 encoded bits in each baud interval, which is equivalent to the bit rate throughput of Quaternary Phase-Shift Keying (QPSK) modulation and variations thereof. In certain embodiments, the desired source bit rate throughput of the IBOC DAB system, considering the subcarrier signals in one of the sidebands, is about 200 kbit/sec in order to accommodate about a 128 kbit/sec digital audio signal and about 64 kbit/sec of ancillary data. The other sideband does not increase the effective source bit information throughput because redundant source information is transmitted in both sideband regions. In each of the upper and lower sideband regions, there is between about 80 kHz and 120 kHz, preferably about 100 kHz, of spectrum in which an IBOC DAB signal may be generated so that it is i) approximately frequency-orthogonal to the analog FM-band signal and ii) within a total (IBOC DAB and analog FM-band signal together) occupied bandwidth of about 400 kHz so that second-adjacent interference does not substantially limit signal coverage. The desired sideband frequency spectrum for IBOC DAB is located at a frequency offset of between about 100 kHz and 200 kHz, inclusive, from corresponding analog FM-band center frequency 1; positive frequency offsets for upper sideband region 11 and negative frequency offsets for lower sideband region 13. Therefore, an effective source bit throughput rate of about 2 bits/sec/Hz is adequate for said IBOC DAB configuration without additional considerations. However, a 2 bits/sec/Hz source bit throughput rate does not allow for the incorporation of ECC redundancy information with the digital audio and ancillary data signal. Mobile digital communication systems require reasonable amounts of ECC redundancy in order to be robust against the effects of noise, interference, and distortion. Thus, in certain embodiments, the encoded bit throughput rate is necessarily increased to be between about 3 bits/sec/Hz and 4 bits/sec/Hz, preferably closer to 3 bits/sec/Hz, so that an ECC method (e.g. convolutional, Reed-Solomon, or combination thereof) with about an average code rate of two-thirds (⅔) may be implemented in the transmitter and receiver systems. For example, suitable convolutional codes for Gray-code bit-to-symbol mapping are the rate ⅔ punctured codes described by L. H. C. Lee [reference: L. H. C. Lee, "New rate-compatible punctured convolutional codes for Viterbi decoding," *IEEE Transactions on Communications*, Vol. 42, No. 12, pp. 3073–3079, December 1994], and also described by P. J. Lee [reference: P. J. Lee, "Constructions on rate (n-1)/n punctured convolutional codes with minimum required SNR criterion," *IEEE Transactions on Communications*, Vol. 36, No. 10, pp. 1171–1174, October 1988]. For pragmatic trellis coding and modulation of subcarrier signal pairs, the codes described by Viterbi [reference: A. J. Viterbi, J. K. Wolf, E. Zehavi, and R. Padovani, ibid.], and for optimal trellis coding, the codes described by Ungerboeck [reference: Ungerboeck, "Channel coding with multilevel/phase signals," *IEEE Transactions on Information Theory*, Vol. 28, No. 1, pp. 55–67, January 1982] may be implemented in certain embodiments of the invention. With a rate ⅔ ECC code and a 3 bits/sec/Hz throughput, the source bit rate throughput after ECC decoding is then about the desired 2 bits/sec/Hz. For rate ⅔ convolutional coding, a practical input bit constraint length is between about K=7 and K=9, inclusive, in certain embodiments.

In order to achieve an encoded bit rate throughput of about 3 bits/sec/Hz for the subcarrier signals in each of the upper and lower sideband regions, about 8 (i.e. $2^3$) discrete modulation states are required for each pair of orthogonal subcarrier signals in each symbol baud. When the subcarrier signals are narrowband, for example, in the method of OFDM, 8-ary phase-shift-keying (8-ary PSK) may be implemented for the data-modulation of each quadrature (i.e. I and Q) subcarrier signal pair, where the modulation state is determined by the source bit information encoded with rate ⅔ convolutional, trellis, and/or block ECC coding. Each eight-valued phase state for a non-zero subcarrier frequency component is mapped onto an in-phase and quadrature component; for example, a phase state of θ degrees with unit magnitude is mapped to an in-phase (real) component of cosine(θ) and a quadrature (imaginary) component of sine (θ). In certain embodiments, an excess phase value, which is a function of frequency offset, is added to each of the determined phase-values so that the "group delay" of the resulting signal in the time-domain representation is about equal to half of the signal extent. When a ECC code with rate ⅔ is implemented, for example, with 8-ary PSK modulation of narrowband subcarriers, the fraction of the bits of each ECC codeword to be transmitted in a specific baud interval is further organized as one group or divided into a plurality of groups of three bits. Each group of three bits is used to determine one of the eight phase-modulation states for a specific subcarrier signal pair according to a bit mapping, which may be a Gray code mapping [reference: E. J. McCluskey. *Logic Design Principles*. Englewood Cliffs, N.J.: Prentice-Hall, 1986, pp. 17–19] or rate ⅔ 8-ary PSK with trellis or pragmatic trellis modulation and coding.

For an embodiment of the invention with a total of L narrowband subcarrier signals and OFDM modulation, there are L/2 mutually orthogonal quadrature signal pairs which are modulated and simultaneously transmitted; L/4 distinct narrowband subcarrier signal pairs whose spectrum is confined within the upper sideband region and L/4 distinct narrowband subcarrier signal pairs whose spectrum is confined within the lower sideband region. In each baud interval, for each subcarrier pair, one or both signals within in each pair may be transmitted with discrete-valued amplitude modulation so that each distinct emitted frequency component corresponds to 8-ary PSK modulation. Each subcarrier signal has a digital time-domain representation which consists of N complex (I and Q with respect to the RF carrier frequency) samples with a sample-time of $\Delta t$. A known disadvantage of OFDM modulation is that certain subcarrier signals, having very narrow bandwidth, may be significantly attenuated by the effects of frequency-selective distortion, for example, a narrowband multipath notch or transmission zero in the RF channel frequency characteristic. Furthermore, those narrowband subcarrier signals toward the inside and outside band-edges of the upper and lower sideband regions may be susceptible to interference from either i) the analog FM-band signal, which primarily affects those subcarriers toward the inner band edges at about ±100 kHz, or ii) from first-adjacent analog FM-band signals and second-adjacent IBOC DAB signal interference, affecting primarily those subcarriers toward the outer band edges at about ±200 kHz. Thus, in certain circumstances, it may be preferable that the frequency spectrum of each subcarrier signal in the upper (lower) sideband region substantially occupy the entire upper (lower) sideband region so that only a portion of the spectrum of the subcarrier signal is deleteriously affected by very narrowband (e.g. 30 kHz notches) frequency-selective interference or distortion.

For wideband subcarrier signals, it is desirable to have L/2 mutually orthogonal or approximately orthogonal signals, each of which has a frequency spectrum that substantially spans and is confined within the upper sideband region only, and L/2 mutually orthogonal or approximately orthogonal signals, each of which was a frequency spectrum that substantially spans and is confined within the lower sideband region only. For example, spread spectrum waveforms using, for example, pseudo-noise (PN) sequences, Kasami sequences, Bent sequences, Gold sequences, and perfectly orthogonal variations thereof, have a wideband frequency spectrum [reference: D. V. Sarwate and M. B. Pursley, "Crosscorrelation properties of pseudorandom sequences," *Proceedings of the IEEE*, Vol. 68, No. 5, pp. 593–619, May 1980]. However, for signals to be substantially confined within the sideband region while making use of as much of the available sideband region as possible, it may be preferable that the subcarrier signals be further shaped. The shaping may deleteriously affect the correlation properties of binary-value sequences. When the desired spectrum shape is known, wideband signals which are orthogonal are determined by the left eigenvectors of the shaped spectrum's autocorrelation matrix, as described by Kasturia, et. al. [reference: S. Kasturia, J. T. Aslanis, and J. M. Cioffi, "Vector coding for partial response Channels," *IEEE Transactions on Information Theory*, Vol. 36, No. 4, pp. 741–762, July 1990]; see U.S. Pat. No. 4,403,330 to Halpern, et. al., which also describes a spectrally shaped waveform design method using eigenvectors.

Whether the spectrum of each of the subcarrier signals is narrowband, as is the case for OFDM signals, or wideband within a sideband region, the bit rate throughput requirement is unchanged. In general, the required information density when encoded with redundancy is between about 2 bits/sec/Hz and 4 bits/sec/Hz, preferably about 3 bits/sec/Hz, with an average ECC code rate between about ¾ and about ½, preferably about ⅔, so that the source (user) bit rate throughput is about 2 bits/sec/Hz. A narrowband embodiment with 8-ary PSK modulation and rate ⅔ encoding (Gray or trellis) was described previously. For the embodiment with a plurality of L wideband subcarrier signals, the set of L/2 upper (lower) sideband wideband subcarrier signals may considered as a set of L/4 upper (lower) wideband orthogonal signal pairs. The partitioning of the L/2 upper (lower) subcarriers into L/4 distinct pairs is arbitrary because the subcarrier are orthogonal or approximately orthogonal. Within each pair of wideband subcarrier signals, one of the two signals is labeled as an in-phase (I) signal, and the other signal in the pair is labeled as a quadrature (Q) signal. The determination within each pair as to which signal is the I signal and which is the Q signal is arbitrary and is unrelated to the in-phase and quadrature signal components of the RF carrier frequency. Then, methods for rate ⅔ 8-ary PSK narrowband modulation, for example, Gray coding, Ungerboeck trellis coding, or pragmatic trellis coding, referenced previously, which make use of I and Q signals may also be implemented for each of the upper (lower) sideband wideband subcarrier signal pairs.

Figure 7:
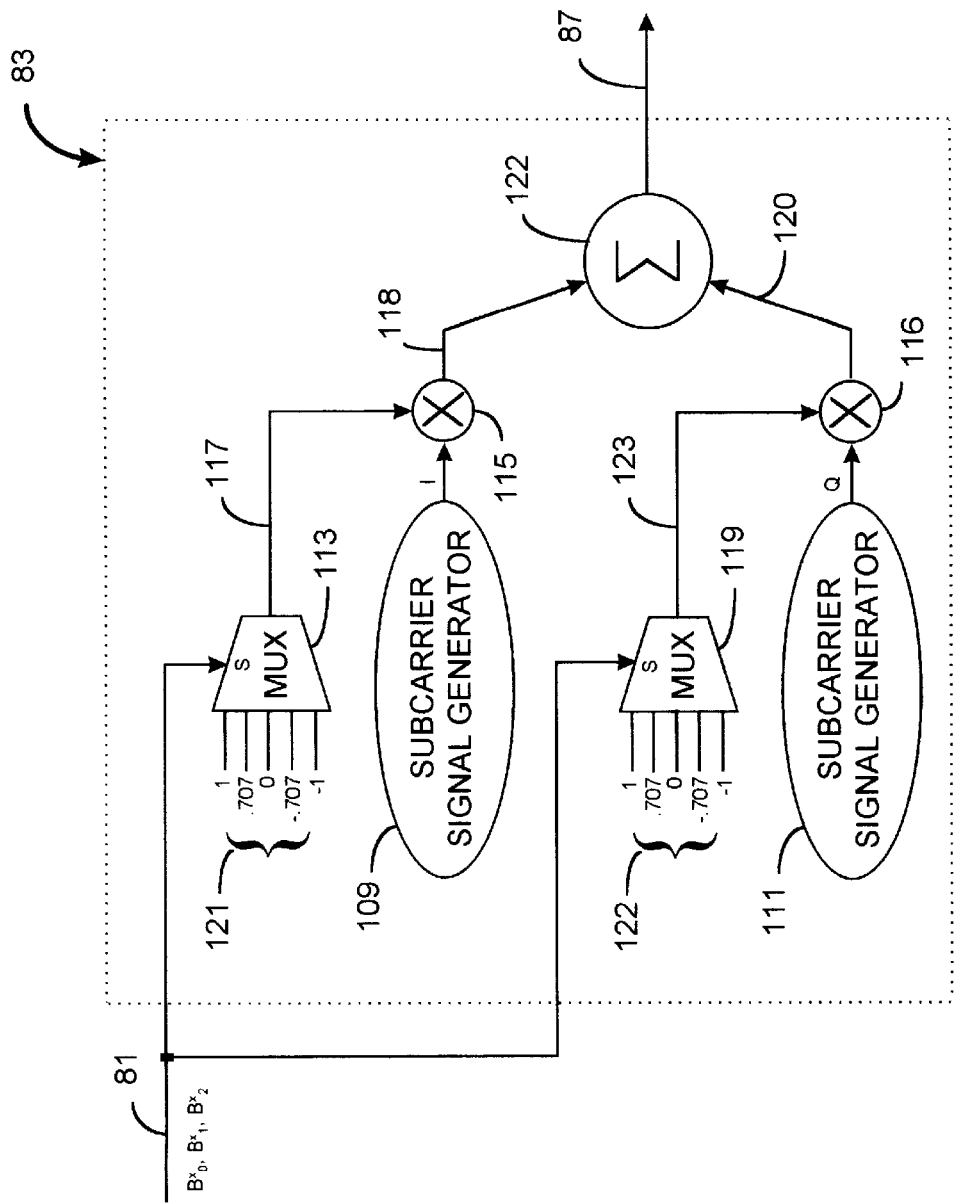
FIG. 7 is a block diagram of each of the FIG. 5 subcarrier group modulators in the transmitter system when each pair of subcarriers is transmitted with one of two kinds of 4-ary PSK modulation, including a selection bit and two phase bits, according to the Table 1 bit-to-symbol mapping. This embodiment is also applicable for other bit-to-modulation symbol mappings, for example, trellis and pragmatic trellis encoding, but with ordering different from that shown in Table 1.

FIG. 7 is a block diagram of an embodiment of each upper (lower) sideband subcarrier group modulator 83 in FIG. 5. Referring to FIG. 5, each upper (lower) subcarrier group modulator 83 makes use of two wideband or narrowband upper (lower) subcarrier signals to determine resulting signal 87. There are L/4 upper (lower) sideband subcarrier group modulators 83 in the generation of upper (lower) sideband composite signal 57 (55). ECC encoder 41 is an average rate ⅔ ECC code, for example, a convolutional code. Encoded and interleaved source bits 51 (53) are divided into groups of three bits after serial-to-parallel conversion 95. Each group of three bits 81 is used to modulate two subcarrier signals for each subcarrier group modulator 83 for each baud interval.

The embodiment of subcarrier group modulator 83 in FIG. 7 is appropriate for a variety of different modulation methods which require different bit-to-symbol mappings. According to certain embodiments of the invention, for a particular embodiment of 8-ary modulation with narrowband or wideband subcarrier pairs, in each group of three ECC encoded bits, one bit, a "selection" bit $B^X{}_0$, determines which one of two kinds of 4-ary phase constellations (4-ary PSK) are transmitted for each subcarrier group modulator in each baud interval. The remaining two bits in each group, "phase" bits $B^X{}_1$, and $B^X{}_2$, determine the specific state of the 4-ary PSK modulation. 4-ary PSK modulation requires two bits to uniquely specify the 4-ary modulation state. Methods of implementing 4-ary PSK modulation are known, for example, biorthogonal modulation and Gray-coded Quaternary Phase-Shift Keying (QPSK) and variations thereof.

In FIG. 4, the ECC method for the selection and phase bits together is about average rate ⅔ code in certain embodiments. Within ECC encoder 41, separate ECC encoders (possibly with the same ECC algorithm) are implemented for those source bits which when encoded and interleaved are the selection bits, and for those source bits which when encoded and interleaved are the phase bits. Similarly, separate scramblers within scrambler 39 are, in general, implemented for those source bits which when encoded and interleaved become the selection bits and those source bits which when encoded and interleaved become the phase bits. Since the selection bits and phase bits may have different code rates and/or ECC algorithms, the selection bits and the phase bits correspond to elements from different (first and second) encoded ECC sequences or codewords. The sequence of selection bits over some plurality of baud intervals is a selection bit (first kind) ECC codeword while the sequence of phase bits over a corresponding plurality of baud intervals is the polarity bit (second kind) ECC codeword. The first and second codewords are transmitted redundantly by modulating subcarrier signals in both the upper and lower sideband regions. The association between each selection bit and two phase bits necessitates that interleaver 43 in the FIG. 4 transmitter system be a "symbol" interleaver as opposed to a "bit" interleaver and that each symbol for interleaver 43 include both the selection bit and two phase bits (i.e. minimum symbol length of three bits or multiple thereof).

The ECC codes implemented in encoder 41 for those source bits which become the selection and phase bits after encoding and interleaving may be an average rate ⅔ code when considered together, but with different amounts of ECC redundancy for those source bits associated with the selection bit and those source bits associated with the phase bits, known as unequal error protection (UEP), in contrast to the circumstance where there are equal amounts of redundancy for all source bits, known as equal error protection (EEP). When the overall average ECC code rate is R, preferably equal to about ⅔, the rate for the selection bit code is $R^S$, and the rate for the phase bit code is $R^{PSK}$, then the relationship between code rates is expressed as:

$$R = \frac{1}{3} \cdot R^S + \frac{2}{3} \cdot R^{PSK} \qquad (4)$$

For unequal error protection (UEP) coding, the ECC codes may be related by the same generating polynomials with different puncturing patterns, or the codes may be unrelated, for example, different generating polynomials or different types of codes altogether such as convolutional coding for the selection bits and block coding for the phase bits or vice versa, or combinations of convolutional and block ECC coding for both the selection and phase bits. For example, UEP punctured convolutional codes with rates between about ⅓ and about ½ and between about ¾ and about ⁶⁄₇ are known [reference: L. H. C. Lee, "New rate-compatible punctured convolutional codes for Viterbi decoding," ibid.]. In certain embodiments, the selection bits are generated by encoding a fraction of the scrambled source bits with a code rate no more than about one-half (½), and closer to one-third (⅓) (e.g. convolutional encoding with binary generating polynomials 133 and 171 and 165) and the phase bits are generated by encoding the remaining fraction of the scrambled source bits with a code rate no less than about ¾, and closer to five-sixths (⅚) (e.g. convolutional encoding with binary generating polynomials 133 and 171 with puncturing pattern $$\begin{vmatrix} 11010 \\ 10101 \end{vmatrix}$$

For an exemplary EEP embodiment, which is preferred for Gray code bit-to-symbol mapping only (see Table 2) and which is not the preferred embodiment for the selection and phase bits ECC encoding and Table 1 bit-to-symbol mapping, the encoded binary triplets correspond to a code with about rate ⅔ (e.g. convolutional encoding with binary generating polynomials 133 and 171 with puncturing pattern $$\begin{vmatrix} 11 \\ 10 \end{vmatrix}$$

An advantage of the described 8-ary selection and phase bit modulation of the subcarrier signal pairs in certain embodiments is that it facilitates the use of a lower code rate (e.g. ⅓) for the selection bits than the phase bits. The error probability of the selection bits is greater than the error probability of the phase bits, without consideration of the ECC coding, because the constellation signal points within the same 4-ary PSK constellation are further apart, having greater Euclidean inter-point distance, than those signal points which are adjacent, but from different 4-ary PSK constellations. Thus, the selection bits require more ECC redundancy in order to achieve the same decoded bit error rate as the polarity bits. In general, very powerful codes are easier to determine and implement for relatively low code rates (less than or equal to about rate ½) than for higher code rates, for example, binary codes with iterative decoding (e.g. concatenated codes and turbo codes) [reference: J. Hagenauer, E. Offer, and L. Papke, "Iterative decoding of binary block and convolutional codes," *IEEE Transactions on Information Theory*, Vol. 42, No. 2, pp. 429–445, March 1996]. The selection and phase bit-to-symbol mapping with UEP facilitates the use of powerful, low-rate codes for the selection bits, while the phase bits may be encoded with simpler, conventional non-iterative convolutional and/or block codes because of the signal-to-noise (SNR) ratio advantage in the determination of the phase bits, when the selection bits are determined correctly, due to the greater distance between points in the same 4-ary constellation.

In FIG. 7, selection and phase bits together, as binary triplets 81, are used to determine generated signal 87 for each subcarrier group modulator 83. Bits 81 are propagated to multiplexors 113 and 119 as the control bits. A "multiplexor" is a switch which propagates one of a plurality of "m" data inputs according to one or a plurality of control bits. Each of the "m" inputs may consist of one or a plurality of bits in digital embodiments or signals in analog embodiments. The control input of each multiplexor is labeled as "S" in this disclosure. The data inputs for multiplexors 113 and 199 are sets of amplitude-scale factors 121 and 122, respectively. Each of amplitude scale factor sets 121 and 122 are the five scalar values: about 1 (one), about 1/√2 (0.707), about 0 (zero), about −1/√2 (−0.707), and about minus one (−1), or arbitrary multiples thereof.

In each subcarrier group modulator 83, subcarrier signal generator 109 emits a signal which is the time-domain representation for one of the two (unmodulated) waveform shapes in the subcarrier signal pair. Similarly, subcarrier signal generator 111 emits a signal which is the time-domain representation of the other (unmodulated) subcarrier waveform shape for the pair. Subcarrier signal generators 109 and 111 emit the subcarrier waveform shapes for each baud interval. One of the emitted subcarrier signals in group modulator 83, arbitrarily from generator 109, is labeled as the in-phase (I) subcarrier signal. The remaining signal from generator 111 is labeled as the quadrature (Q) signal for the specific group (pair). Subcarrier signal generators 109 and 111 may be implemented with memory devices, for example, read-only-memory (ROM) or pre-loaded random-access-memory (RAM). In certain embodiments, the subcarrier signal waveforms may be represented by mathematical functions (e.g. sinusoids) so that signal generators 109 and 111 are function generators, which may require substantially less memory to implement. The emitted signals from generators 109 and 111 are multiplied 115 and 116 by scalar values which are constant for the duration of the baud interval. The multiplying scalar values are determined by multiplexors 113 and 119 which propagate one of the values for each input set 121 and 122. Resulting modulated subcarrier signal 118, which is the time-domain waveform from subcarrier signal generator 109 multiplied 115 by scale-factor 117 propagated by multiplexor 113, is linearly summed 122 with modulated subcarrier signal 120, which is the time-domain waveform from subcarrier signal generator 111 multiplied 116 by scale-factor 123 propagated by multiplexor 119, to form subcarrier group modulated signal 87.

Figure 16:
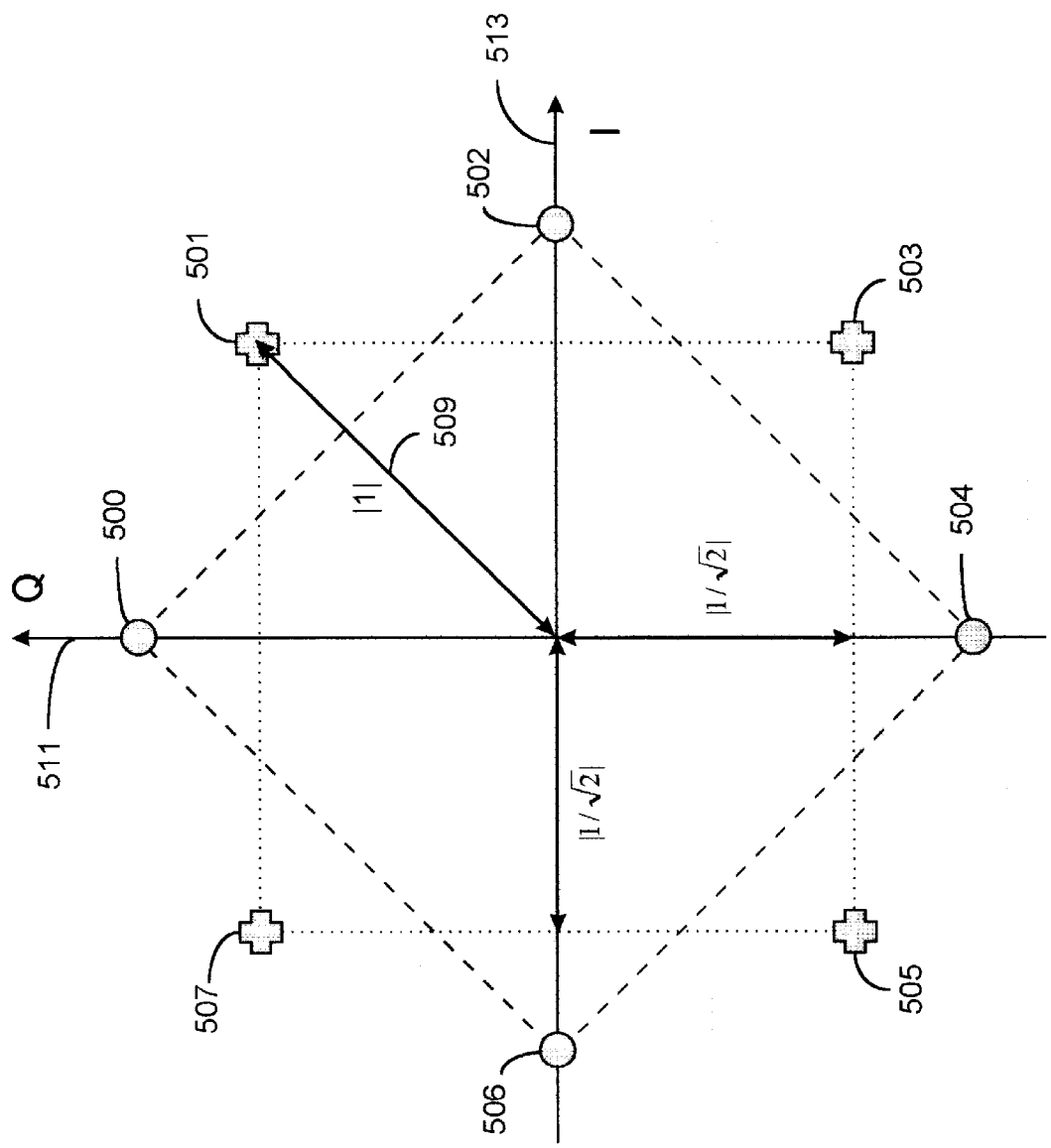
FIG. 16 is a graph which shows the two kinds of 4-ary PSK signal constellations which are transmitted in the FIG. 7 subcarrier modulator embodiment and received in the FIG. 11–12 subcarrier demodulator and bit estimator; constellation points are determined by one selection bit and two phase bits according to the Table 1 mapping. The FIG. 16 constellation points are also applicable for Gray-code encoding according to Table 2.

Each group of three bits 81 (e.g. the one selection bit $B^x_0$ and two phase bits $B^x_1$, $B^x_2$, or equivalently, as binary triplets) determines which data input for set 121 (122) is propagated by multiplexor 113 (119). The mapping is shown below in Table 1 for an embodiment with selection and phase bit modulation of the subcarrier signal pairs. As a result of the mapping, data-modulated signal 87, which is the sum of the modulated subcarrier signal with label I 109 and the modulated subcarrier signal with label Q 111, has one of eight distinct states. The eight possible states are shown in FIG. 16 as constellation "points" 500, 501, 502, 503, 504, 505, 506, and 507 on a graph where abscissa values 513 are the amplitude-state of the in-phase (I) signal 109 and where ordinate values 511 are the amplitude-state of the quadrature (Q) signal 111. As described previously, in one embodiment of the invention, one of two kinds of 4-ary PSK modulations are transmitted for each subcarrier group modulator 83 in each baud interval. In FIG. 16, one of the two kinds (first kind) of 4-ary PSK modulation is shown as points 500, 502, 504, 506; the second kind of 4-ary PSK modulation is shown as points 501, 503, 505, 507. Thus, in each group of three bits, the value of the selection bit determines whether the transmitted signal corresponds to one of the points 500, 502, 504, 506, defined as 4-ary PSK constellation #1, or one of the points 501, 503, 505, 507, defined as 4-ary PSK constellation #2. The two phase bits determine the state within constellation #1 or #2. Preferably, the phase bits are Gray-coded within constellations #1 and #2 so that adjacent (determined by the Euclidean distance) points within the same constellation differ in at most one phase bit. The square root of the energy 509 of generated signal 87 for each subcarrier group modulator 83 is about one (1) when normalized and is about the same regardless of the determined phase-state. In Table 1, the scalar value ±1/√2 is shown as about ±0.707. Table 1 is not the only suitable mapping. In general, the characteristics of the mapping are i) all points have approximately the same energy, ii) all adjacent points are separated by about the same minimum Euclidean distance, iii) points within the same 4-ary constellation (#1 or #2) correspond to the same selection bit value (similarly, points in different 4-ary constellations have differing selection bit values), and iv) within each of the two kinds of 4-ary PSK constellations (#1 or #2), adjacent points differ in at most one phase bit position.

TABLE 1

Modulation state mapping.

| Selection Bit | Phase Bits | Mux Result 117 | Mux Result 123 | FIG. 16 Point | Type |
|---|---|---|---|---|---|
| 0 | 00 | −.707 | +.707 | 507 | #2 |
| 0 | 01 | +.707 | +.707 | 501 | #2 |
| 0 | 10 | −.707 | −0.707 | 505 | #2 |
| 0 | 11 | +.707 | −0.707 | 503 | #2 |
| 1 | 00 | 0.00 | +1.00 | 500 | #1 |
| 1 | 01 | +1.00 | 0.00 | 502 | #1 |
| 1 | 10 | −1.00 | 0.00 | 506 | #1 |
| 1 | 11 | 0.00 | −1.00 | 504 | #1 |

The Table 1 mapping is not equivalent to Gray-code mapping of a 8-ary PSK constellation. Gray code mapping over all eight possible states does not satisfy constraint iii). However, it was described previously that in a different embodiment, Gray code bit-to-symbol modulation mapping may be implemented together with rate ⅔ encoding. In this embodiment, the minimum symbol interleaver size is also three bits or integer multiple thereof. Furthermore, the FIG. 7 subcarrier composite signal generator may still be utilized, except that the each selection bit $B^x_0$ and associated polarity bits $B^x_1$ and $B^x_2$ are considered as a binary triple. The resulting modulated signal amplitude values for each subcarrier signal (considering the I and Q signals in each pair separately) also takes on one of five values.

An exemplary Gray code bit-to-modulation symbol mapping, which is not unique, is shown in Table 2. The FIG. 7 embodiment of the subcarrier group demodulator is also suitable for other bit-to-symbol mappings, for example, encoding according to pragmatic trellis coded modulation, but with different associations (ordering) between the binary triplets and the resulting constellation points. References for these modulation methods have been previously described; for pragmatic trellis-coded modulation, see also the Q1875 integrated circuit device pragmatic trellis decoder technical data sheet from Qualcomm Incorporated, VLSI Products, 6455 Lusk Boulevard, San Diego, Calif.

TABLE 2

| $B^x_0$ $B^x_1$ $B^x_2$ | Mux Result 117 | Mux Result 123 | FIG. 17 Point |
|---|---|---|---|
| 000 | +1.00 | 0.00 | 502 |
| 001 | +0.707 | +0.707 | 501 |
| 010 | 0.00 | 1.00 | 500 |
| 011 | −0.707 | +0.707 | 507 |
| 100 | −1.00 | 0.00 | 506 |
| 101 | −0.707 | −0.707 | 505 |
| 110 | 0.00 | −1.00 | 504 |
| 111 | +0.707 | −0.707 | 503 |

For a mobile communication system such as IBOC DAB where the received signal amplitude varies considerably over time, the transmitter system may, in certain embodiments, transmit an amplitude reference value or signal in order to be able to accurately determine the amplitude-modulation state in the receiver for each of the subcarrier signals, especially in multipath. Reference signal 91 (see FIG. 5) is simultaneously transmitted together with the data-modulated subcarrier signals 85 for each of the upper and lower sideband regions. Each of the upper and lower reference signals has a frequency spectrum which substantially occupies or is confined within the same spectrum as the composite upper sideband or lower sideband signal, respectively. Each of upper and lower sideband reference signal 91 may be generated as the linear summation of each of the subcarrier signals with a pre-determined modulation in each baud interval (e.g. all positive ones, all zeroes, alternating ones and zeroes) or with another signal, for example, a bandpass-filter representation, which substantially occupies the same spectrum. Reference signal 91 may also be orthogonal or approximately orthogonal to the subcarrier signals. For example, a reference signal 91 which is wideband and orthogonal to the subcarrier signals may be determined by using the known method of Gram-Schmidt orthogonalization [reference: G. R. Cooper and C. D. McGillem. *Modern Communications and Spread Spectrum*. New York: McGraw-Hill, Inc., 1986, pp. 206–209]. Reference signal 91 is transmitted at a power level which is lower than the power of the corresponding transmitted composite sideband signal; preferably, the reference signal power is no more than one-quarter of the composite signal power. Since the reference signal is known without ambiguity in the transmitter and receiver systems (being unmodulated over all baud intervals or modulated with a predetermined pattern), the amplitude of the signal determined in the receiver which corresponds to the reference signal (or its crosscorrelation with the ideal reference signal) is a measure of the gain variation between the transmitter and receiver. Since the reference signal itself may be wideband in certain embodiments and occupies substantially the same frequency spectrum as the subcarrier signals, the reference signal and subcarrier signals may be similarly affected by gain variation. In certain circumstances, in place of a distinct reference signal, known bits are periodically transmitted, but not in every baud interval, as in the prior art methods of transmitting training patterns. Since said bits do not convey source bit information, they are overhead and reduce the source bit throughput. An advantage of 8-ary PSK modulation methods, whether by Gray coding, pragmatic trellis coding, or selection and phase bit coding, is that the determination of the resulting bits is less sensitive to variations in the signal strength of the received composite signal when compared to, for example, 8-ary amplitude-shift keying (ASK) modulation methods.

The FIG. 7 implementation of signal generators 109 and 111 for the plurality of subcarrier group modulators 83 in FIG. 5 may require large amounts of RAM or ROM, in certain embodiments. For both upper and lower sideband regions considered together, there are, for example, L subcarrier sequences (signals), each with an N element complex-valued time-domain representation, for example. When each complex-valued element in each subcarrier sequence requires an average of B bits for implementation with a digital memory device (e.g. ROM), then the total memory requirement for the plurality of signal generators is about N·L·B, which may be a substantial amount. In certain systems, this may be a disadvantage to implementing wideband subcarrier signals compared to narrowband subcarrier signals, for example OFDM signals, which may require substantially less memory because the subcarrier signals are generated by mathematical functions.

The linear sum of the data-modulated wideband upper (lower) subcarrier signals, in other words, the upper (lower) composite signal, may be generated indirectly by mapping each modulated upper (lower) sideband wideband subcarrier signal to a plurality of modulated upper (lower) sideband narrowband OFDM signals. Once the mapping (i.e. the relationship or correspondence) from the wideband subcarriers onto the OFDM subcarriers is determined, the time-domain representation of the composite wideband signal is determined by conventional OFDM modulation, for example, with an Inverse Fast Fourier Transform. When there are a plurality of L wideband subcarrier signals (L/2 upper sideband signals and L/2 lower sideband signals) mapped onto a plurality of K OFDM subcarriers, K may be equal to, but is not necessarily equal to L, and the implementation of the mapping requires about 2·(L·K/4) mapping coefficients. The IFFT modulation alone requires about N complex-valued coefficient memory locations (not including exponential kernel tables). When compared to the direct implementation of the signal generators as in FIG. 7 where there are LN coefficients, the primary advantage of this embodiment is when N, which is the number of elements in each subcarrier signal sequence, is large when compared to K.

Figure 8:
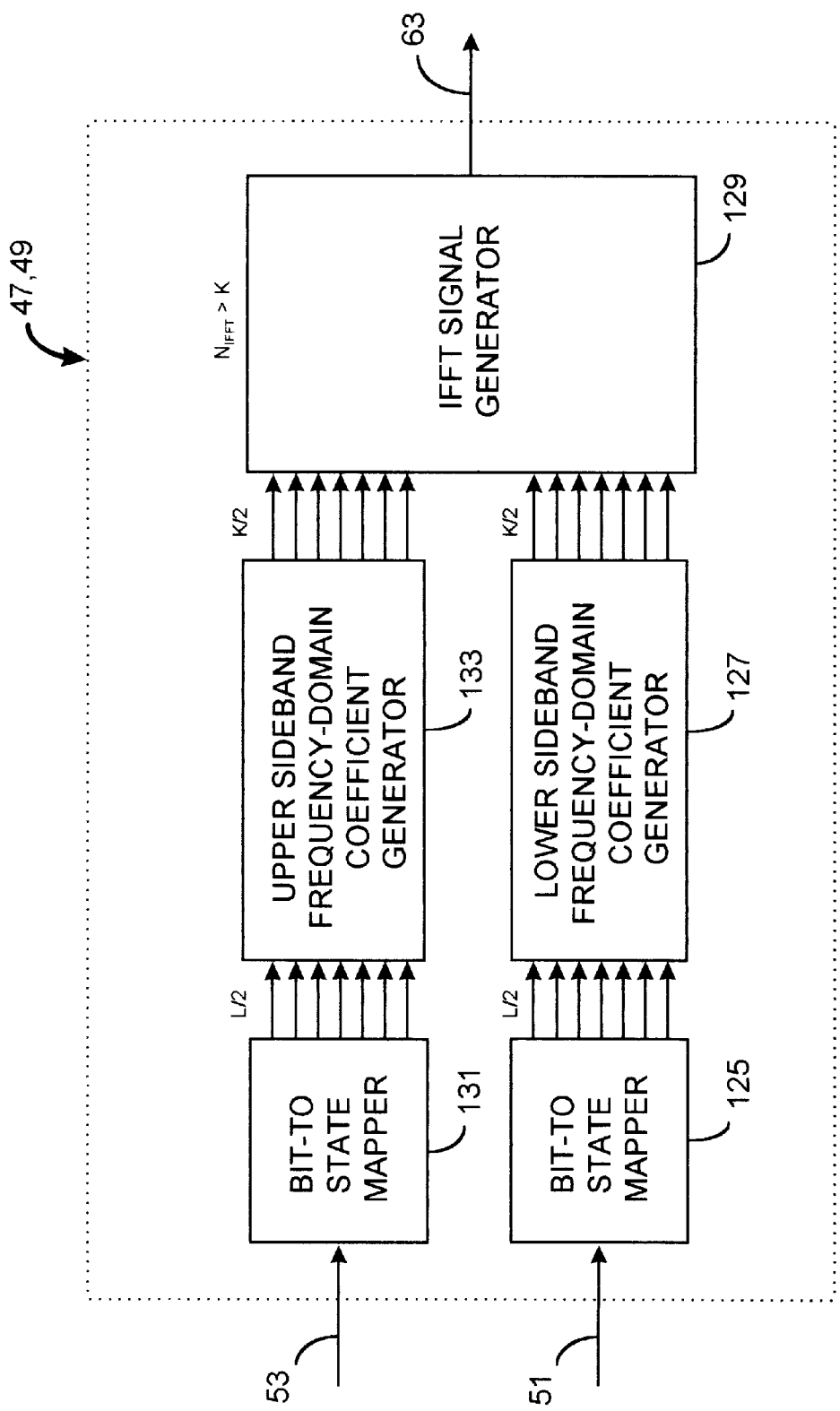
FIG. 8 is a block diagram of an embodiment of the transmitter when the subcarrier signals are wideband according to an embodiment of this invention. Each subcarrier signal is mapped to a plurality narrowband modulated OFDM signals, and the upper and lower sideband composite signals are generated simultaneously with IFFT processing.

FIG. 8 is a block diagram which illustrates the implementation of the mapping. The overall IBOC DAB signal for both upper and lower sideband regions together may be generated at once (i.e. implicitly summed together in the method) or the respective composite signals may be determined separately for upper sideband composite signal 57 and lower sideband composite signal 55, and the signals summed 59 externally as in FIG. 4. The method is described below for the embodiment when the overall IBOC DAB signal, representing the sum of the upper sideband and lower sideband composite signals, is generated at once. Furthermore, the modulation of the wideband subcarrier signals is as shown in FIG. 7 with the Table 1 bit-to-symbol mapping and a selection bit and two phase bits for each subcarrier group modulator 83 in each baud interval. However, the wideband-to-narrowband mapping method is also applicable for other subcarrier modulation methods, for example, 8-ary PSK Gray-coded or trellis modulation.

In FIG. 7, the amplitude of each orthogonal or approximately orthogonal wideband upper sideband subcarrier signal is determined by the combination of the selection bit and two phase bits in each baud interval. For the FIG. 16 constellation of points with the Table 1 bit-to-symbol mapping, the combination of the phase bits together with the selection bit results in exactly one of five transmitted amplitude values (states) for each of the I signal subcarrier and the Q subcarrier signal, for each subcarrier pair. The values are: +1.0, +0.707, −0.707, −1.0, or zero (0). When there are L/2 upper (lower) subcarrier signals, there is a sequence of L/2 upper (lower) amplitude-modulation coefficients (i.e. one of the five amplitude-modulation states); each amplitude-modulation coefficient is associated with one of the subcarrier signals. Each of the wideband subcarrier signals has a frequency spectrum which may be spanned by a corresponding set of OFDM narrowband subcarrier signals. Each wideband subcarrier signal, without consideration of data-modulation, may be represented by the linear summation of a plurality of OFDM signals, organized as phase-quadrature narrowband subcarrier signal pairs, each signal in the pair having the same frequency, with pre-determined amplitude-modulation. The projection of each wideband subcarrier signal onto the OFDM signals is determined for each OFDM subcarrier signal by determining the inner product (also known as the dot product) between the wideband subcarrier signal and the OFDM signal. The inner product is a scalar value. The projection of each upper (lower) wideband subcarrier signal onto a plurality of K/2 upper (lower) sideband OFDM signals results in K/2 scalar projections. When there are L/2 upper (lower) sideband subcarrier signals, there are a total of K·L/4 scalar projections. The scalar projections for the upper (lower) sideband subcarriers are organized as matrix, defined as $M^{USB}_{OFDM}$ ($M^{LSB}_{OFDM}$), with L/2 rows and K/2 columns; each row corresponds to a sequence of scalar projections for one of the wideband upper (lower) subcarrier signals. The sequence of L/2 determined amplitude-modulation values, which are the five-valued states for each of the upper (lower) modulated subcarrier signals, is a matrix with one row and L/2 columns. This matrix is multiplied by $M^{USB}_{OFDM}$ ($M^{LBS}_{OFDM}$), which results in a matrix (equivalently, a sequence) with one row and K/2 columns. The resulting sequence corresponds to the non-zero upper (lower) sideband frequency-domain coefficients, as in FIG. 6, for the OFDM signals.

In the FIG. 8 embodiment, the two sequences of determined mapped frequency-domain coefficients for the upper and lower sideband regions may be combined (i.e. selecting non-zero coefficients from each sequence) to form a single frequency-domain coefficient so that a single IFFT may be implemented in order to determine the time-domain representation of the overall IBOC DAB signal. Upper (lower) subcarrier signal bit-to-state-mapper 131 (125) generates the amplitude modulation (e.g. +1.0, +0.707, −0.707, −1.0, or 0) coefficient from upper (lower) sideband bit information 53 (51), which in certain embodiments, are the FIG. 7 selection and phase bits in triplets. Upper (lower) sideband frequency-domain coefficient generator 133 (127) represents the multiplication of the amplitude-modulated sequence with the matrix $M^{USB}_{OFDM}$ ($M^{LSB}_{OFDM}$), preferably implemented with digital arithmetic. Upper (lower) sideband frequency-domain coefficient generator 133 (127) may also, in certain embodiments, re-arrange the K/4 pairs of determined I and Q amplitude coefficients as a sequence of K/4 complex (real and imaginary values) in order to be able to implement a conventional complex-valued IFFT. The combined frequency-domain sequences are converted to the time-domain representation for IBOC DAB signal 63 by IFFT signal generator 129, which may be implemented as in the known method of OFDM.

Figure 9:
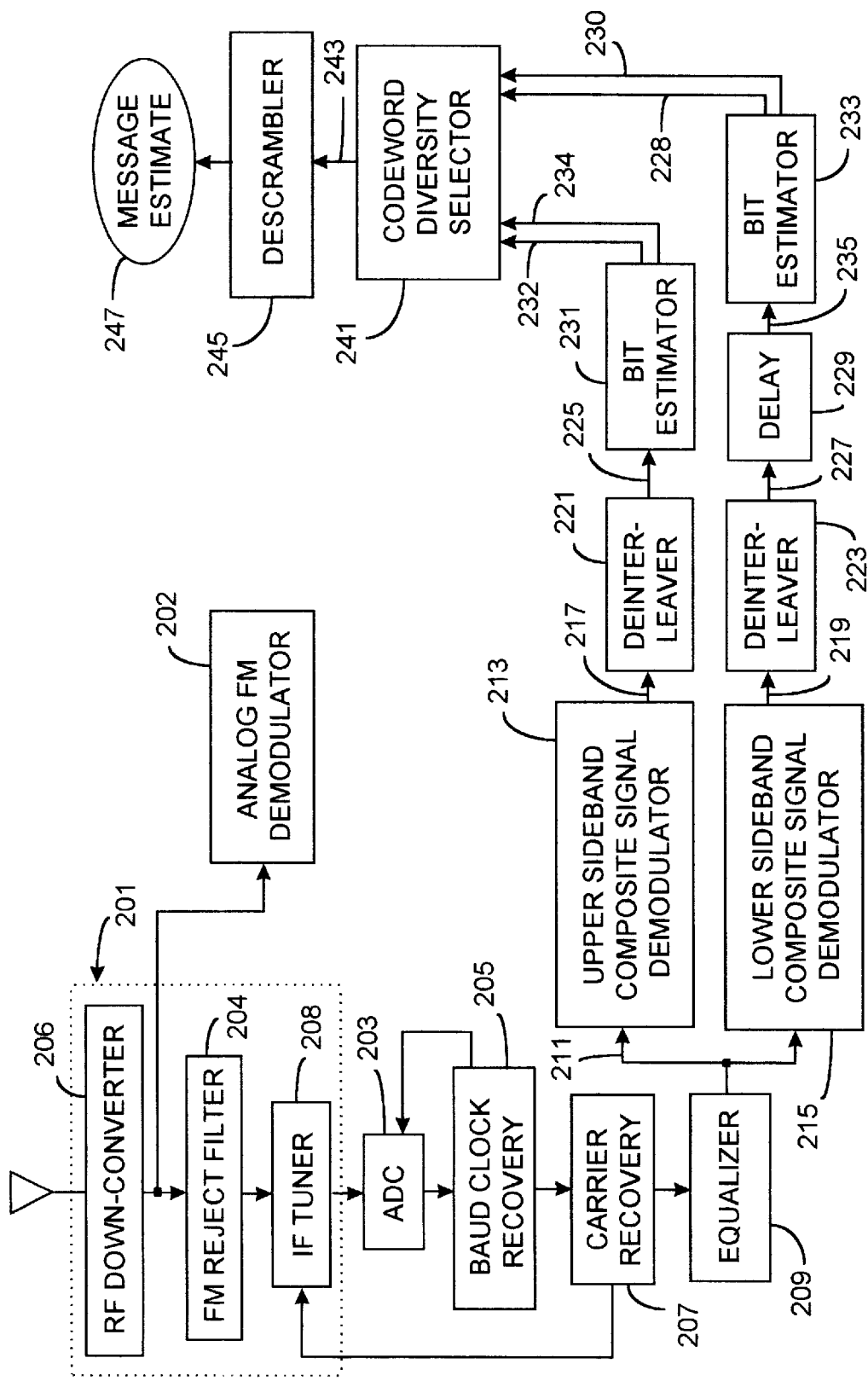
FIG. 9 is a block diagram of the IBOC DAB receiver system of the invention which corresponds to the FIG. 4 transmitter system with dynamic codeword diversity selection.

When either narrowband or wideband subcarrier signals are implemented in the FIG. 4 transmitter system, a block diagram of the corresponding IBOC DAB receiver invention is shown in FIG. 9. RF tuner 201, including RF downconverter 206, optional FM-band reject filter 204, and IF turner 208, receives an RF signal by means of an antenna. RF tuner 201 receives a RF signal within a bandwidth of about 500 kHz (±250 kHz), preferably about 400 kHz (±200 kHz), around the desired analog FM-band center frequency. The received signal may include both an IBOC DAB signal in the upper and lower sideband regions and a conventional analog FM-band signal. The conventional analog FM-band signal is, in general, unrelated to the IBOC DAB signal. The received signal from RF tuner 201 is propagated (e.g. with a one-to-two signal splitter) to conventional analog FM-band signal demodulator 202 in order to recover the analog FM-band signal. In certain embodiments, conventional analog FM-band demodulator 202 may be omitted when only the IBOC DAB signal is desired and when the IBOC DAB signal does not make use of the analog FM-band signal (i.e. for synchronization). Certain of the remaining processes described herein are required only for the determination of the IBOC DAB signal.

In tuner 201, the received RF signal, which is a voltage or current signal, is amplified and filtered with a bandpass filter to remove interference and noise which is significantly outside of the bandwidth of the composite IBOC DAB signal. The RF signal is typically frequency translated by RF down-converter 206 to a lower frequency, known as the intermediate frequency (IF), for further bandpass filtering and processing in IF tuner 208. In certain embodiments, the IBOC DAB receiver includes two stages of IF frequency-translation. For conventional analog FM-band signals, the first IF is typically about 10.7 MHZ. In some digital systems, the first and/or second IF frequency is zero, so that the remaining processes are implemented with complex (real and imaginary) digital arithmetic. For mobile receivers, RF tuner 201 also accomplishes the function of automatic gain control (AGC), or at least coarse AGC, so that the received signal energy is made to be approximately constant. The AGC function is typically accomplished in IF tuner 208. The specific characteristics of RF tuner 201 which are relevant for recovery of the IBOC DAB signal in the receiver when compared to a conventional analog FM-band tuner are i) tuner 201 for IBOC DAB uses linear amplification and does not substantially clip (limit) the received signal as in a conventional analog FM-band tuner, ii) tuner 201 for IBOC DAB preserves the signal in the IBOC DAB sideband regions (about ±200 kHz around the analog FM-band center frequency), iii) tuner 201 substantially rejects the signal outside of the IBOC DAB sideband regions, beyond ±200 kHz, and iv) tuner 201 has sufficient frequency accuracy (within about 100 ppm open-loop) and good phase stability (typically less than 200 Hz/s deviation) so that the variations in the frequency due to the implementation of the tuner IF frequency-translation are within the tracking-range of the IBOC DAB receiver clock recovery subsystems. Optional FM-band reject filter 204 substantially mitigates the on-channel and co-channel analog FM-band signals in order to i) reduce the dynamic range required for subsequent processing in IF tuner 208, ii) reduce the effect of the analog FM-band signal on AGC operation for IBOC DAB signal recovery, and iii) reduce the bit width requirement for analog-to-digital conversion and subsequent subcarrier demodulation. In certain embodiments, optional FM-band reject filter 204 may be implemented as two bandpass filters summed in parallel (one bandpass filter for the upper sideband region only and one bandpass filter for the lower sideband region only), or as a notch (non-zero IF) or highpass (zero IF) filter at the analog FM-band center frequency.

The received RF signal is converted (quantized) from an analog representation (i.e. voltage or current) to a digital representation by analog-to-digital converter (ADC) 203. The number of bits in the implementation of ADC 203 is chosen to preserve sufficient dynamic range in the quantized signal so that the irreducible error level caused by ADC quantization noise does not significantly degrade the receiver performance. Typically, the number of bits for ADC 203 is between six (6) and twelve (12), inclusive. The advantages of diminishing the analog FM-band signal prior to analog-to-digital conversion are described above. When the final stage IF has zero frequency, which corresponds to a complex-valued baseband representation of the received signal, two ADC devices 203 are implemented in parallel (not shown), one ADC for the in-phase carrier frequency signal component (real part), and one ADC for the quadrature carrier frequency signal component (imaginary part).

The received and quantized signal in the FIG. 9 receiver is made synchronous with the transmitter in both baud frequency and carrier frequency by baud clock recovery 205 and carrier frequency recovery 207 subsystems. Typically, these functional blocks are implemented with early/late or pulse-swallowing algorithms, phase-lock loops (PLLs) and voltage-controlled oscillators (VCOs), and/or frequency-lock loops (FLLs). The overall function of recoveries 205 and 207 is to eliminate frequency offsets caused by variations in components and the effect of Doppler frequency shift. The synchronization also establishes the proper timing (i.e. phase relationship) for demodulation of the subcarrier signals.

Baud clock recovery 205 and carrier frequency recovery 207 subsystems may make use of reference signal 91, which was transmitted simultaneously with the data-modulated signals in certain embodiments. In the transmitter, separate upper sideband and lower sideband reference signals 91 are generated and combined. However, in many embodiments, the reference signals are synchronized in both baud frequency and baud alignment. Then, in the receiver, the baud clock is recovered for one of the two transmitted reference signals, either the upper sideband reference signal or the lower sideband reference signal. An advantage of separate upper and lower sideband reference signals 91 which are synchronized is that when first-adjacent analog FM-band interference substantially disturbs the reference signal in one of the IBOC DAB sideband regions, the remaining reference signal may be substantially unaffected, so that the baud synchronization is not disturbed.

In certain embodiments, baud clock and carrier frequency recoveries 205 and 207 are implemented independently for the determination of the upper sideband composite signal and the lower sideband composite signal. Recoveries 205 and 207 may operate simultaneously in order to determine separate estimates of the received signal baud frequency and the received signal carrier frequency, but only one of the determined baud/carrier frequency estimates is used at a time to update the tracking mechanisms which control the down-conversion frequency in RF tuner 201 and/or the sample-clock for ADC 203. Considering the sideband regions 11 and 13 independently, the upper or lower baud and carrier frequency recovery algorithms may be implemented with known means for either narrowband pilot reference signals, sometimes known as "transparent-tone-in-band" (TTIB) [reference: W. T. Webb and L. Hanzo, ibid., pp. 293–308] or wideband reference signals, for example, as described by Solomon, et. al., in U.S. Pat. No. 5,272,724.

In certain embodiments, the determination as to which baud and carrier frequency estimate is used for tracking purposes may be made by determining which estimate corresponds to a higher signal-to-noise ratio (SNR) at the receiver. Since the upper and lower sideband reference signals are synchronized, it may be sufficient to determine which of the upper or lower baud frequency estimates is less likely to be disturbed (having a larger SNR) and then make use of both the baud clock frequency and carrier frequency estimates for the corresponding sideband. In certain embodiments, the received SNR may be determined by computing the magnitude of the crossrelation function between the received reference signal implemented in the receiver system or by computing the magnitude of the autocorrelation function between the received reference signal and itself. The ratio of the maxumum (peack) magnitude of the autocorrelation or crosscorrelation function to a value of function away from the peack is a measure of the SNR (i.e. peack-to-sidelobe ratio). The received reference signal estimate with the larger SNR (larger peack-to-sidelobe ratio) is utilized to update the tracking system.

The determination as to which of the upper sideband or lower sideband reference signals is used to update the tracking mechanisms may be dynamic and responsive to changes in the RF channel and interference characteristics. In certain embodiments, separate upper sideband and lower sideband determination of the baud and carrier frequency may not be necessary when the reference signal 91 is unlikely to deleteriously affected by large amounts of interference in either the upper sideband region 11 or lower sideband region 13 alone. For example, separate upper and lower sideband baud clock determination is not necessary when the IBOC DAB baud clock is synchronized to the analog FM-band signal 19 kHz stereo pilot (which is a form of a reference signal) in the transmitter system. A method of synchronizing an IBOC DAB signal to the analog FM signal stereo pilot is known; see U.S. Pat. No. 5,278,826 to Murphy, et. al.

The relatively large amount of power in the 19 kHz stereo pilot signal and its proximity to the analog FM-band center frequency cause the analog FM-band stereo pilot signal to be substantially unaffected even by large amounts of first-adjacent interference. A disadvantage of synchronizing the IBOC DAB signal to the 19 kHz stereo pilot is that the analog FM-band signal is required to be demodulated in addition to the IBOC DAB signal in order to properly synchronize the IBOC DAB signal, described previously. In addition, there may be circumstances in which the analog FM-band signal is significantly distorted by, for example, multipath, which may affect the 19 kHz stereo pilot signal, but not substantially distort the spectrum occupied by the IBOC DAB signal.

After synchronization 205 and 207, the quantized signal is optionally equalized by adaptive equalizer 209 in order to partially compensate for the effects of RF signal dispersion caused by the frequency-selective characteristics of the RF propagation channel. Adaptive equalizer 209 also mitigates phase and amplitude errors caused by implementation loss in the transmitter and receiver systems. Equalizer 209 may be implemented with a finite-impulse response (FIR) transversal filter or an infinite-impulse response (IIR) filter or a combination thereof. The coefficients of the equalization filter are determined by a tap-weight update algorithm and are updated at a rate sufficient to reasonably track changes in the RF propagation characteristics. Known methods for equalization include, but are not limited to, minimum mean square estimation (MMSE), least mean square (LMS), and recursive least square algorithms (RLS). Decision-feedback equalization, where the tap-weight coefficients are determined using bit estimates determined after demodulation of the received signal, may also be implemented.

In certain embodiments, the equalization algorithm may utilize the transmitted reference signal in order to determine the RF channel propagation characteristics. Recovery of the narrowband or wideband reference signal may be accomplished by methods such as bandpass filtering, correlation with an undistorted replica of the reference signal in the receiver for orthogonal or approximately orthogonal reference signals, and/or accumulation of the reference signal over a plurality of baud intervals so that random data signal components approximately cancel out.

After optional equalization 209, resulting signal 211 is propagated to both upper sideband composite signal demodulator 213 and lower sideband composite signal demodulator 215. Composite signal demodulators 213 and 215 correlate the received IBOC DAB signal with replicas of the subcarrier signal waveforms to determine correlation sums (or functions thereof) for the upper sideband composite signal and lower sideband composite signal. The correlation sums are determined at the nominal sampling point, which is equivalent to sampling the matched filter output for each of the subcarrier signals. Upper sideband composite signal demodulator 213 determines upper sideband composite signal correlation sums 217 for the one or a plurality of upper sideband subcarrier signals in each signal baud. The upper sideband subcarrier signals may be narrowband (e.g. OFDM) or wideband within the upper sideband region 11. Similarly, lower sideband composite signal demodulator 215 determines lower sideband composite signal correlation sums 219 for the one or a plurality of lower sideband region subcarrier signals, narrowband or wideband, in each signal baud. Each correlation sum 217 (219) determined by each subcarrier group demodulator 213 (215) in each baud interval is represented by one or a plurality of bits. The resulting sequences of upper (lower) sideband correlation sums 217 (219) are deinterleaved in symbol deinterleaver 221 (223). Symbol deinterleavers 221 and 223 reverse the shuffling function of corresponding interleaver 43 in the FIG. 4 transmitter system. While there is only one interleaver 43 in certain transmitter system embodiments, separate symbol deinterleavers 221 and 223 are needed in the FIG. 9 receiver system because the encoded source bit information is conveyed redundantly by subcarrier signals in both the upper and lower sidebands. The determination of the correlation sums (and subsequently bit estimates) in the upper sideband region 11 is independent of the determination of the correlation sums (bit estimates) in the lower sideband region 13 except for the common synchronization. In other words, the IBOC DAB composite signals in the upper sideband region and lower sideband region are received together and synchronized together (i.e. tracked together but using frequency estimates from only one sideband region at one time) but are demodulated and ECC decoded independently.

It is not necessary that the upper sideband composite signal and the lower sideband composite signal are synchronized and equalized as a combined signal in the receiver, but in general, the shared synchronization tracking and equalization systems simplify the implementation of the receiver. In the embodiment (not shown) where either the upper sideband composite signals or the lower sideband composite signals are offset in frequency by an amount $\pm 1/(2 \cdot \Delta T)$ in the transmitter system, the offset is removed in the receiver system. Preferably, a common upper and lower sideband carrier frequency tracking device (e.g. voltage or numerically-controlled oscillator) is implemented, but a frequency offset that is opposite in polarity to the offset implemented in the transmitter system and with the same magnitude is added to the affected upper or lower sideband composite signal prior to correlation and bit estimation. The overall IBOC DAB signal and analog FM-band signal together spans a bandwidth of about 400 kHz, including the analog FM-band signal 7 center region. The total bandwidth is a small percentage of the FM-band RF carrier frequency (less than about one percent), so that substantially all frequencies within the IBOC DAB signal bandwidth are similarly affected by Doppler frequency variation and oscillator component variations. However, there may be significant variation in the received signal's phase due to the effects of frequency-selective multipath.

After deinterleaving 221 and 223, correlation sums 225 for the upper sideband composite signals over a plurality of baud intervals are propagated to upper sideband bit estimator 231. Deinterleaved correlation sums 227 for the lower sideband composite signals over a plurality of baud intervals are, in certain embodiments, delayed in time by diversity delay 229, and then propagated to lower sideband bit estimator 233. Diversity delay 229 is implemented with a RAM, shift-register, or FIFO memory device, similar to diversity delay 45 in the FIG. 4 transmitter system. The function of diversity delay 229 in the FIG. 9 receiver system is to compensate for the optional incorporation of corresponding diversity delay 45 in the transmitter. When delay 45 is omitted in the transmitter system, corresponding delay 229 is omitted in the receiver system. When transmitter system diversity delay 45 precedes the upper sideband composite signal generator, receiver system diversity delay 229 follows the lower sideband composite signal demodulator. When the transmitter diversity delay precedes the lower sideband composite signal generator, the receiver diversity delay follows the upper sideband composite signal demodulator and deinterleaver (not shown).

The lower sideband composite signal correlation sums 235, after deinterleaving 223 and delaying 229, are time-aligned so that correlation sums 225 for the upper sideband composite signals correspond to the same encoded source bit information ECC codeword; in other words, in the absence of errors, the determined bit estimates are substantially identical. Alignment ensures that the bit estimates for the codewords which are subsequently compared are for the same transmitted codeword despite the presence of diversity delay. Diversity delay 229 and deinterleaver 223 may be exchanged in position without affecting resulting correlation sums 235.

The implementation of delay 229 in the receiver system is different when compared to delay 45 in the transmitter system because delay 229 adds latency to the correlation sums or bit estimates. Each demodulator correlation sum or bit estimate may require one or a plurality of bits. Thus, although diversity delay 45 and 229 represent the same amount of time, the memory requirement of delay 229 is greater than the memory requirement of delay 45 by a factor which is the increase in the number of bits (beyond one) in each correlation sum, or function thereof. It was previously described that delay 229 is at least 10 milliseconds and less than about 500 milliseconds, preferably equal to or less than about 250 milliseconds, in certain embodiments.

In the FIG. 9 receiver embodiment, the upper and lower sideband subcarrier signal correlation sum samples are deinterleaved prior to bit estimating 231 and 233. In another embodiment (not shown), the correlation sums from demodulation of the subcarrier signals are used to determine bit estimates, and the resulting bit estimates are deinterleaved prior to ECC decoding. In either case, the re-ordering algorithm accomplished by the deinterleavers in the receiver system reverses the re-ordering implemented in the interleaver in the transmitter system, preserving the one-to-one correspondence between, for example, encoded bit triplets for 8-ary modulation in the transmitter system and demodulated subcarrier I and subcarrier Q correlation sum pairs for each subcarrier group, or triplet bit estimates (not shown) in the receiver system.

Upper (lower) bit estimators 231 (233) first determine encoded bit (i.e. codeword) estimates by making use of correlation sum values 225 (227) from demodulation of the upper (lower) subcarrier signals, or functions thereof. The codeword bit estimates are then decoded, in certain embodiments within estimators 231 (233), according to an ECC and/or trellis decoding algorithm in bit estimators 231 (233) to generate (scrambled) source bit estimates 232 (228), which are the decoded codewords. The ECC and/or trellis code decoders in bit estimators 231 and 233 implement the ECC and/or trellis decoding algorithm(s) which correspond to the ECC and/or trellis encoding algorithm(s) implemented in transmitter ECC encoder 41. As described previously, in certain embodiments, it is preferable that the ECC code be about an average rate ⅔ convolutional code, trellis code, block code, or combination thereof, with equal error protection (EEP) or unequal error protection (UEP). When convolutional encoding is implemented, the resulting codeword has a finite bit length (terminated with tail bits), according to the invention. Estimates of the source bit information in each transmitted codeword are determined independently by upper (lower) sideband signal bit estimators/ECC decoders 231 (233) in the receiver since both upper 11 and lower 13 sideband signals are modulated by the same (encoded) source bit information in the transmitter, according to the invention.

The details of the ECC decoding method for a given ECC encoding method (e.g. convolutional encoding and Viterbi soft-decision decoding) are known in the coding art. For example, a convolutional encoder and punctured Viterbi decoder integrated circuit (IC) device (part Q1650), and a decoder IC for rate ⅔ 8-ary pragmatic trellis-coded modulation (part Q1875) are available from Qualcomm Incorporated, VLSI Products, San Diego, Calif. In many embodiments, a single decoder implementation with sufficiently high throughput is time-shared to accomplish the decoding of both the upper and lower codewords in order to minimize the implementation complexity. For example, when the encoding method is a convolutional code, in certain embodiments, a single integrated circuit implementation of the Viterbi algorithm is used to decode first the upper sideband codeword and then the lower sideband codeword, or vice versa.

In the FIG. 9 receiver system embodiment, two source bit sequence estimates, which are ECC decoded codewords 232 and 228, for each transmitted ECC codeword are generated by the ECC decoders in bit estimators 231 and 233; source bit sequence estimate 232 from the demodulation and decoding of one or a plurality of upper sideband composite signals, and source bit sequence estimate 228 from the demodulation and decoding of one or a plurality of lower sideband composite signals. In the absence of errors, source bit estimates 232 and 228 are substantially equal since the same codeword (i.e. encoded source bit information) is represented by both the upper sideband and lower sideband composite signals after latency compensation for the optional diversity delay. Source bit estimates 232 and 228 are determined for each transmitted codeword. Since the codeword has a specific length in bits, the source bit estimates are also grouped into one or a plurality (blocks) of bits.

In many circumstances, one of the two determined source bit estimates (232 or 228) from the demodulation and decoding of either the upper or lower subcarrier signals for a specific block of source bits, which corresponds to a plurality of baud intervals, may be substantially more likely to contain decoded bit errors than the other estimate, especially when there is a significant amount of first-adjacent analog FM-band interference or frequency-selective distortion in one of the upper or lower, but not both, sideband regions, or when there is short-duration interference within the diversity delay.

Upper (lower) bit estimator 231 (233) makes use of the correlation sums determined from upper (lower) sideband composite signal demodulator 213 (215) to generate bit estimates 234 (230), which are the codeword estimates prior to ECC decoding, and to generate scrambled source bit estimate 232 (228) after ECC decoding. Codeword diversity selector 241 determines for each pair of upper and lower codeword estimates 234 and 230 whether to i) select one of the corresponding source bit (decoded) estimates 232 or 228 (the decoded codeword least likely to be in error), discarding the other decoded codeword, or, optionally, to ii) combine both codeword estimates 234 and 230 together prior to final ECC decoding in order to increase the signal-to-noise ratio.

The determination is made on a codeword-by-codeword basis, so that, for example, during a specific interval of time, which in certain embodiments is a plurality of baud intervals, a decoded codeword which corresponds to the upper sideband subcarriers may be selected, while in the subsequent interval, a decoded codeword which corresponds to the lower sideband subcarriers may be selected. Thus, for each pair of upper and lower subcarrier signal codeword estimates, the determination at codeword diversity selector 241 as to which of the upper or lower decoded codewords is selected (propagated) or whether the upper and lower codewords are combined, decoded, and propagated, is dynamic over time and responsive to changes in the receiver's RF environment. Furthermore, the determination does not require a priori knowledge of which codeword estimate is more likely to have bit errors.

Codeword diversity selector 241 propagates decoded codeword 243, which in certain embodiments, is either source bit estimate 232 or 228. Source bit estimate 243 is the source (user) message bit estimate, except that it is typically bit-scrambled because of scrambler(s) 39 in the FIG. 4 transmitter system. Descrambler(s) 245 reverses the scrambling function of scrambler(s) 39 in the transmitter. Message estimate 247, after descrambling, substantially resembles transmitted source message 37, except for the occurrence of bit errors.

The primary advantage to combining estimates for selector 241 in certain circumstances, rather than always selecting between two estimates, is that when the amount of degradation to the signals in the upper and lower sidebands is approximately equal (taking into consideration diversity delay), combining the codeword estimates 228 and 232 increases the effective signal-to-noise ratio (SNR). For example, when the primary signal impairment is flat-spectrum background noise, it is desirable to combine codeword estimates.

In certain embodiments, instead of combining the upper and lower sideband signal codeword estimates, the demodulator upper and lower sideband signal correlation sum samples determined from matched filtering the subcarrier signals are combined (summed), and the combined codeword estimate is determined by bit estimation from the summed upper and lower sideband correlation sums. Since the upper and lower sideband signals are modulated using the same ECC codeword in the transmitter system (with latency compensation when diversity delay is implemented), the correlation sum samples for the upper and lower sideband signals add coherently for the desired signal contribution and add incoherently for noise and uncorrelated interference, resulting in an effective increase in the detection signal-to-noise or signal-to-interference ratio. However, when the effective SNR for either the demodulated upper or lower sideband signals, over the plurality of baud intervals which corresponds to a codeword, is less than or equal to about zero (0) decibels, combining results in a degradation in performance, when compared to selecting between codewords. Thus, codeword diversity select or 241 propagates the decoded combination of the upper and lower sideband codeword estimates only in certain circumstances, according to the invention.

Figure 13:
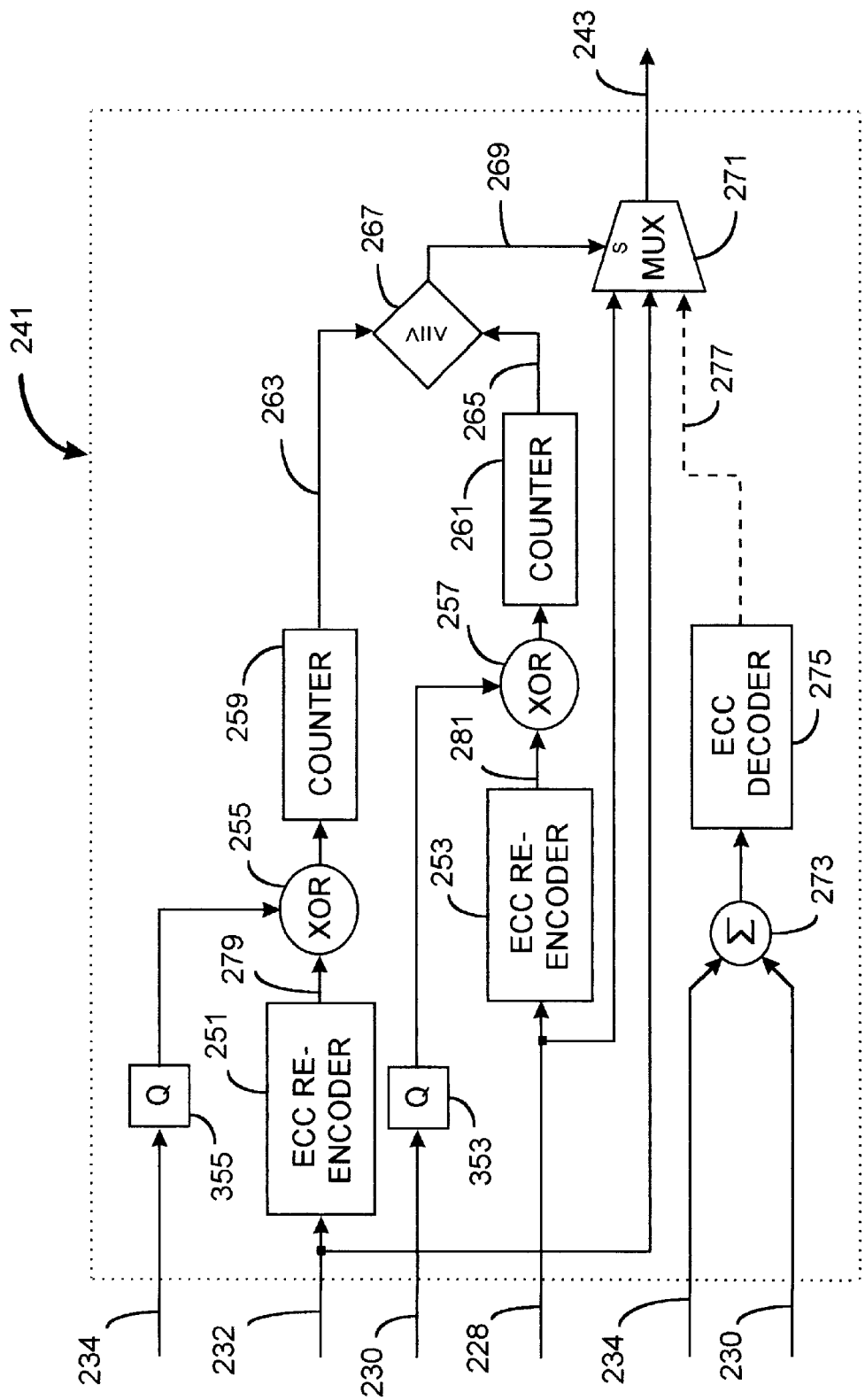
FIG. 13 is a block diagram of the codeword diversity selector in the FIG. 9 receiver system when the determination to select between upper and lower sideband codeword estimates (or to combine estimates and decode) is made by counting the number of differing bit positions between each of the codeword estimates and the codewords generated after ECC decoding and re-encoding.

A block diagram of a specific embodiment of codeword diversity selector 241 is shown in FIG. 13. Decoded codeword estimate 232 for upper sideband ECC codeword estimate 234 is re-encoded 251 using the same ECC method as in encoder 41 in the transmitter system. When convolutional ECC encoding methods are implemented, re-encoding 251 may be implemented with linear feedback shift registers (LFSR). LFSR devices for re-encoding may be implemented with low complexity so that convolutional codes may be preferable over block codes in certain embodiments. Similarly, decoded codeword estimate 228 for lower sideband ECC codeword estimate 230 is also re-encoded 253 using the same ECC method as transmitter ECC encoder 41. The function of ECC re-encoders 251 and 253 is to generate re-encoded ECC codeword estimates 279 and 281, respectively, from the decoded estimates. The re-encoded codeword estimates may then be compared to codeword estimates 234 and 230, respectively, which are determined prior to ECC decoding.

Each bit estimate in ECC codewords 234 and 230 may be one bit (hard-decision ECC decoding) or a plurality of bits (soft-decision ECC decoding). In order to be able to compare re-encoded codeword 279 to codeword 234, and re-encoded codeword 281 to codeword 230, codewords 234 and 230 are quantized by one-bit (hard decision) quantizers 355 and 353, respectively, so that soft-decision information is discarded for diversity comparison purposes (soft-decision information is preserved for decoding the codeword, though). When there are no bit errors in codeword bit estimates 234 and 230, re-encoded codewords 279 and 281 will substantially resemble hard-limited codewords 234 and 230, respectively.

In the FIG. 13 embodiment, for each ECC codeword, the number of bit positions which differ (i.e. the Hamming distance) between the one-bit quantized codeword estimate prior to ECC decoding and the re-encoded decoded codeword estimate is determined. The bit difference is a non-negative integer. The bit difference may be computed by comparing codewords 230 and 234, after hard-limiting 353 and 355, and corresponding re-encoded codeword estimates 281 and 279, respectively, with a mathematical "exclusive-or" (XOR) functions 257 and 255. The XOR function has two binary digit inputs and results in the binary digit one if, and only if, the binary inputs are unequal; otherwise, the XOR function results in the zero value. In order to count the number of differing positions over the plurality of bits in the codeword, the XOR function result controls a binary counter. Whenever the XOR function results in the binary value one, the counter is incremented. The counter is preset to zero at the start of the comparison of each pair of codewords.

Separate XOR functions and counters are implemented for each of the upper sideband and lower sideband codeword estimates in codeword diversity select or 241, in certain embodiments. For the upper sideband signals, XOR function 255 results in binary one whenever the corresponding elements of hard-limited 355 codeword 234 and re-encoded codeword 279 differ; zero otherwise. Whenever the result of XOR 255 is binary one, binary counter 259 is incremented by one. Similarly, XOR function 257 compares the corresponding elements of hard-limited 353 codeword 230 and re-encoded codeword 281 for the lower sideband subcarriers. Counter 261 increments by one whenever the result of XOR 257 is binary one.

Both counters 259 and 261 are preset to binary value zero at the start of the comparison for each pair of upper and lower sideband codewords. The number of bits $B_C$ in the implementation of binary counters 259 and 261 is such that the maximum possible count value, $2^{B_C}-1$, is equal to or greater than the number of bits in the ECC codeword, so that counter overflow is not possible. For each codeword, counter value 263 accumulated for the upper sideband signal codeword is compared to counter value 265 accumulated for the lower sideband signal ECC codeword in comparison device 267. Comparison 267 is made once per pair of received upper and lower sideband codewords and only after the differing bit positions have been counted over the plurality of bits in the codeword. Comparison device 267 results in integer value 269, which is used to control multiplexor 271. When comparing counter values, the counter 259 or 261 with the larger value indicates that there are a greater number of differences in bit positions between the codeword estimate and the re-encoded codeword estimate. In many circumstances, the codeword with the corresponding larger counter value 263 or 265 is more likely to have erroneous decoded bits. Thus, in certain embodiments, multiplexor 271 propagates upper sideband decoded codeword 232 when counter value 263 is less than counter value 265, and multiplexor 271 propagates lower sideband decoded codeword 228 when counter value 265 is less than counter value 263. Codeword diversity selector 241 propagates the decoded codeword 228 or 232 which is least likely to have bit errors.

In certain embodiments, when counter values 263 and 265 are about equal, either (e.g. randomly) decoded estimate 232 or 228 is propagated. As described previously, when the effective SNR is negative or close to zero decibels for either the upper or lower sideband signals, but not both, then it may be disadvantageous to combine codewords.

However, in certain circumstances, when the upper and lower codeword estimates are about equally likely to be erroneous, there may be an advantage to propagating neither decoded bit estimate 232 nor 228, but rather a third decoded bit estimate obtained from combining information from both codewords 234 and 230. According to certain embodiments of the invention, especially for soft-decision decoding for each bit estimate, it is advantageous to combine (sum) 273 codeword estimates 234 and 230 instead of selecting between their corresponding decoded estimates when counter values 263 and 265 are substantially equal. In FIG. 13, this embodiment is shown as optional (dotted) third input 277 for multiplexor 271. Codeword estimates 230 and 234 are summed 273 together linearly and the resulting summed codeword estimate is decoded 275, resulting in decoded bit estimate 277. Multiplexor 271 propagates signal 277 when counter values 263 and 265 are substantially equal as determined by comparison device 267, otherwise propagating signal 232 (228) when counter value 263 is less than (greater than) counter value 265. When soft-decision decoding is implemented in the receiver, it is not a requirement of the invention to combine estimates instead of selecting between them. In certain embodiments, the additional complexity and/or delay associated with combining the codeword estimates may be undesirable.

The threshold scalar value for determining whether to combine and decode the upper sideband and lower sideband signal codeword estimates or to select between decoded codeword estimates may be evaluated by experimental trials or by numerical simulation of the transmitter and receiver system with the anticipated noise, multipath, and interference conditions and by varying the value of the threshold parameter. For example, the correspondence between counter values and the IBOC DAB receiver BER performance may be tabulated at different SNR values. When a counter value determined for a codeword significantly exceeds the value found to be associated with the probable occurrence of decoded bit errors, then the codeword may be discarded (selected against) or disqualified for possible combination. In certain embodiments, decoding of the combined codeword is not performed until after the determination whether to combine has first been made by decoding the upper and lower sideband signal codewords and comparing to the threshold value. An embodiment with lower latency is to decode the combined codeword in parallel with the decoding of the upper and lower codewords but propagating the combined decoded codeword result only if the threshold condition is satisfied. When conditional combination of codewords is implemented, the decoding of the combined codeword may be computed in parallel with or subsequent to the evaluation of the upper and lower codewords separately, depending upon limitations in implementation complexity and the speed of the ECC decoding algorithm with respect to the desired bit rate throughput.

The specific embodiment of codeword diversity selector 241 in FIG. 13 uses the codewords and the decoded and re-encoded codewords in order to determine which decoded codeword in each pair of codewords to propagate as the source bit estimate or whether to combine codewords and then ECC decode. The implementation is suitable for convolutional and/or block ECC methods. In another embodiment shown in FIG. 14(a), preferably when convolutional encoding methods are implemented with hard-decision or soft-decision Viterbi decoding, the determination as to which codeword to propagate, or whether to combine codewords, is made by comparing the accumulated branch metrics which are calculated by the ECC decoding algorithm.

For Viterbi decoding [reference: A. J. Viterbi, "Convolutional codes and their performance in communications systems," ibid.], "distance metrics", also known as branch metrics, are computed for each of the possible code states at each instant in time. The distance metrics are accumulated over the codeword and are a measure of the Hamming or Euclidean distance (difference) between the estimated codeword and valid codewords, according to the ECC code, for different paths through the possible codeword bit sequence possibilities, known as the code trellis. Upon completion of the decoding of the entire codeword, the transition bits at each code bit interval associated with the path which corresponds to the minimum accumulated distance metric through the trellis is determined as having been the decoded codeword which was most likely to have been transmitted. In the transmitter system, the block of source bits for each codeword is terminated with the predetermined tail bit sequence prior to convolutional encoding so that the final decoded source bit state for each codeword is known in the receiver without ambiguity, which is typically the all-zeros state (i.e. K-1 binary zeroes for a convolutional code with constraint length K).

Figure 14A:
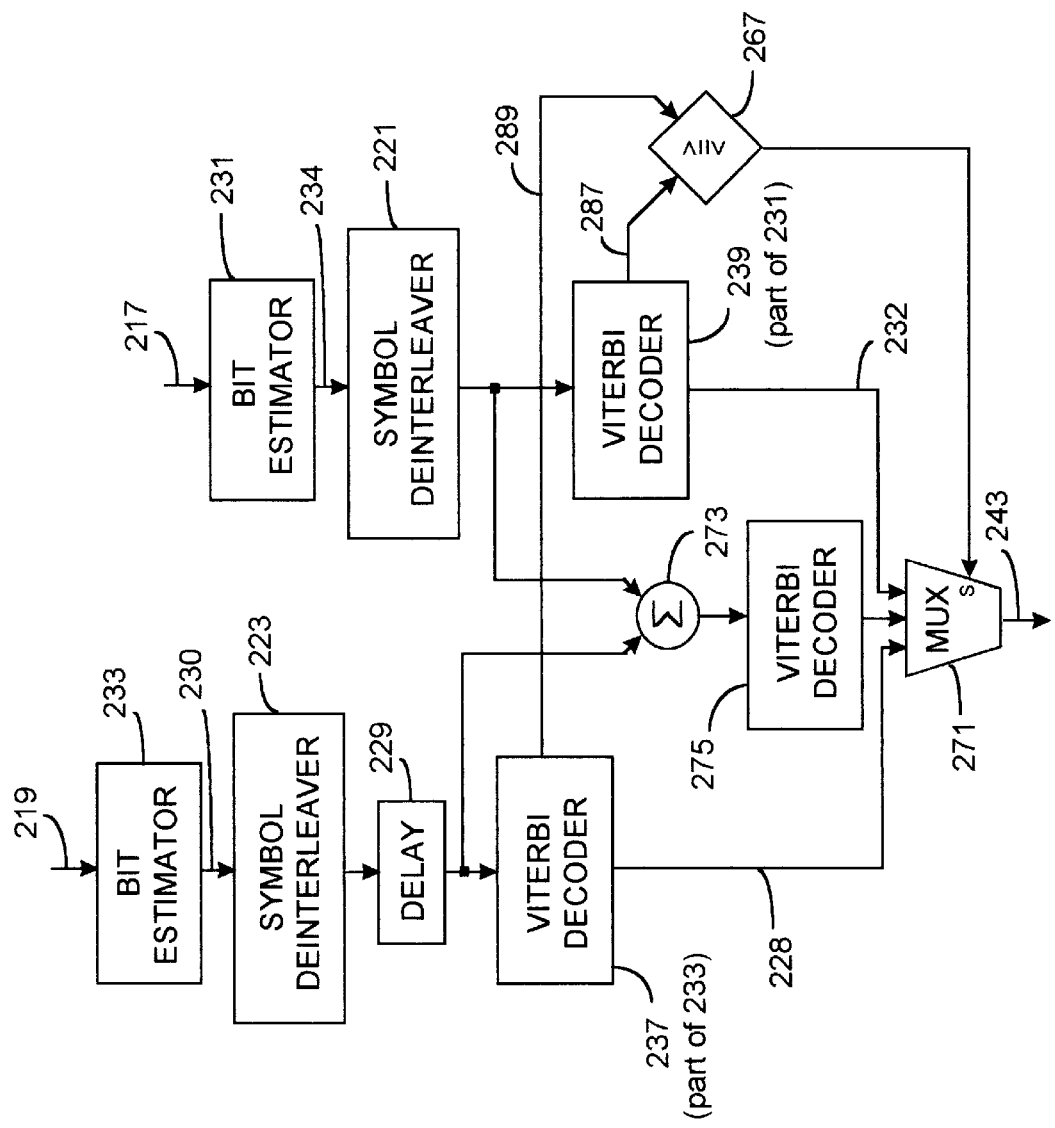
FIG. 14(a) is a block diagram of the codeword diversity selector in the FIG. 9 receiver system when the determination to select between upper and lower sideband codeword estimates (or to combine estimates and decode) is made by comparing the accumulated branch metrics computed in the Viterbi decoding algorithm at the known terminating state, for convolutional codes.

In FIG. 14(a), upper (lower) bit estimators 231 (233) determine codeword estimates from upper (lower) correlation sum samples 217 (219). After symbol deinterleaving, resulting upper (lower) codeword estimates 234 (230) are ECC decoded by Viterbi decoder 239 (237). Prior to decoding of each codeword, the accumulated distance metrics are reset. The accumulated distance metrics 287 and 289 at the terminal state (e.g. zeroes state) from Viterbi decoders 239 and 237 after decoding of the entire codeword for both decoded upper sideband signal codeword 232 and decoded lower sideband signal codeword 228 are propagated to comparison 267, for each pair of received codewords. When codeword combining is not implemented, the decoded codeword whose accumulated distance metric 287 or 289 is smaller (lessor Hamming or Euclidean distance) is propagated 243 by multiplexor 271. When codeword combining is implemented, then when the difference between the accumulated distance metrics 287 and 289 for the decoded upper sideband signal codeword and the decoded lower sideband signal codeword, respectively, is less than a threshold value, the codeword estimates are combined (summed) 273, then ECC decoded 275, and propagated by multiplexor 271 as decoded source bit estimate 243. As described previously, in many embodiments, a single implementation of a Viterbi decoder may be time-shared for the functions of decoders 237, 239, and 275.

In the FIG. 14(a) embodiment, the determined bit estimates are shown as being shuffled in upper (lower) symbol deinterleaver 221 (223) instead of deinterleaving the correlation sum samples and then bit estimating, as in FIG. 9. As described previously, either bit estimates or demodulator correlation sums may be deinterleaved. For example, when 8-ary modulation of subcarrier signal pairs is implemented in the transmitter system, the corresponding deinterleaver in the receiver system shuffles bit estimates in triplets or shuffles correlation sums in pairs.

After propagation of the summed branch metrics 287 and 289, which are accumulated during the Viterbi decoding of the upper and lower codewords, respectively, at the predetermined terminal state of each codeword, the metrics are compared (subtracted) in comparator 267 in order to determine which of the upper or lower codeword metrics is smaller, or whether the difference between metric values is within a predetermined threshold. In certain embodiments, multiplexor 271 propagates the decoded codeword whose corresponding accumulated branch metric is smaller. When codeword combining is implemented, as shown in FIG. 14(a), when the difference in metric values is less than a predetermined threshold, the upper sideband signal bit estimates 234 and lower sideband bit estimates 230 are combined 273, ECC decoded 275, and propagated as resulting (scrambled) source bit estimate 243 by multiplexor 275. In FIG. 14(a), upper (lower) sideband symbol deinterleavers 221 (223) make use of bit estimates 234 (230). As described previously, symbol deinterleaving of either the bit estimates or the correlation sums may be implemented in the receiver system provided that the correspondence between bit groups at the transmitter and resulting bit estimate groups at the receiver is preserved.

In general, ECC decoders in bit estimators 231 and 233 determine scalar comparison metrics, whether differing bit counts as shown in the FIG. 13 embodiment, or accumulated branch sums as described above or other variations, so that the resulting metrics may be compared in order to determine which of the upper or lower decoded codewords to propagate or whether to combine and decode the upper and lower codewords (or correlation sums for the codewords) together, for each pair of received upper and lower codewords. In certain embodiments, instead of comparing the upper and lower sideband codeword metrics to one another directly, each of the upper and lower sideband codeword metrics may be compared to a predetermined threshold. When a larger metric value indicates that the decoded codeword has increasing bit error probability, then when the metric exceeds the threshold, the codeword associated with that metric is disqualified for possible combination and propagation. In the event both codewords are disqualified, due, for example, to large disturbances in both the upper and lower sideband regions when the receiver is not in-motion, so that diversity delay is ineffective, the receiver may randomly choose one of the decoded codewords or indicate probable receiver failure (e.g. mute for audio). When neither the upper nor the lower codeword is disqualified by threshold comparison, the codeword estimates or correlation sums are combined and decoded, as described previously.

When the ECC method implemented in the transmitter and receiver systems is a concatenated code, for example, inner (i.e. closest to the RF channel) convolutional coding (first kind of code) with an outer Reed-Solomon code (second kind of code), the second code may also provide information for codeword diversity selector 241. In certain embodiments, the second code includes additional redundancy digits for error detection only. When the redundancy is insufficient to correct additional bit errors beyond some number, the decoding algorithm may still detect the presence of the "uncorrectable" errors. Decoding of the block code allows for the determination of whether or not, the codeword, after decoding of the first kind of code, has remaining bit errors with a high probability. When a pair of ECC codewords is compared in diversity selector 241 and where "decode failure flag" information is available from decoding of the second kind of code, if the decoding of one of the upper or lower sideband signal codewords in each pair indicates probable decoder failure, then that (erroneous) codeword is discarded, and the other codeword is selected for propagation.

In certain embodiments, not all of the bits of the codeword are made use of in codeword diversity selector 241. For example, for pragmatic trellis coded modulation (PTCM) for orthogonal pairs of upper sideband subcarrier signals and orthogonal pairs of lower sideband subcarrier signals, the determination whether to select between or combine codewords may be made by using the accumulated branch metric at the terminating state calculated by the Viterbi decoding algorithm for those bits which are encoded with, for example, the rate ½ binary convolutional code, and not the half-plane determining trellis bits. Similarly, for concatenated coding, the determination may be made from the inner codeword bits only, preferably when the inner code is a convolutional or trellis code, so that it is only necessary to decode the outer code for the selected inner codeword or combined inner codeword, which may simplify receiver system implementation.

Figure 14B:
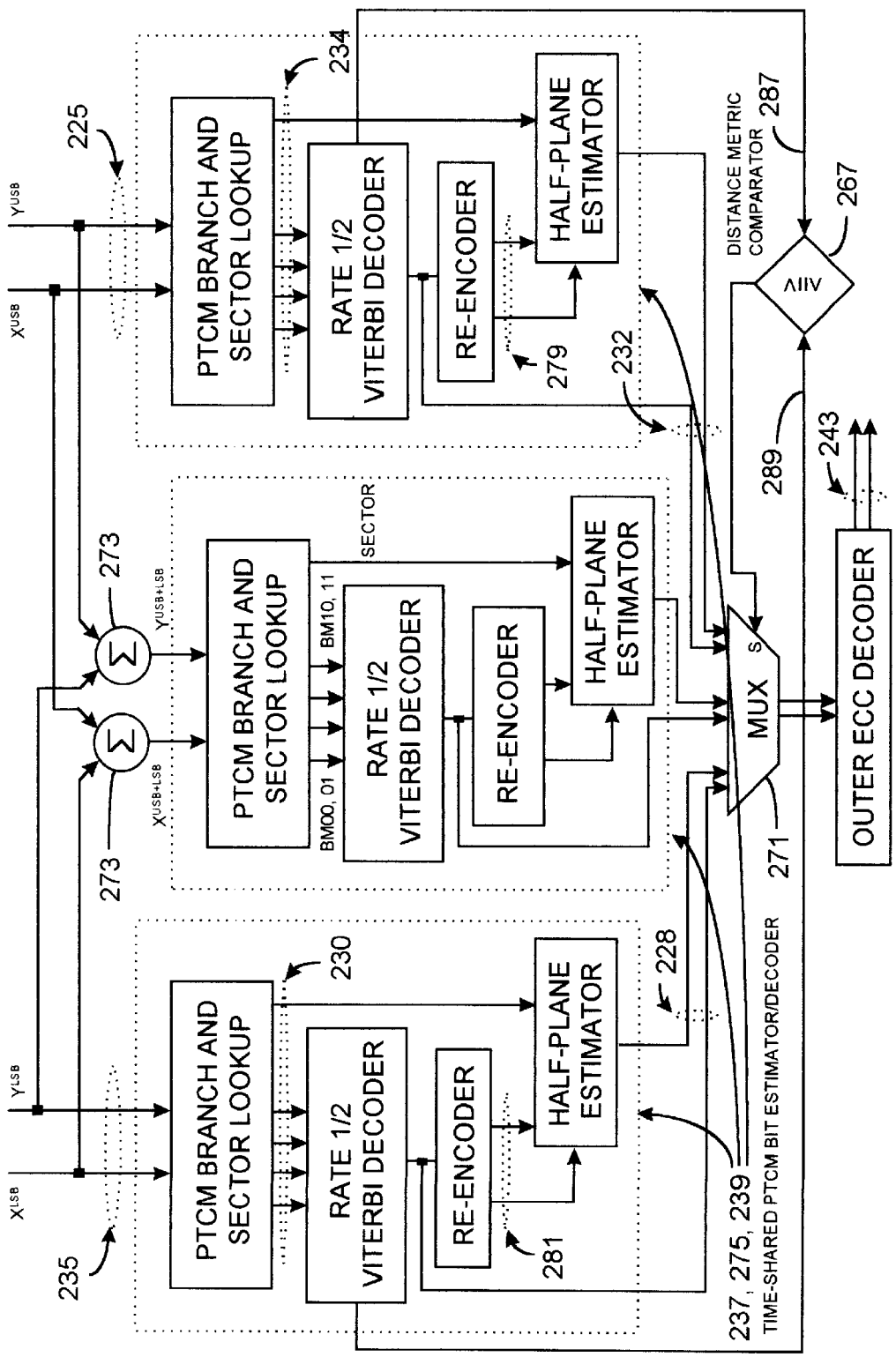
FIG. 14(b) is a block diagram of the upper and lower sideband bit estimators, ECC decoders and the codeword diversity selector in the FIG. 9 receiver system when the subcarriers within each sideband are orthogonal, organized as pairs, and modulated with rate ⅔ 8-ary PSK pragmatic trellis coded modulation (PTCM). The determination whether to select between decoded bit estimates or to combine upper and lower sideband correlation sums and decode is made by comparing the accumulated branch metrics computed in the Viterbi decoding algorithm for the encoded source bits.

FIG. 14(b) is a block diagram of an embodiment for bit estimating and codeword diversity selection when the subcarrier signals are modulated in orthogonal I and Q signal pairs within each of the upper and lower sidebands with rate ⅔ 8-ary pragmatic trellis-coded modulation (PTCM). In certain embodiments, a single PTCM estimator and decoder implementation with sufficiently high throughput is time-shared for the functions of estimating/decoding 239 the upper codeword, estimating/decoding 237 the lower codeword, and estimating/decoding 275 the combined codeword, when combining is implemented. In FIG. 14(b), the combined codeword is decoded after bit estimating from summation 273 between pairs of upper sideband I signal correlation sums $X^{USB}$ 225 with corresponding lower sideband I signal correlation sums $X^{LSB}$ 235, and between pairs of upper sideband Q signal correlation sums $Y^{USB}$ 225 with corresponding lower sideband Q signal correlation sums $Y^{LSB}$ 235, after symbol deinterleaving as shown in FIG. 9. The metrics for comparison 267 are accumulated branch metric 287 for the upper sideband signals and accumulated branch metric 289 for the lower sideband signals at the tail-bit state for Viterbi decoding of the rate ½ convolutional code. The accumulated branch metrics are reset for each codeword. The procedure for comparing metric values is independent of the PTCM modulation and was described previously. The implementation of a PTCM estimator/decoder for functions 237, 275, 239, without consideration of accumulated branch metric comparison, is known; see the integrated circuit part Q1875 technical data sheet from Qualcomm Incorporated, VLSI Products, San Diego, Calif.

Figure 10:
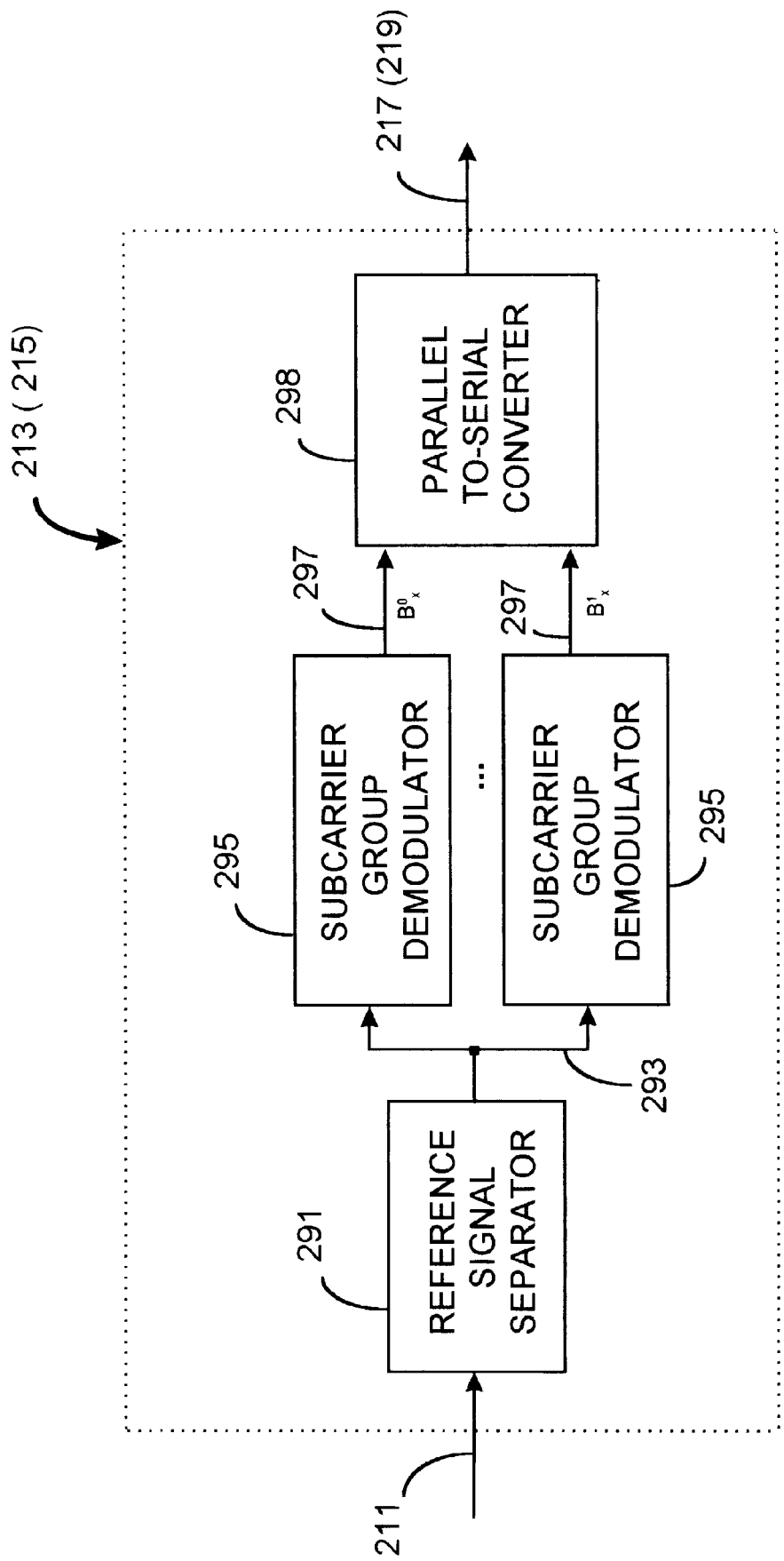
FIG. 10 is a block diagram of each of the upper sideband composite signal demodulator and lower sideband composite signal demodulator in the FIG. 9 receiver system for a plurality of subcarrier signals.

Regarding FIG. 9, a block diagram of an embodiment for each of upper sideband composite signal demodulator 213 and lower sideband composite signal demodulator 215 is shown in FIG. 10. The function of upper and lower sideband composite signal demodulators 213 and 215 is to determine correlation sums (or functions thereof) 217 and 219, respectively, from received and synchronized IBOC DAB signal 211. Each of upper and lower sideband composite signal demodulators 213 and 215 includes one or a plurality of subcarrier group demodulators 295. Each subcarrier group demodulator 295 determines correlation sums (or functions thereof) 297 from received signal 211, synchronized, and possibly equalized, using the one or plurality of signals in the respective subcarrier group. Each upper (lower) subcarrier group makes use of one or a plurality of upper (lower) subcarrier signals from the total upper (lower) subcarrier signal set for the sideband. For example, when subcarrier group modulator 83 in the transmitter system is implemented as shown in FIG. 7, two correlation sums (X 319 and Y 321) are determined in the subcarrier group demodulator in the receiver for each subcarrier group and for each baud interval; one correlation sum (X 319) for subcarrier signal 109 (also 299), labeled as the in-phase (I) signal, and one correlation sum (Y 321) for subcarrier signal 111 (also 305), labeled as the quadrature (Q) signal. As described previously, the labels I and Q are arbitrary for wideband subcarrier signals, which are orthogonal or approximately orthogonal, but not phase-orthogonal in general. Correlation sums 297 from subcarrier group demodulators 295 are arranged in a serial sequence of sums by parallel-to-serial converter 299 when there is more than one subcarrier group demodulator 295. When the subcarrier signals within each sideband are modulated in pairs, for example, as in 8-ary PTCM modulation, resulting correlation sums 297 are organized as a sequence of X and Y correlation sum pairs 217 for the upper sideband composite signal demodulator and sequence of correlation sum pairs 219 for the lower sideband composite signal demodulator.

In certain embodiments, reference signal 91, which may have been simultaneously transmitted together with the data-modulated subcarrier signals, is removed from received signal 211 prior to subcarrier group demodulators 295 by reference signal separator 291, resulting in composite signal 293, which becomes the common input for demodulators 295. Reference signal separator 291 may not be necessary when the reference signal is orthogonal or approximately orthogonal to the subcarrier signals. If reference signal 291 is not orthogonal to the subcarrier signals, then it may be removed by accumulating a reference signal estimate over a plurality of baud intervals and subtracting the accumulated estimate from the received signal with appropriate gain-factor compensation.

Figure 11:
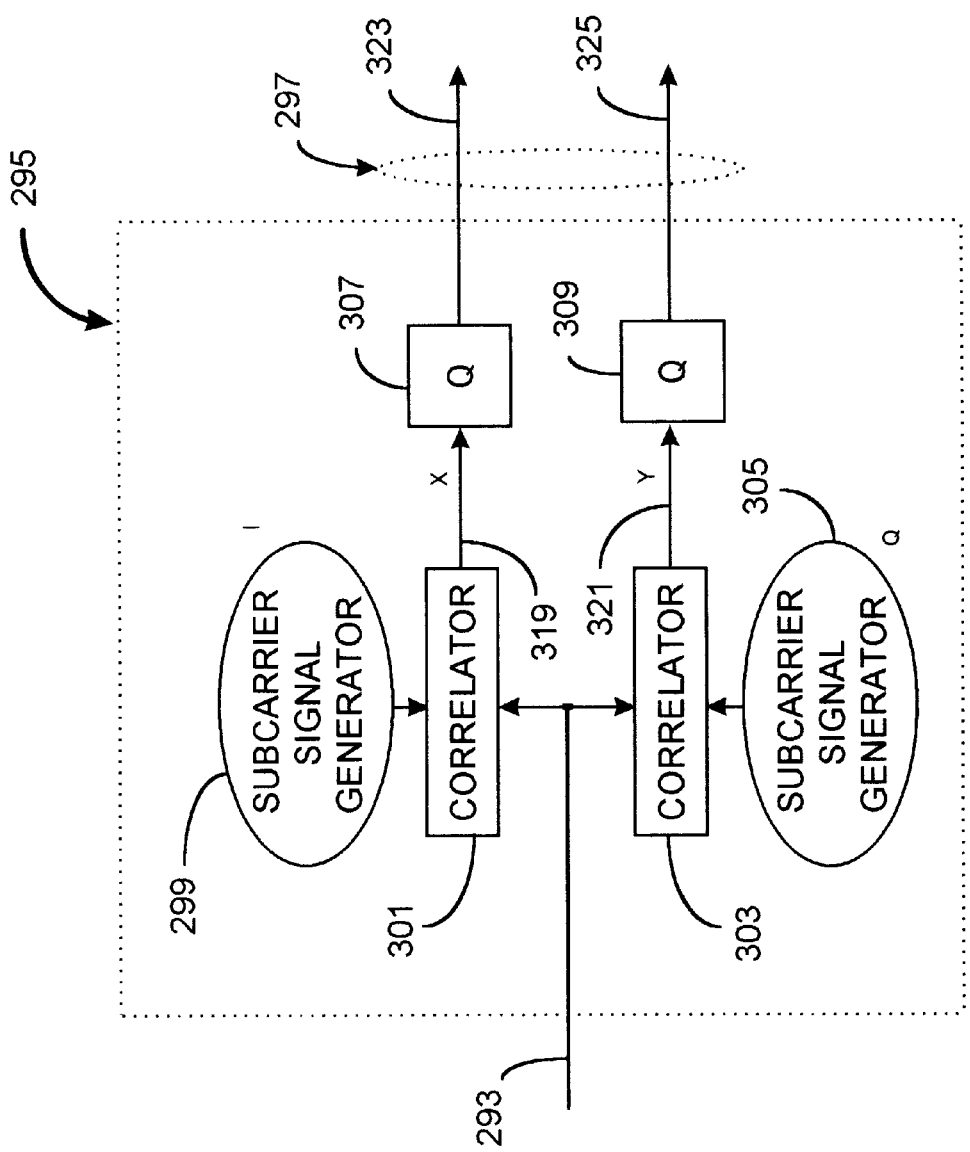
FIG. 11 is a block diagram of the subcarrier correlators for each of the subcarrier group demodulators in the FIG. 9–11 receiver of the invention when the subcarriers are orthogonal signal pairs and are demodulated by sampled matched filter correlation processing.

FIG. 7, described previously, is an embodiment of each subcarrier group modulator 83 in the transmitter system when one selection bit and two phase bits are used in each subcarrier group to determine the transmitted subcarrier signal or when an encoded binary triplet determines the 8-ary modulation signal constellation point. A block diagram of the corresponding receiver embodiment for subcarrier group demodulators 295, in which the correlation sums are determined in pairs, is shown in FIG. 11. Received signal 293, after removal of the reference signal component in some circumstances, is propagated to both correlators 301 and 303. Correlators 301 and 303 determine the correlation sum value (i.e. inner product or dot product) between the synchronized received signal and signals emitted from in-phase (I) subcarrier signal generator 299 and quadrature (Q) subcarrier signal generator 305, respectively. Correlators 301 and 303 may be implemented with multiply-accumulate (MAC) digital circuits for digital embodiments and RC-integrators with sample-hold circuits for analog embodiments. As described previously, when OFDM modulation is implemented, the subcarriers within each sideband are arranged as narrowband signals with the same frequency but which are phase-quadrature within the pair. The correlation between the received signal and the signal resulting from each of the subcarrier signal generators is determined at the nominal sampling point. The correlation processing is equivalent to matched filtering the received signal with each of the subcarrier signal waveforms and determining the matched filter result at the nominal sampling (peak) point. Subcarrier signal generators 299 and 305 in the receiver system emit the same time-domain representation as subcarrier signal generators 109 and 111, respectively, in the FIG. 7 transmitter system and are implemented similarly. The result of correlators 301 and 303 are scalar correlation sum values 319 and 321, respectively. Correlation sum value X 319, for the subcarrier signal in the pair labeled I 299, and correlation sum value Y 321, for the subcarrier signal in the pair labeled Q 305, are propagated to correlation sum quantizers 307 and 309, respectively. Correlation sum quantizers 307 and 309 reduce the number of bits required for the digital representation of the correlation sum values. The number of bits in each quantized correlation sum is between about three (3) and about twelve (12) bits, preferably about six (6) bits in certain embodiments. A disadvantage of a larger number of bits is that the memory requirements for subsequent deinterleavers 221 and 223 and diversity delay 229, when implemented, are increased. Quantizers 307 and 309 determined quantized correlation sums 323 and 325, respectively. The two quantized correlation sum values 323 and 325, computed from received signal 293 and subcarrier signals 299 and 305, respectively, are propagated together beyond each subcarrier group demodulator 295 as correlation sum group 297.

In certain embodiments (not shown), instead of propagating the two correlation sum values for each subcarrier group directly, two or more functions of the correlation sums prior to quantizers 307 and 309 are determined, and the function results are quantized and propagated as multiple component signal group 297. In this implementation, the functions are such that the correlation sum values may be determined without ambiguity by corresponding inverse functions after deinterleaving (and diversity delay, in certain embodiments). For example, instead of propagating correlation sum values X and Y directly, the function F1, which is defined as (X+Y)/2, and the function F2, defined as (X−Y)/2, may be calculated, quantized, and propagated beyond each subcarrier group demodulator 295. From functions F1 and F2, correlation sum values X and Y may be determined (i.e. reconstructed). Quantized correlation sum X is substantially equal to the sum of the quantized functions F1 and F2 (i.e. F1+F2) and quantized correlation sum Y is substantially equal to the difference between quantized functions F1 and F2 (i.e. F1−F2). In certain circumstances, an advantage of propagating functions of the correlation sum values (e.g. F1 and F2) instead of the correlation sum values themselves (e.g. X and Y) for deinterleaving is that the deleterious effect of quantizers 307 and 309 may be reduced. For example, when the difference between correlation sum values X and Y is small, quantization of X and Y to a small number of bits directly may distort the difference information. However, quantization of the difference (X−Y) and sum (X+Y) substantially preserves the critical information, which is the small-valued difference (X−Y) between the correlation sum values. In another embodiment, preferably for m-ary phase-shift keying (PSK) modulation, instead of propagating the correlation sum values, an estimate of the phase angle between the subcarrier signal components (i.e. the principal value of the arctangent of the ratio Y/X) is propagated for each subcarrier pair. Many PSK demodulation (bit estimating) methods do not need modulus (norm) information for the subcarrier signals so that the number of bits in each estimate may be reduced.

In FIG. 11, quantized correlation sum values 297 (or functions thereof) for both subcarrier signals 299 and 305 are propagated beyond each subcarrier group demodulator 295 in FIG. 9–10. After parallel-to-serial conversion 298, sequence 217 (219) of upper (lower) sideband composite signal correlation sum values, as X and Y pairs in certain embodiments, are propagated beyond upper (lower) sideband composite signal demodulator 213 (215) to symbol deinterleaver 221 (223). Symbol deinterleaver 221 (223) reverses the shuffling implemented in corresponding interleaver 43 in the transmitter system. The symbol size in upper (lower) symbol deinterleaver 221 (223) is such that each deinterleaver symbol includes the plurality of bits for each pair of quantized correlation sum values (or functions thereof). Since both (i.e. X and Y) correlation sum values together are required in order to determine the selection and phase bit estimates, or triplet bit estimates (Gray-coding), or trellis bit estimates (including pragmatic variations), for each subcarrier group in each baud interval, "symbol" (as opposed to "bit") deinterleaving is necessary to preserve the association between I signal and Q signal correlation sums.

Figure 12:
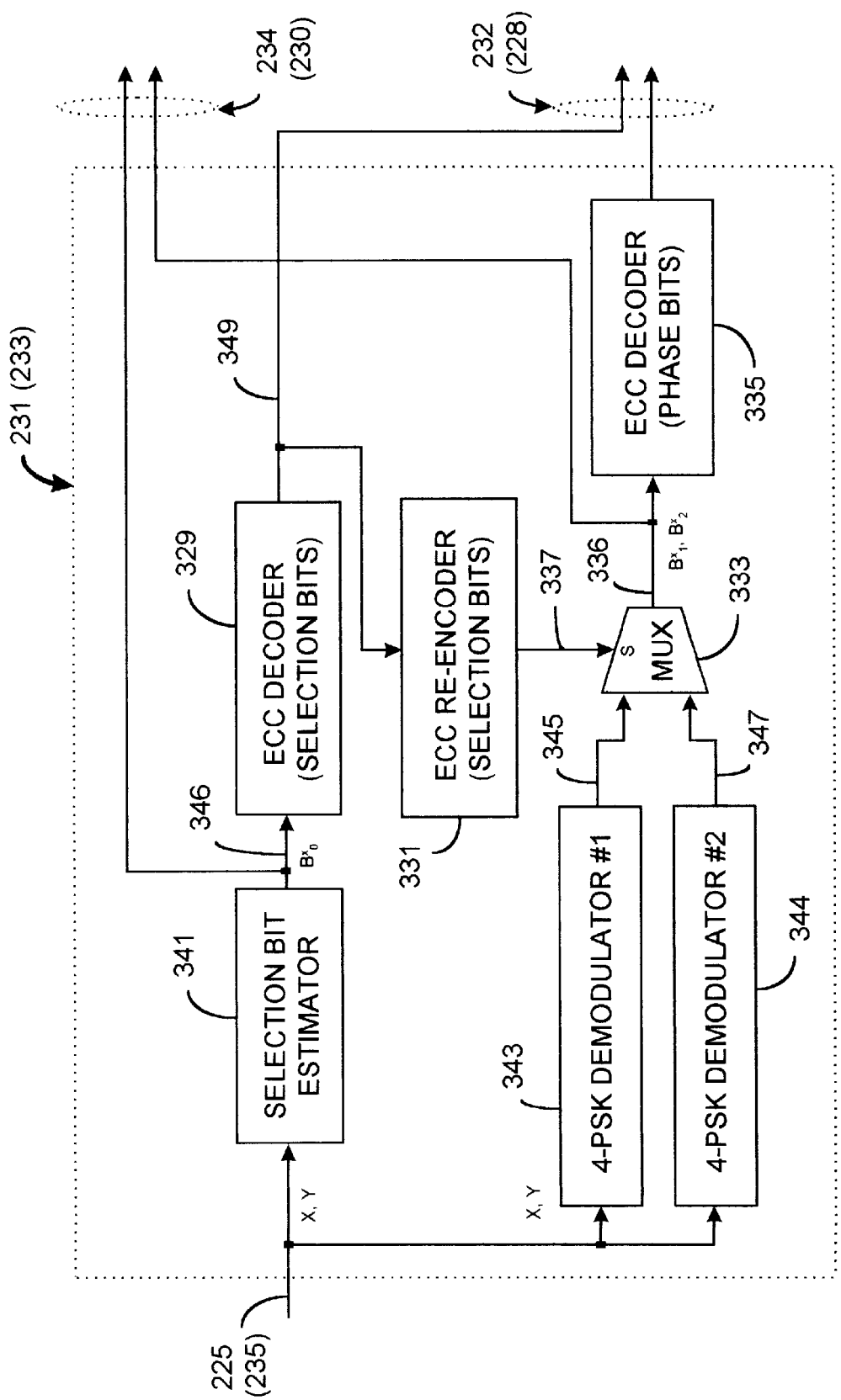
FIG. 12 is a block diagram of the bit estimators in the FIG. 9–11 receiver system of the invention for the FIG. 7 subcarrier group modulator transmitter embodiment and when the subcarrier pairs are data-modulated according to the Table 1 bit-to-symbol mapping, including a selection bit and two phase bits.

Upon symbol deinterleaving and optional diversity delay 229, upper (lower) sideband composite signal correlation sum values 225 (227) are propagated to upper (lower) bit estimators 231 (233). In FIG. 12, a block diagram of bit estimators 231 and 233 for the upper and lower sideband composite signals is shown. The FIG. 12 embodiment for bit estimating in the receiver corresponds to the FIG. 7 subcarrier group modulator transmitter embodiment for selection and phase bit 8-ary modulation according to Table 1. Corresponding bit estimating methods for Gray-code modulation, trellis coded modulation, and pragmatic trellis coded modulation (PTCM) are known in the coding art; see Ungerboeck and Viterbi references cited previously; for PTCM, see also the Q1875 datasheet from Qualcomm Incorporated, VLSI Products, San Diego, Calif. Deinterleaving results in upper (lower) sideband signal correlation sum pairs X and Y 225 (235), either by direct propagation subsequent to upper (lower) symbol deinterleaver 221 (223), or by reconstruction from functions of the correlation sums, described previously, which are propagated through deinterleaver 221 (223).

When selection and phase bit modulation of the subcarrier signal pairs is implemented in the transmitter system, then according to certain embodiments of the invention shown in FIG. 12, the pairs of X and Y correlation sum values for each subcarrier group are used to determine the selection bit estimate in selection bit estimator 341 for each baud interval. Selection bit estimator 341 generates (encoded) selection bit estimate $B^X_0$ 346. Each estimate $B^X_0$ 346 may be one (hard-decision) or a plurality (soft-decision) of bits. For each transmitted codeword, a sequence of encoded selection bit estimates is determined in each of the upper and lower sideband signal bit estimators 231 and 233. Each soft-decision selection bit estimate, $B^X_0$, is determined at 341 by computing the metric $S_M$:

$$S_M \equiv \left| \frac{|X| - |Y|}{\sqrt{X^2 + Y^2}} \right| \qquad (5)$$

The metric $S_M$ in Equation (5) is non-negative and may be determined by numerical computation using correlation sums X and Y or by table-lookup. When the received signal is normalized so that the subcarrier signal pair energy is about one, the denominator in Equation (5) is about one and does not need to be computed. When the sum of the squared correlation sums is about constant, but not the value one, then the numerator in Equation (5) may be divided by the square root of the constant. The denominator in Equation (5) may also be simplified by replacing the Euclidean norm $\sqrt{X^2+Y^2}$ with the approximation $|X|+|Y|$ in certain embodiments. Equation (5) is defined in the invention so that the value of the metric $S_M$ is closer to zero (0) than one (1) when one of the signal points from constellation #2 is transmitted. The metric $S_M$ value is closer to one (1) than zero (0) when one of the signal points from constellation #1 is transmitted. Thus, when the FIG. 16 point constellation is implemented in the transmitter system according to the Table 1 bit mapping, the selection bit in the receiver is estimated as binary digit zero when $S_M$ is closer to zero than one. The selection bit is estimated as binary digit one when $S_M$ is closer to one than zero. The metric $S_M$ is computed for each pair of correlation sums X and Y in each of the upper and lower bit estimators 231 and 233. For hard-decision decoding of the selection bits, the result of the computation of the metric in Equation (5) is quantized to one bit, which is binary digit zero when $S_M$ is closer to one than zero. For soft-decision decoding, the metric in Equation (5) may be mapped to multiple bit values between, for example, −1 (closer to zero) and +1 (closer to one).

In embodiments where codeword diversity selector 241 determines differing bit counts between the re-encoded decoded codeword and the codeword estimate prior to decoding, selection bit sequence 346 is propagated beyond upper (lower) bit estimator 231 (233) as part of upper (lower) signal group 234 (230) which is the overall codeword estimate, including selection and phase bits. The selection bit sequence is also ECC decoded by ECC decoder 329 to generate decoded selection bit estimate 349. ECC decoder 329 implements the appropriate ECC decoding algorithm for the ECC encoding algorithm that is used to encode those source bits in the transmitter system which, when encoded, are the selection bits. For example, in certain unequal error protection (UEP) embodiments, the ECC method for the source selection bits is a rate ⅓ convolutional or block code. ECC decoded selection bit codeword 349 is propagated beyond bit estimator 231 (233) as part of decoded upper sideband signal group 232 (228).

For selection and phase bit modulation, the decoded selection bit codeword 349 is re-encoded 331 in the receiver system using the same ECC method as implemented in ECC encoder 41 in the transmitter system for the selection bits. For ECC methods with memory (e.g. convolutional codes), the initial state of the codeword is identical for both transmitter ECC encoder 41 and receiver ECC re-encoder 331. In many circumstances, re-encoded selection bit codeword 337 has substantially fewer bit errors than selection bit codeword 346, determined prior to ECC decoding, as the result of ECC "coding gain." The re-encoded selection bit codeword 337 is propagated to multiplexor 333 as the control input. The re-encoded selection bits 337 determine whether the 4-ary PSK phase bit estimates, each of which represents two encoded phase bits, for either signal point constellation type #1 or signal point constellation type #2, but not both, are propagated beyond multiplexor 333 as phase bit estimate 336 $B^X{}_1$, $B^X{}_2$. Once the phase bit estimates are determined for each transmitted triplet of selection and phase bits, the phase bit codeword 336 is decoded by ECC decoder 335 according to the ECC code which is implemented in ECC encoder 41 in the transmitter system for the phase bits (e.g. UEP rate ⅚ code).

In certain embodiments, the determined phase bit estimates 336 from multiplexor are deinterleaved with a secondary symbol deinterleaver (not shown) prior to phase bit ECC decoding 335. When the secondary symbol deinterleaver is implemented in the receiver system, there is a corresponding secondary symbol interleaver (not shown) in the transmitter system. The secondary symbol interleaver in the transmitter system shuffles phase bit estimates in pairs, after ECC encoding, but before channel interleaving and 8-ary modulation of the encoded selection bits and phase bits together, while the secondary symbol deinterleaver in the receiver system shuffles the pairs of phase bit estimates, after multiplexing, but prior to ECC decoding. The purpose of the secondary interleaver and secondary upper and lower deinterleavers is to decrease the probability of correlated bit errors in decoding the phase bit estimates due to error bursts in the re-encoded selection bits. The length of the secondary interleaver in the transmitter system and secondary deinterleavers in the receiver system is typically much smaller than interleaver 43 and deinterleavers 221 and 223. For example, while interleaver 43 and deinterleavers 221 and 223 span multiple ECC codewords, the secondary interleaver may span only a single codeword. The minimum length of the secondary interleaver and secondary deinterleaver is substantially greater than the decision length of the ECC method for the selection bits so that adjacent phase bit estimate pairs 336 are dispersed by the secondary deinterleaver across a bit length substantially greater than the selection bit decision length prior to ECC decoding 335. In the secondary interleaver (not shown), the symbol size is two bits or multiple thereof, so that the pairing between phase bits (for 4-ary modulation), is maintained, while in the upper and lower secondary deinterleavers, the symbol size is sufficient to include the estimates of the two phase bits in each pair. In a variation, instead of interleaving the phase bits, the re-encoded selection bits are secondary deinterleaved prior to multiplexing 333 and ECC decoding 335 of the phase bits. When the re-encoded selection bits are secondary deinterleaved in the receiver system, then, in the transmitter system, the encoded selection bits are secondary interleaved prior to being combined with the encoded phase bits.

The decoded phase bit codeword estimate is propagated beyond bit estimator 231 (233) together with the decoded selection bit codeword as signal group 232 (228). For the FIG. 13 embodiment of codeword diversity selector 241, phase bit codeword estimate 336 prior to ECC decoding is propagated together with selection bit codeword estimate 346 beyond bit estimator 231 (233) as signal group 234 (230).

In FIG. 12, the inputs for multiplexor 333 are phase bit estimates 345 and 347. Each estimate of each phase bit may have one (hard-decision) or a plurality (soft-decision) of bits which are determined from upper (lower) correlation sums X and Y 225 (235) by 4-ary PSK demodulators 343 and 344. 4-ary PSK demodulator 343 determines phase bit estimate 345 with the presumption that a signal which corresponds to signal point constellation #1, in other words, points 500, 502, 504, or 506, as shown in FIG. 16, has been transmitted over one or a plurality of baud intervals. 4-ary PSK demodulator 344 determines phase bit estimate 347 with the presumption that a signal from signal point constellation #2, in other words, points 501, 503, 505, or 507, as shown in FIG. 16, has been transmitted. When the modulation bit-to-symbol mapping shown previously in Table 1 is implemented, a re-encoded selection bit estimate 337 of binary digit zero causes multiplexor 333 to propagate the two phase bit estimates from 4-ary PSK demodulator #2. Similarly, a re-encoded selection bit estimate of binary digit one causes multiplexor 333 to propagate the two phase bit estimates from 4-ary PSK demodulator #1. Since only one of the phase bit estimate pairs, from either demodulator 343 or demodulator 344, is propagated for each selection bit estimate, it is not necessary to simultaneously determine both estimates. In certain embodiments, the demodulation (bit estimating) of the phase bits does not occur until after the selection bits have been decoded and re-encoded, so that the appropriate phase-bit demodulation method (i.e. 4-ary demodulator #1 or 4-ary demodulator #2) is known by the re-encoded selection bit value. However, simultaneous implementation of 4-ary demodulators 343 and 344 may result in lower overall latency.

In many embodiments, 4-ary PSK demodulators 343 and 344 are conventional Gray-coded Quaternary Phase-Shift Keying (QPSK) demodulators or variations thereof. The implementation of Gray-coded QPSK demodulators 343 and 344, for 4-ary constellations #1 and #2, respectively, once given correlation sum values X for the in-phase signal and Y for the quadrature signal, together 225 (235), is known; see, for example, the Q1875 datasheet from Qualcomm Incorporated, VLSI Products, San Diego, Calif., for an exemplary QPSK configuration. A decision statistic and bit mapping for hard-decision 4-ary PSK constellation demodulator #1 343 (i.e. the re-encoded selection bit is one) is shown below in Table 3.

TABLE 3

4-ary PSK Demodulator #1 Mapping.

| Decision Statistic | Signal Point | Phase Bits |
|---|---|---|
| $\|X\| < Y, Y > 0$ | 500 | 00 |
| $X > 0, \|Y\| < X$ | 502 | 01 |
| $\|X\| < -Y, Y \leq 0$ | 504 | 11 |
| $X \leq 0, \|Y\| \leq -X$ | 506 | 10 |

The decision statistic and bit mapping for hard-decision 4-ary PSK constellation demodulator #2 344 is shown below in Table 4.

TABLE 4

4-ary PSK Demodulator #2 Mapping.

| Decision Statistic | Signal Point | Phase Bits |
|---|---|---|
| $X > 0, Y > 0$ | 501 | 01 |
| $X > 0, Y \leq 0$ | 503 | 11 |
| $X \leq 0, Y \leq 0$ | 505 | 10 |
| $X \leq 0, Y > 0$ | 507 | 00 |

In the FIG. 13 embodiment of codeword diversity selector 241, the decoded ECC codewords are re-encoded to generate selection and phase bit re-encoded codewords. In the FIG. 12 bit estimator embodiment 231 and 233 for selection and phase bit demodulation of the subcarrier signal pairs, the decoded selection bit codeword is re-encoded 331 in order to determine which kind of 4-ary (#1 or #2) constellation is represented by the phase bit estimate. When codeword diversity selector 241 makes use of the re-encoded codewords to determine a count of differing bits, as described previously, re-encoded selection bits 337 for the upper and lower sideband signal codewords may be propagated directly to XOR devices 257 and 255, obviating the need for re-encoders 253 and 251 in FIG. 13.

Figure 15:
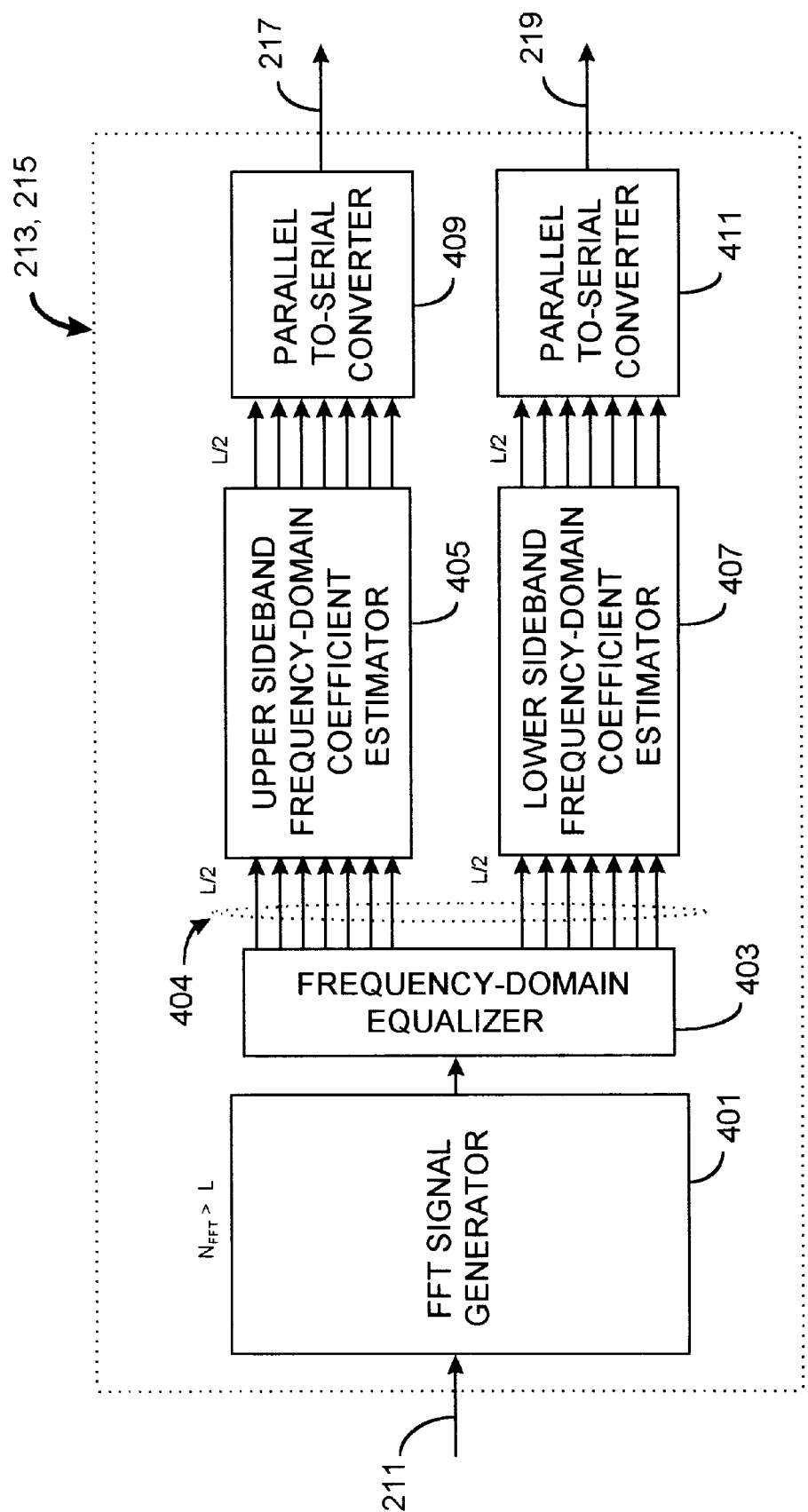
FIG. 15 is a block diagram of an embodiment of the upper and lower sideband composite signal demodulators when the subcarrier signals are wideband, but where the received signal is demodulated by transformation to a set of frequency-domain coefficients with FFT processing and subsequent mapping to a set of state coefficients and bit estimates for the wideband subcarrier signals.

The subcarrier signals in each of the upper and lower sidebands have a frequency spectrum which is narrowband (e.g. OFDM) or wideband (e.g. spread spectrum) within the sideband region and are substantially orthogonal. Each subcarrier signal's spectrum individually, for wideband signals, or as a composite, for narrowband signals, substantially occupies either the upper sideband region or the lower sideband region, but not both. In FIG. 11, signal generators 299 and 305 for determining correlation sums X 319 and Y 321 are implemented by storing the time-domain representation of the subcarrier waveform shape in a memory device (e.g. ROM or RAM). However, in certain embodiments, it may be preferable to implement the demodulation of the plurality of subcarrier signals simultaneously, similar to the modulation of the plurality of subcarrier signals simultaneously in the FIG. 8 transmitter system modulator. When the subcarrier signals are narrowband OFDM signals, known Fast Fourier Transform (FFT) methods [reference: W. Y. Zou and Y. Wu, "COFDM: an overview," ibid.] accomplish the demodulation of the subcarrier signals simultaneously. However, FFT methods may not be directly implemented for wideband subcarrier signals because the FFT basis signals are narrowband sinusoids. In certain embodiments of the invention, wideband subcarriers signals may be simultaneously modulated and combined (summed) with IFFT processing to generate the time-domain composite signal representation by mapping each of the data-modulated wideband subcarrier signals onto a plurality of narrowband OFDM signals, as shown in the FIG. 8 block diagram and described previously. FIG. 15 is a block diagram of a corresponding demodulator which uses Fast Fourier Transform (FFT) processing for simultaneous demodulation of the plurality of wideband subcarrier signals in the receiver system. Received signal 211 is first transformed to a sequence of frequency-domain coefficients by Fast Fourier Transform (FFT) signal generator 401 as in the known method of OFDM. The frequency-domain coefficients may be optionally equalized by frequency-domain equalizer 403, which typically implements one complex-valued equalizer tap for each determined frequency-domain coefficient, correcting for memory-less amplitude and phase errors. Frequency-domain equalizer 403 is optional and may be implemented in place of or in addition to FIG. 9 time-domain equalizer 209 in the receiver system. In general, the length of the FFT transform, $N_{FFT}$, is greater than the number of OFDM subcarrier signals, L, which together span about the same spectrum as the wideband subcarrier signals. The remaining frequency domain coefficients, outside of the desired bandwidth, may be set to zero. The equalized sequence of frequency-domain coefficients within the composite subcarrier signal bandwidth are transformed to corresponding data-modulated coefficients for the wideband subcarrier signals by upper sideband frequency-domain coefficient estimator 405 and lower sideband frequency-domain coefficient estimator 407. Coefficient estimators 405 and 407 determine a sequence of amplitude modulation coefficients for each of the wideband subcarrier signals from the sequence of transformed frequency-domain coefficients through a mapping process. The mapping for upper sideband coefficient estimator 405 and lower sideband coefficient estimator 407 in FIG. 15 is the inverse of the matrix multiplication described for the FIG. 8 upper sideband coefficient generator 133 and lower sideband coefficient generator 127. In other words, matrix multiplication 405 multiplies the part of frequency-domain vector 404 which corresponds to the upper sideband narrowband subcarrier signals by matrix $(M^{USB}_{OFDM})^{-1}$ where the superscript $^{-1}$ indicates the conventional matrix inverse. Similarly, matrix multiplication 407 multiplies the part of frequency-domain vector 404 which corresponds to the lower sideband narrowband subcarrier signal by matrix $(M^{LSB}_{OFDM})^{-1}$. $M^{USB}_{OFDM}$ and $M^{LSB}_{OFDM}$ were defined previously. The matrix inverse only exists uniquely when there are equal numbers of wideband subcarrier signals and narrowband OFDM signals (i.e. matrices $M^{USB}_{OFDM}$ and $M^{LSB}_{OFDM}$ are square) Each of the resulting wideband subcarrier coefficients after mapping is the (cross)correlation between the received signal and the particular wideband subcarrier. The crosscorrelation values are equivalent to correlation sum pair X 319, Y 321 determined in the FIG. 11 demodulator embodiment. The upper (lower) sideband correlation sums are arranged in a serial sequence of upper (lower) correlation sum pairs 217 (219) by parallel-to-serial converter 409 (411). Once the correlation sums are determined, the selection bits $B^X_0$ and phase bits $B^X_1$, $B^X_2$ may be estimated as shown in FIG. 12, for example. The method for demodulating wideband subcarrier signals by FFT transforming the received signal and mapping from a set of narrowband OFDM signals, which are the FFT basis signals, to a set of wideband subcarrier signals may be implemented for any of the modulation methods described previously, for example, selection and phase bit modulation, Gray code modulation, and trellis and pragmatic trellis coded modulation of orthogonal subcarrier signal pairs.

The FIG. 7 embodiment of the subcarrier modulator in the transmitter system and corresponding FIG. 11–12 demodulation in the receiver system with selection and phase bit modulation for narrowband or wideband subcarrier signals is one of several subcarrier modulation and demodulation methods which may be implemented. As described previously, known methods for 8-ary amplitude and/or phase modulation (ASK and PSK) for pairs of orthogonal signals may be combined with a rate ⅔ ECC code, including variations which combine modulation and ECC considerations together, for example, rate ⅔ 8-ary PSK trellis-coded modulation (TMC) as described by Ungerboeck [reference: G. Ungerboeck, ibid.], rate ⅔ 8-ary PSK pragmatic TCM [reference: A. J. Viterbi, J. K. Wolf, E. Zehavi, and R. Padovani, "A pragmatic approach to trellis-coded modulation," ibid.; see also the Q1875 integrated circuit technical data sheet from Qualcomm Incorporated, VLSI Products, San Diego, Calif.], and variations and improvements thereof [reference: N. Sehadri and C. E. W. Sundberg, "Multilevel trellis coded modulations for the Rayleigh fading channel," *IEEE Transactions on Communications*, Vol. 40, No. 9, pp. 1300–1310, September 1993] [reference: J. Wu and S. Lin, "Multilevel trellis MPSK modulation codes for the Rayleigh fading channel," *IEEE Transactions on Communications*, Vol. 41, No. 9, pp. 1311–1318, September 1993]. Other suitable modulation methods which make use of biorthogonal signaling with a source bit rate throughput (after ECC decoding) of about 2 bits/sec/Hz are described by Saha [reference: U.S. Pat. No. 4,730,344 to Saha, and D. Saha, "Channel coding with quadrature-quadrature phase-shift keying (Q²PSK) signals," *IEEE Transactions on Communications*, Vol. 38, No. 4, pp. 409–417, April 1990]. However, the method described by Saha requires further data-shaping of the subcarrier signals.

In certain embodiments of the invention, the baseband or intermediate sample-frequency, which is the reciprocal of the sample-time $\Delta t$, of the IBOC DAB signal for digital implementations of the signals in the transmitter and receiver systems is about an integer multiple of the channel allocation separation and greater than the Nyquist sampling frequency for the IBOC DAB signal. The sample-frequency is the clock for analog-to-digital converter(s) 203 in the receiver system. When the complex-valued time-domain representation sample-frequency is about 800 kHz (which is equivalent to a real-valued time-domain IF representation at 400 kHz and a sample-frequency of about 1.6 MHz), the approximate integer ratio between the sample-frequency and the analog FM-band channel allocation separation, which is 200 kHz in the United States, causes frequency-domain "aliases" (also known as "images") due to residual spectrum components of second-adjacent analog FM-band interference sources, which may remain after bandpass filtering in the receiver, to overlap in frequency with the co-channel and on-channel analog FM-band interference sources. When the sample-frequency is arbitrarily chosen, without consideration of the analog FM-band channel separation, then in certain circumstances, the analog FM-band alias frequency components may overlap in frequency with the received IBOC DAB signal in the sampled-time domain representation of the RF signal in the receiver system by a significant amount, which is undesirable since frequency-specific bandpass filtering is ineffective in mitigating interference due to overlapping spectrum.

Once given the above disclosure, therefore, various other modifications, features or improvements will become apparent to the skilled artisan. Such other features, modifications, and improvements are thus considered a part of this invention, the scope of which is to be determined by the following claims:

I claim:

1. An in-band on-channel (IBOC) digital broadcast receiver comprising:

receiving means for receiving an IBOC digital signal with source bit information which is duplicated in both upper and lower sidebands of a predetermined radio frequency (RF) mask and wherein the duplicated source bit information is encoded differently in the upper sideband than in the lower sideband so that the receiver and corresponding system are more robust against interference;

demodulation means for demodulating the received IBOC signal including the duplicated source bit information in both the upper and lower sidebands, with the differently encoded upper and lower sidebands with duplicated source bit information being demodulated by said demodulation means;

determination means for determining whether the demodulated redundant source bit information in the upper sideband or the lower sideband is less likely to be erroneous; and selection means for selecting the demodulated source bit information determined by said determination means as less likely to be erroneous without requiring prior knowledge as to which sideband is less likely to be deleteriously affected.

2. The IBOC receiver of claim 1, wherein said receiving means is further for receiving within said mask an analog FM signal in a central region of said mask about a center frequency, said analog FM signal and at least one of said redundant IBOC signals in said upper and lower sidebands being received simultaneously.

3. The IBOC receiver of claim 1, further including processing means for processing the demodulated and selected source bit information and forwarding same to a user.

4. The IBOC receiver of claim 1, further comprising means for combining demodulated information generated prior to combined source bit information determination, from both the upper and lower sidebands when said determination means determines that the likelihood of error in the demodulated or recovered source bit information in the upper and lower sidebands is substantially equal.

5. The IBOC receiver of claim 1, further comprising upper and lower sideband demodulators and a time diversity delay means, wherein said diversity delay means is located prior to said determination means, said delay means compensating for a corresponding delay in an IBOC transmitter thereby rendering the receiver robust against certain deleterious events which may affect both the upper and lower sideband signals at substantially the same time.

6. The IBOC receiver of claim 1, wherein said determination means compares accumulated branch metrics at a codeword terminating state from Viterbi decoding of codeword estimates determined from demodulation of the upper and the lower sideband signals.

7. The IBOC receiver of claim 1, wherein said determination means compares a Hamming distance between codeword estimates determined from demodulation of the upper and lower sideband signals and corresponding re-encoded decoded codewords.

8. The IBOC receiver of claim 1, including only one antenna, and wherein the upper and lower sideband signals representing the redundant source bit information are differently modulated upper and lower sideband signals representing substantially the same source bit information.

9. The receiver of claim 1, wherein a first codeword is used to data-modulate the source bit information into the upper sideband, and a second codeword which is different than said first codeword is used to data-modulate the source bit information into the lower sideband.

10. A method of receiving an in-band on-channel (IBOC) digital broadcast radio frequency (RF) signal via a receiver comprising the steps of:

receiving the IBOC digital signal having redundant source bit information in both an upper and a lower sideband relative to a center frequency, wherein the redundant source bit information in the upper sideband is differently represented than the corresponding redundant source bit information in the corresponding lower sideband so that spectrums of the upper and lower sidebands including the redundant source bit information are not mirrored relative to one another about the center frequency;

determining, in the receiver, whether the source bit information in the redundantly modulated upper sideband or the lower sideband is less likely to contain source bit errors; and selecting, in the receiver, the source bit information determined in said determining step to be less likely to contain errors, so that the method of receiving is robust against adjacent channel interference.

11. The method of claim 10, wherein said receiving step further includes receiving an analog FM signal located between said upper and lower sidebands together with said redundant IBOC signals in the upper and lower sidebands.

12. The method of claim 11, further comprising the step of separating the received analog FM signal from the IBOC digital signals and thereafter separately demodulating said IBOC signals and said analog FM signal;

wherein said upper and lower sidebands include duplicate source bit information as the redundancy; and wherein the duplicate source bit information transmitted in the upper sideband is received at a different point in time than the corresponding duplicate source bit information transmitted in the lower sideband so that the system is robust against deleterious effects which may affect both sidebands at once.

13. The method of claim 10, further comprising the step of time delaying demodulated information prior to source bit determination of at least one of the received IBOC upper and lower sideband signals in the receiver so as to compensate for a corresponding delay in an IBOC digital signal transmitter thereby rendering the receiver robust against certain deleterious effects which may affect both sideband signals at once.

14. The method of claim 14, wherein the source bit information in both the upper and lower sidebands is completely redundant and includes ancillary data.

15. The method of claim 10, wherein said determining step determines to combine demodulator information from the upper and lower sideband signals when it is determined that the likelihood of error in the demodulated or recovered source bit information from the upper and lower sideband signals is approximately equal, and thereafter combining the demodulator information from the upper and lower sideband signals to recover source bits.

16. The method of claim 6, wherein a first codeword is used to data-modulate the redundant source bit information into the upper sideband, and a second codeword which is different than said first codeword is used to data-modulate the source bit information into the lower sideband.

17. An in-band on-channel (IBOC) digital audio broadcast (DAB) communication system including a transmitter and at least one receiver, the IBOC DAB system comprising:

a transmitter including an analog FM signal generator, an upper sideband digital signal generator, and a lower sideband digital signal generator, said transmitter for combining an analog FM signal generated by said FM signal generator together with digital sideband signals from said upper and lower sideband generators into a composite signal to be transmitted wherein said sideband signals each include source bit information;

said upper sideband generator performing a first encoding and said lower sideband generator performing a different second encoding so that redundant source bit information is transmitted in the upper and lower sidebands with the upper sideband being differently encoded than the lower sideband having the corresponding redundant source bit information;

means for transmitting said composite signal including the upper and lower sidebands;

an IBOC DAB receiver for receiving said composite signal, said receiver including an FM analog demodulator, an upper sideband digital demodulator, and a lower sideband digital demodulator;

said receiver further including a comparing device for determining which of (i) recovered source bit information from demodulation of the upper sideband IBOC DAB signal, and (ii) recovered source bit information from demodulation of the lower sideband IBOC DAB signal, is less likely to be erroneous; and said receiver further including a selector for selecting for further processing and forwarding to a user the demodulated or recovered source bit information from sideband signals determined by said comparing device to be less likely to include source bit errors.

18. The system of claim 17, wherein said transmitter includes a time delay device for delaying the source bit information in one of the upper and lower sidebands relative to the other, and said receiver includes a corresponding time delay device for delaying source bit information in the other of the upper and lower sidebands, so that the system is robust against unexpected deleterious effects which may affect the upper and lower sideband signals at once.

19. The system of claim 17, wherein said transmitter transmits redundant source bit information in said upper and lower sidebands and wherein the upper and lower sideband signals representing the redundant source bit information may or may not be identical although the information therein is redundant.

20. The system of claim 17, wherein each of the upper and lower sideband signals includes a plurality of orthogonal or approximately orthogonal subcarrier signals.

21. The system of claim 20, wherein the subcarrier signals in each of the upper and lower sidebands are modulated, in said transmitter, as pairs with m-ary pragmatic trellis coded modulation (PTCM) where each transmitted codeword has a finite-length and is terminated at a predetermined state.

22. The system of claim 17, wherein said comparing device further decides whether to (i) select recovered source bit information from demodulation of one of the upper and lower sideband signals or to (ii) combine information determined from demodulation of the upper and lower sideband signals and recover source bit information from the combined information.

* * * * *